(12) United States Patent
Jolly et al.

(10) Patent No.: US 11,295,398 B2
(45) Date of Patent: Apr. 5, 2022

(54) METHODS AND SYSTEMS TO GENERATE INFORMATION ABOUT NEWS SOURCE ITEMS DESCRIBING NEWS EVENTS OR TOPICS OF INTEREST

(71) Applicant: Snapwise Inc., Kitchener (CA)

(72) Inventors: Sukhsagar Singh Jolly, Brampton (CA); Payman Pouladdej, Atlanta, GA (US); Jan Kulinski, Mississauga (CA); Guy Streetley, Kitchener (CA); Harleen Kaur Jolly, Brampton (CA)

(73) Assignee: Snapwise Inc., Kitchener (CA)

( * ) Notice: Subject to any disclaimer, the term of this patent is extended or adjusted under 35 U.S.C. 154(b) by 0 days.

(21) Appl. No.: 17/225,043

(22) Filed: Apr. 7, 2021

(65) Prior Publication Data
US 2021/0256629 A1    Aug. 19, 2021

Related U.S. Application Data

(63) Continuation-in-part of application No. 17/002,152, filed on Aug. 25, 2020.

(Continued)

(51) Int. Cl.
*G06F 7/02* (2006.01)
*G06F 16/00* (2019.01)
(Continued)

(52) U.S. Cl.
CPC ......... *G06Q 50/01* (2013.01); *G06Q 30/0282* (2013.01)

(58) Field of Classification Search
CPC ............... G06F 16/9538; G06F 16/951; G06F 16/9536; G06F 16/345; G06F 16/35;
(Continued)

(56) References Cited

U.S. PATENT DOCUMENTS 7,333,985 B2    2/2008    Weare
7,568,148 B1    7/2009    Bharat
(Continued)

FOREIGN PATENT DOCUMENTS

KR    101864439 B1    6/2018
WO    2019043381 A1    3/2019

OTHER PUBLICATIONS

Saroka et al, "Cross-National Evidence of a Negativity Bias in Psychophysiological Reactions to News," Proceedings of the National Academy of Sciences, Sep. 2019. (Year: 2019).*

(Continued)

*Primary Examiner* — Bruce M Moser
(74) *Attorney, Agent, or Firm* — Thomas | Horstemeyer, LLP

(57) ABSTRACT

Examples of methods and systems to generate information about news source items appearing in user social media feed content, where the news source items describe news events or topics. The news events or topics can be identified by the recognition of news information associated with a news source in information configured for use as user social media feed content. The generated information can be displayed on a user device along with assigned bias, skew, or viewpoint ratings for news sources that describe the news source events. The news source items, news sources, and information can be selected on the user display for further user review. Notifications associated with news source bias, skew, or viewpoint ratings and information associated with user engagement with social media feed content can also be generated. Bias, skew, or viewpoint ratings for user social media accounts can be provided.

14 Claims, 34 Drawing Sheets

Related U.S. Application Data

(60) Provisional application No. 62/909,720, filed on Oct. 2, 2019.

(51) Int. Cl.
  *G06Q 50/00* (2012.01)
  *G06Q 30/02* (2012.01)

(58) Field of Classification Search
  CPC ...... G06F 16/30; G06F 16/904; G06F 16/908; G06F 16/954
  See application file for complete search history.

(56) References Cited

U.S. PATENT DOCUMENTS

| | | | |
|---|---|---|---|
| 8,615,518 | B2 | 12/2013 | Khasnis |
| 8,719,279 | B2 | 5/2014 | Albert |
| 8,898,166 | B1 | 11/2014 | Navrides |
| 8,965,409 | B2 | 2/2015 | Abhyanker |
| 9,280,597 | B2 | 3/2016 | Ghosh |
| 9,285,973 | B1 | 3/2016 | Gable |
| 9,405,792 | B2 | 8/2016 | Gross |
| 9,544,650 | B1 | 1/2017 | Oztaskent |
| 10,095,752 | B1 | 10/2018 | Schmitt |
| 2012/0179449 | A1* | 7/2012 | Raskino ........ G06F 16/345 704/2 |
| 2014/0136521 | A1* | 5/2014 | Pappas ........ G06Q 50/01 707/722 |
| 2016/0054871 | A1 | 2/2016 | Strike |
| 2016/0232241 | A1 | 8/2016 | Stoyanov |
| 2017/0177717 | A1 | 6/2017 | Raniere |
| 2017/0235820 | A1 | 8/2017 | Conrad |
| 2018/0239832 | A1 | 8/2018 | Galuten |
| 2018/0357323 | A1 | 12/2018 | Allen |
| 2018/0365574 | A1 | 12/2018 | Qiao |
| 2018/0373751 | A1 | 12/2018 | Qiao |
| 2019/0082224 | A1 | 3/2019 | Bradley |
| 2019/0163327 | A1 | 5/2019 | Otero |
| 2019/0179861 | A1 | 6/2019 | Goldenstein |
| 2019/0179956 | A1 | 6/2019 | Krasadakis |
| 2019/0306174 | A1 | 10/2019 | Jolly |
| 2020/0089711 | A1* | 3/2020 | Akulov ........ G06F 16/908 |

OTHER PUBLICATIONS

International Search Report for PCT/IB2020/059221 dated Dec. 22, 2020.

Darvishy, A., Ibrahim, H., Sidi, F., & Mustapha, A. (Nov. 1, 2019). A Customized Non-Exclusive Clustering Algorithm for News Recommendation Systems. Retrieved from https://journalofbabylon.com/index.php/JUBPAS/article/view/2192.

Asr, F. T., & Taboada, M. (May 23, 2019). Big Data and quality data for fake news and misinformation detection—Fatemeh Torabi Asr, Maite Taboada, 2019. Retrieved from https://journals.sagepub.com/doi/full/10.1177/2053951719843310.

Trielli, D., & Diakopoulos, N. (May 1, 2019). Search as News Curator: The Role of Google in Shaping Attention to News Information. Retrieved from https://dl.acm.org/doi/abs/10.1145/3290605.3300683.

Staykovski, T., Barron-Cedeõo, A., Martino, G. D. S., & Nakov, P. (Jan. 1, 1970). [PDF] Dense vs. Sparse Representations for News Stream Clustering: Semantic Scholar. Retrieved from https://www.semanticscholar.org/paper/Dense-vs.-Sparse-Representations-for-News-Stream-Staykovski-Barrón-Cedeño/dd3a715ada82054f3ac2ec36f16f17f130faffd5.

Yuan, Q., Ren, X., He, W., Zhang, C., Geng, X., Huang, L., . . . Han, J. (Oct. 1, 2018). Open-Schema Event Profiling for Massive News Corpora. Retrieved from https://dl.acm.org/doi/abs/10.1145/3269206.3271674.

Altuncu, M. T., Yaliraki, S. N., & Barahona, M. (Aug. 3, 2018). Content-driven, unsupervised clustering of news articles through multiscale graph partitioning. Retrieved from https://arxiv.org/abs/1808.01175.

Wang L., Guo Z., Wang Y., Cui Z., Liu S., de Melo G. (2018) Social Media vs. News Media: Analyzing Real-World Events from Different Perspectives. In: Hartmann S., Ma H., Hameurlain A., Pemul G., Wagner R. (eds) Database and Expert Systems Applications. DEXA 2018. Lecture Notes in Computer Science, vol. 11030. Springer, Cham.

Beloedova, A. (Jan. 1, 1970). Veracity as basic category of journalistic discourse: Methodology of interpretation. Retrieved from https://dialnet.unirioja.es/servlet/articulo?codigo=6587479.

Hamborg, F., Donnay, K. & Gipp, B. Automated identification of media bias in news articles: an interdisciplinary literature review. Int J Digit Libr 20, 391-415 (2019). https://doi.org/10.1007/s00799-018-0261-y.

Setty, V. (Jun. 1, 2018). Distributed and Dynamic Clustering for News Events. Retrieved from https://dl.acm.org/doi/abs/10.1145/3210284.3219774.

Hamborg, F., Meuschke, N. & Gipp, B. Bias-aware news analysis using matrix-based news aggregation. Int J Digit Libr 21, 129-147 (2020). https://doi.org/10.1007/s00799-018-0239-9.

Rehm, G. (Sep. 13, 2017). An Infrastructure for Empowering Internet Users to Handle Fake News and Other Online Media Phenomena. Retrieved from https://link.springer.com/chapter/10.1007/978-3-319-73706-5_19.

Bisandu, D. B., & Liman, M. (Jan. 1, 2018). Clustering news articles using efficient similarity measure and N-grams. Retrieved from https://www.researchgate.net/profile/Dr_Prasad11/publication/327676216_Clustering_News_Articles_using_Efficient_Similarity_Measure_and_N-grams/links/5bcdcae8299bf17a1c6679ae/Clustering-News-Articles-using-Efficient-Similarity-Measure-and-N-grams.pdf.

C. Grozea, D. Cercel, C. Onose and S. Trausan-Matu, "Atlas: News aggregation service," 2017 16th RoEduNet Conference: Networking in Education and Research (RoEduNet), Targu Mures, 2017, pp. 1-6.

Laban, P., & Hearst, M. (Aug. 1, 2017). newsLens: building and visualizing long-ranging news stories. Retrieved from https://www.aclweb.org/anthology/W17-2701.pdf.

Setty, V., Anand, A., Mishra, A., & Anand, A. (Feb. 1, 2017). Modeling Event Importance for Ranking Daily News Events. Retrieved from https://dl.acm.org/doi/abs/10.1145/3018661.3018728.

\* cited by examiner

METHODS AND SYSTEMS TO GENERATE INFORMATION ABOUT NEWS SOURCE ITEMS DESCRIBING NEWS EVENTS OR TOPICS OF INTEREST

CROSS-REFERENCE TO RELATED APPLICATIONS

This Continuation-in-Part application claims priority to U.S. Utility application Ser. No. 17/002,152, filed Aug. 25, 2020, which claims priority to U.S. Provisional Application No. 62/909,720, filed Oct. 2, 2019. The disclosures of each of these applications are incorporated herein in their entireties by this reference.

FIELD OF THE DISCLOSURE

Examples of methods and systems to generate information about news source items appearing in user social media feed content, where the news source items describe news events or topics. The news events or topics can be identified by the recognition of news information associated with news information configured for use as user social media feed content. The generated information can be displayed on a user device along with assigned bias, skew, or viewpoint ratings for news sources that describe the news source events. The news source items, news sources, and information can be selected on the user display for further user review. Notifications associated with news source bias, skew, or viewpoint ratings and information associated with user engagement with social media feed content can also be generated. Bias, skew, or viewpoint ratings for user social media accounts can be provided. Some implementations of the processes herein can incorporate at least some human supervision.

BACKGROUND OF THE DISCLOSURE

The Internet has enabled the distribution of vast amounts of information to a large population virtually instantaneously and for comparatively low cost. News is no different. In the last 15 or so years, news delivery has migrated from being delivered in discrete channels of print, radio, and television to being largely consumed by readers online. A Pew Survey from 2017 revealed that 43% of Americans obtain their news from only online resources, which was an increase from 38% in 2016. While the development of this capability has created the benefit of enhanced information exchange throughout the world, it has also exposed readers to increased risks from information consumption, not the least of which emanates from so-called "fake news." The rapid distribution of fake news can cause contagion, manipulate markets, spark conflict, and fracture strategic relations between nations.

While news has traditionally been consumed from print sources (e.g., newspapers, magazines), television, and radio, news consumption has transitioned significantly to newer delivery mechanisms, such as online newsfeed generation products. More recently, news consumption has become integrated with social media platforms (e.g., Twitter, Instagram, Facebook, TikTok, Snapchat, Reddit, Twitch, Discord, etc.), may be as likely to view videos or memes posted by her friends, as she will be likely to be presented with news content. The nature of social media feed content consumption may make users less diligent in assessing the credibility of news content delivered in social media feed.

A Pew Research study in 2020 showed that Americans who primarily turn to social media for political news are both less aware and less knowledgeable about a wide range of events and issues in the news, that people who consume news primarily as social media feed content are more likely than other Americans to have heard about a number of false or unproven claims. Demographically, U.S. adults who rely most on social media for news tend to be younger, are less likely to be white and have lower levels of education than those who mainly use several other platforms. It was shown in the 2020 study that those who consumed news as social media feed content were more likely than other news consumers to have heard about one of a number of false claims being promoted about the Covid-19 pandemic and the 2020 U.S. Presidential Election. It follows that consumers of news in social media environments may be more susceptible to those seeking to inject "fake news" into social media users or populations of social media users.

In today's world where publishers generate revenue not only from readers, but also from the degree of "engagement" that readers have with the content generator, there is often a tendency for provocative, aggressive, one-sided, and allegedly "authentic" content that is more likely to engender an emotional response that can increase the "stickiness" of the reader with the content and the site generating the content. Often, revenue can be maximized by providing the reader with content that validates her beliefs and opinions, and such content can implicitly urge the user to share the content with those in her social network. Not surprisingly, a reader may choose the people in her social network because they share her opinions and beliefs. The incentives of the publisher to maximize engagement can mean that the goal is often for content to go "viral," such that it is shared rapidly by many users and spread through the networks to establish a reach of millions. One sub-category of this type of content is "clickbait"—that is, articles with dubious factual content, presented with misleading headlines, and designed for the simple goal of generating many views. The more extreme the "virality" of a news source item, the higher the reach, the higher the click numbers, and the higher the advertising revenue that can be attained by the person or entity monetizing the item. For content generators whose goals are social or political, the incentives are the same: the more readers who engage with content, the more likely the viewpoint will be acknowledged or adopted by a group of readers.

While it could be expected that most reasonably well-informed people would possess an ability to recognize whether information being delivered to them was, at least in some sense, biased, skewed, or filtered to limit objectivity, this can be difficult in today's online media world. Unlike in the past when a person herself would seek out and engage with information proactively from a variety of print, radio, and TV sources, information today is typically delivered to users by a small number of search engine products and social networks. This change has been dramatic: search engines and online news publishers operate as the central points of internet-delivered information, and content is now actively delivered to users algorithmically via newsfeeds. This can effectively lead to the reader's being presented with content that is increasingly directed toward her engaging longer with more content having the same tone and tenor. The news selection and delivery algorithms-which can be referred to as "news curation algorithms"—are also often configured to align with the preferences of those in one's social networks (e.g., "friends," 'contacts," etc.). This often means that those with whom one interacts online will, over time, also be exposed to the content of the same tone and tenor. The effect of this cycle is that content that contradicts a user's or user group's world view or that challenges their beliefs is often not presented.

News curation algorithms can exert significant impact on news consumption, and thus the information that people become exposed to, as well as the opinions they generate about current events. Users may engage with content more often if a news algorithm delivers a news event or topic in a higher position, at least because a user's attention will be more likely to be focused to material delivered earlier in the newsfeed during each engagement event. Whether intentional or not, this higher position of content in a newsfeed delivery can influence reader's perceptions about the "importance" of the news. This means that news curation products can affect readers' attitudes, shape opinions, alter beliefs and perceptions or reinforce stereotypes, and can influence how people make decisions (e.g., voting behaviors). In other words, news curations algorithms can play a key role in how people are exposed to information and how they can develop robust and diverse viewpoints on topics that may have important implications for matters significant in a civic discourse and in maintenance of a civil society.

Although the various online information purveyors, such as Google News and Apple News, purport to provide objective delivery of information across a political spectrum to users, recent studies show that this is not necessarily the case. Algorithmic news selection can result in a perception that there is bias if only because research indicates that there is a larger number of news publishers that can be classified as "left-leaning." In this regard, a 2019 Columbia Journalism Review study showed that for a selection of news reports from Google Top Stories 62.4 percent of article impressions were from sources rated by peer-reviewed research as "left-leaning," whereas 11.3 percent were from sources rated as "right-leaning." Although 26.3 percent of article impressions were from news sources that did not exhibit right-leaning or left-leaning bias, skew, or viewpoint, even if that last set of unknown impressions happened to be right-leaning, the trend would still be clear a higher proportion of left-leaning sources appear in Google Top Stories. That is, Google News' algorithm is more likely to select news from "left-leaning" news sources for delivery in a user's newsfeed.

Further data analysis showed that there are 3.2 times more stories delivered from left-leaning sources than from right-leaning sources, even though the actually determined ratio of left-leaning sources to right-leaning sources available was 2.2. This again demonstrated that the Google News algorithm showed a greater selection bias toward left-leaning news sources. The data showed that this selection bias was due to the news curation algorithm causing selection of news sources that possessed a rating of "more trustworthy." In other words, the Google News algorithm exhibits a "bias" toward news sources that are rated as "more truthful," and therefore delivers more news from such sources. While such bias toward "more truthful" sources would objectively be considered to be a positive, such selection has subjected Google, and other news curation engines, to criticism that they are "censoring" viewpoints in the delivery of news.

The answer to the perception of bias, viewpoint, or spin in the delivery of news by news curation products is not just to provide more information from more sources irrespective of truthfulness and/or bias and "let users sort it out." Today, more content is generated with a primary purpose of influencing a readers' beliefs and opinions. Such emotionally directed content is often intentionally biased and framed to accomplish specific commercial and/or political goals by presenting a biased-laden context and viewpoint. Of course, these sources do not include disclaimers of bias to alert consumers to the underlying intention of the purveyors. Marketing and political campaigns are designed by experts who combine knowledge of both human psychology and the technologies and processes needed to precisely deploy their products to generate the desired result. These efforts are often amplified by "bots" and fake user accounts which, in combination with significant financial resources, means that news consumers relying on information appearing online are increasingly presented with news and information that is not objectively truthful. In other words, removal or de-emphasis of a "truthfulness" score in news curation algorithms is not beneficial because many news sources that will then be more highly ranked may be skewed toward manipulation of a user toward a specific viewpoint.

It should be apparent that a key challenge for consumers of online news sources is to be able to identify objective and balanced content, be it generated from professional sources or from "citizen journalists," that is objectively false or that is unrecognizably biased content. Even if fundamentally different in nature, both false and biased content can be problematic at least because the reader is deprived of truth and objectivity. Traditionally, different publishers would be known for their "bias," "spin," or "viewpoint." Because the reporters and writers were journalists by profession, however, journalistic ethics and professionalism could be expected to serve as checks to reduce or stop the distribution of content that was objectively false and/or biased beyond what was known by the user. For example, readers of the Boston Herald and the Boston Globe would be aware of the former being more "conservative" and the latter being more "liberal," but each of these local papers was staffed by professional journalists who operated under the standards and practices of their profession.

It would be appreciated that prior to the rise of delivered user content via newsfeeds, etc., the onus was typically on the user to understand the tone and tenor of the information they received. It was certainly possible for objectively false or biased information to be consumed by them, however, quite simply, there was a whole lot less content available. Thus, the average user could handle the content moderation aspects of her personal information consumption more efficiently and, generally, effectively due to the relatively lower volume of content that she needed to manage as compared to that which is evident in today's environment. The exponentially greater amount of content deliverable to her today is, of course, exacerbated by the fact that such content can be socially engineered to increase her emotional satisfaction with that same content. It follows that many, if not most, news consumers may not be able to escape from being presented with objectively false or intentionally biased news and information. These types of algorithms can create a "news literacy" issue because if readers do not realize that they are influencing their own content delivery, they cannot make critical decisions about what they choose to read. In the print world, partisan media was transparent about its biases, skew, or viewpoint or, at a minimum, these could be better seen with the relatively lower volume of news sources. Readers could therefore select which news sources they preferred while also understanding or recognizing an underlying ideological or political viewpoint present in the news sources generated therefrom. Today, readers do not typically realize how the news selection algorithms are biased, skewed, or not viewpoint neutral and how the filters that select the content for them are nuanced to deliver some content to them but not others for an intended purpose.

US Patent Publication No. 2019/0082224, the disclosure of which is incorporated herein in its entirety by this reference, attempts to check the appearance of bias in news delivery by including user ratings of bias, with more of those users or groups having a history of "more objective" ratings being given more weight in the delivery of bias, skew, or viewpoint ratings. The use of human raters nonetheless reduces the overall applicability of this methodology because content has to be rated by enough people before any computer-generated bias, skew, or viewpoint rating can be checked by human supervision. Such processes also work retrospectively and, as such, cannot suitably address "breaking" or current news that should be reported on in real-time or near-real time. Moreover, any assessment of a person or group of persons being more or less "biased" is subject to manipulation by anyone—or any "bot"-seeking to influence the results.

Similarly, US Patent Publication No. 2018/0239832, the disclosure of which is incorporated herein in its entirety by this reference, provides a similar methodology to assess "veracity" of news. Various methodologies are used to determine whether something is, or is likely to be, "fake news." Natural language processing (NLP) of news stories, historical information about sources and reporters, and ratings by humans are used. A user's newsfeed can be managed by allowing (or not) display of news that is likely to be "fake" or of a low "veracity." However, this methodology would appear to work on the unproven assumption that the "wisdom of crowds" can remove or at least reduce falsity and/or bias in a newsfeed presented to a user. Such processes also work in retrospect and, as such, cannot suitably address "breaking" or current news that should be reported on in real-time or near-real time.

One type of AI-based method proposed to address objectively false or ideologically/politically biased content delivery to users by the addition of at least some human reviewers is disclosed in US Patent Publication No. 2019/017861, the disclosure of which is incorporated herein in its entirety by this reference. The method therein uses artificial intelligence methodology to analyze content in "customizable intelligence channels" that are associated with experts who can assess the veracity of content, where the veracity ratings can be provided with the content delivered to a user who creates that channel. Unfortunately, this methodology can only address a relatively small number of categories for type of content and is appropriate for only a small subset of news content consumers. Moreover, each of these "customizable news channels" will comprise a siloed amount of news moderated by experts who can reasonably be expected to reject outlier opinions and participants, thus resulting in a form of bias-laden content being delivered to users. Such processes also work in retrospect and, as such, cannot suitably address "breaking" or current news that should be reported on in real-time or near-real time.

US Patent Publication No. 2019/0179956 ("the '956 Publication"), the disclosure of which is incorporated herein in its entirety by this reference, discloses a variety of automatically generated ratings for a content moderation system. This methodology assesses the domain, the author, and the content itself to generate an overall reliability rating for the content, where that rating is presented to the user. While this methodology may appear to provide the user with some form of autonomy in accepting or rejecting content based upon the ostensibly objective assessment of reliability provided by the ratings, the user is provided with no ability to review and judge bias. Moreover, the focus on accumulated knowledge about a source to generate ratings for content skew the ratings to against newer or less well-known sources. Such sources may, in fact, be the most reliable purveyors of certain information, even while the methodology of the '956 Publication rates them the opposite. Of course, the fact that an algorithm controls the moderation of the content will preclude those not trusting automated content delivery from fully accepting this methodology. Such processes also work in retrospect and, as such, cannot suitably address "breaking" or current news that should be reported on in real-time or near-real time.

Notably, whether or not an AI-based content moderation and delivery methodology operates with or without human supervision, each is premised on the assumption that a user is not capable of, or may not be interested in, moderating content as it is delivered to her. In short, each of the methodologies assumes that the right approach to managing objectively false or ideologically/politically biased content on the internet is to provide the user with a "Virtual News Nanny" that either wholly manages or assists in managing the news content delivered to her. While this might be true for many people, others may not desire such content control, either because they do not trust those who are delivering the content to them and/or they believe that they possess the critical thinking skills enable them to generate their opinions about content delivered to them. For these former users, no type or amount of algorithmic control of their feeds will likely suffice to make them amenable to delivery of content from some sources or publishers. For the latter users, their greatest need is for assistance in managing the veritable "firehose" of content available for them to read.

Rather than providing a news consumer with a "Virtual News Nanny" to manage her newsfeed, it can be beneficial to deliver news along with objectively determined reliability (e.g., tendency toward "truthfulness") and bias (e.g., tendency toward skew to a particular political or ideological viewpoint) ratings generated by services that reveal their methodology for making such reliability or bias assessments. Various reliability and bias assessment systems are available today.

However, the current fact checking enterprise involves independent third-party reviewing agencies, which are only able to select a small portion of the overall content produced. To this end, the primary method for fact checking involves a group of researchers associated with a particular agency (e.g., Snopes.com, FactCheck.org, etc.) reviewing an already published news item to conduct research to verify the underlying assertions. For example, when a person sees a new story in her feed, she can review whether it is true or not on Snopes.com. The value of this is limited by the number of stories that fact-checking platforms have actually fact checked, as well as the diligence of someone to go the extra step to check as they ingest a news story. Fact checking is a time intensive process and a review by one of the fact checking organizations is only typically released after users have already interacted with the content. As a result, only a very small portion of content is subjected to external fact checking prior to consumption by a user. Even more problematic is that popularity or "virality" often drives the content fact checkers target. Thus, by definition, a large group of consumers must have already viewed the content before the fact check even begins, and objectively false or inherently biased news source items may have already done damage by becoming part of people's belief systems or opinions. Moreover, if someone is already pre-disposed to believe something based on her inherent bias or belief system, the ability to check such websites will be of little relevance because her "lie detector" will not be activated when she reads a news story that aligns with her beliefs and opinions. Such processes also work in retrospect and, as such, cannot suitably address "breaking" or current news that should be reported on in real-time or near-real time.

U.S. Patent Publication US2017/62592397, the disclosure of which is incorporated herein in its entirety by this reference, provides methodology to allow a user to gauge the bias of a news source. While providing bias or skew information about different news sources, the user is required to both find and internalize this information when confronted with each news story. Moreover, when presented with a new story from different sources, she will have to be able to mentally assess the relative bias or "spin" of each of the sources in real time, if she even goes through the effort of doing so.

Yet further, Allsides.com, a product that appears to be disclosed in U.S. Pat. No. 9,285,973, the disclosure of which is incorporated herein in its entirety by this reference, provides news readers who go to its website with multiple reports of a single story, namely, "left," "center," and "right." Notably, this website does not provide news stories as they are reported in real time or near real time and this methodology is limited in the scope and content of news content delivered to users. Also, "all sides" in relation to this news curation product appears to mean "left," "center," and "right" on a representative ideological or political spectrum. It follows that news that is not subject to reporting from each of these perspectives will not be identified for display to a user. This could mean that news from an ideological perspective that is not reported will not be presented to a news consumer on this curation platform because it cannot be presented from "all sides." As such, this product is not broadly useful for those seeking a wide variety of news that is provided on a frequent basis.

A further product that has received attention is SmartNews.com. As understood currently, SmartNews.com is believed to rely heavily on machine learning algorithms to evaluate millions of articles, social signals and human interactions to deliver a selection of ostensibly "popular" or "important" stories that are notable at a specific time. Such important or popular stories are given as a selection level of the "top 0.01%." There is purported to be some alignment of stories presented to a user's prior activity, but there is a focus on curation for the user. This means that news event or topics that can typically appear at an early stage on highly localized locations or even on social media feeds may not appear on a SmartNews.com feed. Also, as reported by SmartNews.com's management, breaking news is identified by human reviewers, and there appears to be no plans to automate this process. (https://www.stateofdigitalpublishing.com/digital-platform-tools/news-apps-smartnews/retrieved Sep. 15, 2019). Accordingly, this reliance on a team of human reviewers to identify events or topics as being relevant for presentation of news content to users can impart bias to the news selection process which, again, means that such a news curation product can introduce mistrust into the news presentation process. Moreover, even assuming pure objectivity in these human reviewers, it can be expected that there is no way that human reviewers can realistically identify all events that are notable for reporting across all sources given the shear number of articles and feeds that will need to be reviewed to make the determination in real time. Smartnews.com cannot therefore not suitably address "breaking" or current news that should be reported on in real-time or near-real time.

Moreover, political bias in articles presented in terms of "left," "center," and "right," may have limited relevance in context. Political ideologies do not always fit neatly into left/right boxes. For example, some governments partially or fully control the publication of news; news reports derived from such locations would not comprise a "viewpoint" or "bias" at least because the government agency controlling the content thereof would not allow a plurality of views that could be presented on a scale or continuum to be generated. In such circumstances, news source items published from such news sources could more properly be characterized along the lines of "government source" or the like in any ratings system. In other contexts, terms like "left," "right," and "center," and variations thereof would not be mirrored in relation to the political and/or social constructs from where the subject news reports are generated. As an example, in some countries, news sources might be associated with political leadership that does not lend itself to categorization in categories such as "left," "right," and "center." Thus, the inventors have found that a rating system that can appropriately associate itself with a specific news source or group of news sources in context could be helpful to allow a reader to better gauge the content of a news article or report in context.

Further, existing bias, skew, or viewpoint ratings cannot address the issue of intentional skewing of news to achieve a political, economic, or social goal. Misleading or out-of-context information does not on its own constitute "fake news." This kind of information is not wholly fabricated, and it can exist within a news report that is based on actual events that occurred. "Hyperpartisan" sites often share a combination of objectively false news and posts that simply contain misleading information or lack proper context due to editorial choices made by those generating and propagating the news source item. These are websites, social media pages, or accounts designed to spread information presented through a highly partisan, biased lens. Hyperpartisan websites or Facebook pages may share a combination of objectively truthful and highly partisan content (misleading stories, partisan memes and videos, etcetera) that is not considered "fake news," but could still contain misleading or out-of-context information designed to confirm or promote a particular ideological view. Hyperpartisan pages and accounts are often fake news purveyors that generate shares and clicks in order to either push a particular political view or profit from user engagement on social media platforms. Widely shared stories that contain misinformation but do not necessarily rise to the level of "fake news" can feed the larger ecosystem by creating a friendly audience for fabrications; that is, readers may effectively be "primed" for receipt of misinformation and propaganda. Existing news and information delivery products are not currently able to effectively address this problem.

News sources may also comprise a bias, spin, or viewpoint that may not be appropriately characterized as "political." News sources that are generated for a particular audience (e.g., specialized periodicals, trade magazines etc.) are written with what could be identified as "bias," "spin," or "viewpoint" by virtue of their subject matter, intended audience, author, writing style, etc. A person who is reading such audience-specific publications may not know how to properly interpret the content. To this end, many news sources that would not be considered by the general public to report "news," may in fact report information that is "news" for a particular group or category of users, albeit with a "bias," "spin," or "viewpoint" that is relevant in context.

As one example, the Chronicle of Higher Education reports "news" relevant to colleges and universities. The "news" reported by this periodical will typically address policies and agendas of institutions of higher learning in the US, as well as throughout the world. To the extent that articles published in the Chronicle of Higher Education would have a "bias," "spin," or "viewpoint," it would be towards the reporting of news that is relevant to administrators and professors at universities. If a person who is not familiar with the reporting framework of this periodical was presented with an article from this periodical in a collection of news sources, they could be benefitted also being presented with an objective rating of a bias, spin, or viewpoint for the subject article as being toward topics that may be relevant to the higher education community. Again, existing news and information delivery products are not currently able to effectively address this problem.

Similarly, a trade magazine would typically not be classified as having a "left" or "right" bias, skew, or viewpoint. However, there could arguably be a "bias," "spin," or "viewpoint" directed toward news or other information that promotes the products or technologies of companies that are associated with the intended readership of the publication. While articles published in trade magazines may in fact be fully truthful, an article from a trade magazine could be considered to have a "bias" that is in the context of the types of articles/subjects featured, the writing style of the authors, or the opinions in the editorials. When articles or reports from such sources are returned to a user, it could be helpful for the user to be presented with a rating or classification that provides information can provide insight into any inherent bias, spin, or viewpoint that is relevant to the trade magazine in context. No method exists to do this today, A further example can be a peer-reviewed scientific journal. Typical readers of such journals would be expected to read and understand the often-extensive qualifications that are explicit and implicit in the conclusions made in these articles. However, it has become common for information traveling around the internet to be republished again and again, often with a reduction in context and accuracy over time. If a scientific conclusion is generated from a medical journal—for example, if a particular medicine is effective against Covid-19 symptoms—it could be useful to accompany a headline reporting such information along with additional details that put the information in that article in context for the reader so that he conclusions therein are less likely to be misinterpreted. Existing news and information delivery products are not currently able to effectively address this problem.

Recently, it has become evident to political and social leaders, as well as many concerned citizens and the general public, that the ability to influence opinions and behaviors of the public can be a very powerful tool. While some entities will continue to utilize and improve the tools for their own political, social, or commercial benefits, others are seeking to reverse the trend of decreasing objectivity and critical thinking that often results from siloed information delivered via algorithms that are focused on user engagement and emotional appeal. To date, however, there has not been a way to address news and information delivery from the increasingly large body of news sources from which relevant news source items can be delivered for a news event or topic that may be of interest to a news consumer where such delivered news source items are also associated with information about bias, skew, and viewpoint that can be assessed by the user in real-time or substantially real-time.

To this end, there remains a need for improvement in products and technologies that identify and deliver news and information to users, in particular when such information is included in social media content in user feeds. In particular, there is a need for a news and information delivery systems and methods that can allow news source items describing news events or topics of interest to be automatically recognized from a large number of news sources in a timely manner for use thereof in newsfeeds, or for use as other forms of information, while at the same time enabling a user to better and more easily assess a bias, skew, or viewpoint associated with each of the news source items displayed in the newsfeed. This disclosure provides this and other benefits.

SUMMARY OF THE DISCLOSURE

Aspects of the present disclosure are related to generation of information about news source items from a corpus of news sources, wherein the identified news source items describe or are otherwise associated with a news event or topic of interest. In one aspect, among others, a method of generating information about a news event or topic of interest comprises providing, by a computer, a corpus of news sources comprising a plurality of individual news sources; recognizing, by the computer, a news event or topic in the corpus of news sources that has not previously been recognized in a news source in the corpus of news sources, thereby generating an orphan news source item; determining, by the computer, if the orphan news source item is derived from an individual news source that has an assigned rating and, in response to having the assigned rating, creating, by the computer, a first news event or first topic of interest; determining, by the computer, a first time for the first news event or first topic of interest, wherein the first time is derived from either or both of the orphan news source item or the corpus of news sources; analyzing, by the computer, the corpus of news sources for one or more additional news source items that also describe the first news event or first topic of interest, wherein the analysis is conducted by comparing information associated with the orphan news source item with information associated with at least some of the news source items included in the plurality of individual news sources in the corpus of news sources; identifying, by the computer, at least one additional news source item describing the first news event or first topic of interest and, if the at least one identified additional news source item is from an individual news source having an assigned rating, incorporating the at least one identified additional news source item in a first collection of news source items comprising the orphan news source item and any identified additional news source items describing the first news event or first topic of interest; and generating, by the computer, information associated with the first collection of news source items describing the first news topic or first news event of interest. Each of the plurality of individual news sources can be configured to provide news source items describing news events or topics; and at least some of the plurality of individual news sources can be each, independently, assigned a rating. The generated information can be suitable for incorporation in one or more of: a newsfeed item in a newsfeed configured for display on a user device; a printed or displayed report; a dashboard configured for human review; and/or an information set configured for use in machine learning processes.

In various aspects, the comparison with at least some of the news source items or the incorporation of at least one identified additional news source item can be at least partially reviewed by a human prior to the generation of the information for the first collection of news source items. The generated information can comprise one or more of: a location or region associated with the first news event or first topic of interest; an origination location or region for a news source having a news source item incorporated in the first collection; an identity of a news source owner, publisher, or author associated with a news source having a news source item incorporated in the first collection; an identity of an author, reporter, or byline for a news source item incorporated in the first collection; a time or date of publication for a news source item incorporated in the first collection; a number of news source items previously published by a news source having a news source item incorporated in the first collection; a presence or absence of a news source item describing the first news event or first topic of interest for one or more news source rating categories; an age or duration of a news source having a news source item incorporated in the first collection; a number of instances of false news reports associated with a news source having a news source item incorporated in the first collection; a number of previous news source item corrections or updates associated with a news source having a news source item incorporated in the first collection; and/or a number of edits or republications for the orphan news source item in one or more news sources to generate one or more additional versions of the orphan news source item.

In some aspects, the method can further comprise analyzing, by the computer, the corpus of news sources for further news source items describing the first news event or first topic of interest; identifying, by the computer, one or more of the further news source items describing the first news event or first topic of interest; and adding, by the computer, each of the one or more identified news source items to the first collection when that identified news source item is from a news source having an assigned rating from a list of ratings. The method can further comprise generating, by the computer or by a human, a time period of interest associated with news source items in the first collection; and generating, by the computer, information for the first news event or first topic of interest associated with the time period. The method can further comprise identifying, by the computer, an unrated news source in the corpus of news sources that does not have an assigned rating; generating, by either or both of the computer or a human reviewer, a rating for the identified unrated news source; and assigning the generated rating to the identified unrated news source.

In one or more aspects, the information associated with the first collection of news source items describing the first news event or first topic of interest can be generated as the newsfeed item, wherein the newsfeed item is configured for display on the user device and, when displayed, the newsfeed item information can include: an automatically generated text summary for the first collection, wherein the text summary provides a description of the first news event or first topic of interest; and news source names and assigned ratings for each of the news sources from which the news source items in the first collection are generated. Each of the news source names in the newsfeed item can be configured for individual selection by a user, and in response to selection of a news source name in the newsfeed item, the news source item describing the first news event or first topic of interest can be provided for display on the user device. The orphan news source item is generated from the corpus of news sources independently of identification of the news event or topic as trending on a social media platform or on a news event or topic aggregation platform; and human selection or curation.

In another aspect, a method of generating information about a first news event or first topic of interest comprises providing, by a computer, a corpus of news sources comprising a plurality of individual news sources, wherein each of the plurality of individual news sources is configured to provide news source items describing news events or topics; identifying, by the computer or by a user, a first news source item describing a selected first news event or first topic from the corpus of news sources; generating, by the user or the computer, a first news event or first topic of interest associated with the first news source item; generating, by the computer, a first time associated with the selected first news event or first topic; analyzing, by the computer, the corpus of news sources to identify one or more additional news source items describing the selected first news event or first topic, wherein the analysis is conducted by comparing the first news source item with news source items in the corpus of new sources; generating, by the computer, a first collection of news source items describing the selected first news event or first topic, wherein the first collection of news source items comprises the first news source item and any identified one or more additional news source items that also describe the selected first news event or first topic; and generating, by the computer, information associated with the first collection of news source items. The generated information can be suitable for incorporation in one or more of: a newsfeed item in a newsfeed configured for display on a user device; a printed or displayed report; a dashboard configured for human review; and/or an information set configured for use in machine learning processes.

In various aspects, the identification of the first news source item can be by the computer and the computer identification can comprise recognizing, by the computer, that the first news source item has not previously been identified as describing a first news event or first topic. The first collection of news source items can comprise only news source items derived from news sources that have been assigned at least one news source rating. Comparison with at least some of the news source items or incorporation of at least one additional news source item to the first collection of news source items can be at least partially reviewed by a human prior to the generation of the information for the first collection of news source items. The method can further comprise sorting, by the computer, news source items in the first collection of news source items according to each of a plurality of news source rating categories; and generating, by the computer, information associated with a number of news source items in the first collection for each of the plurality of news source rating categories. When a news source item is from a news source that has not been assigned a rating from a news source rating category, the method can further comprise generating, by either or both of the computer or a human supervisor, a rating for the news source from the rating category; and assigning, by the computer, the rating to the news source.

In some aspects, generating the generated information can comprise analyzing, by the computer, the news source items in the first collection to generate information associated with one or more of: a location or region associated with the first news event or first topic; an origination location or region for a news source having a news source item incorporated in the first collection; an identity of a news source owner, publisher, or author associated with a news source having a news source item incorporated in the first collection; an identity of an author, reporter, or byline for a news source item incorporated in the first collection; a time or date of publication for a news source item incorporated in the first collection; a number of news source items previously published by a news source having a news source item incorporated in the first collection; a presence or absence of a news source item describing the first news event or first topic for one or more news source rating categories; an age or duration of a news source having a news source item incorporated in the first collection; a number of instances of false news reports associated with a news source having a news source item incorporated in the first collection; a number of previous news source item corrections or updates associated with a news source having a news source item incorporated in the first collection; and a number of edits or republications for the first news source item in one or more news sources to generate one or more additional versions of the first news source item. The identification of the first news source item can be by the user, and if the user identified first news source item has not been previously recognized in the corpus of news sources, the user-identified first news source item can be classified as an orphan news source item. The method can further comprise incorporating, by the computer, at least one additional news source item describing the selected first news event or first topic in the first collection, wherein the at least one additional news source item is identified from analysis of the corpus of news sources over a time period of interest; and generating, by the computer, information associated with the first news source item and the at least one additional news source item describing the first news event or first news topic over at least some of the time period.

In one or more aspects, the information associated with the first collection of news source items can be configured as the newsfeed item configured for display on the user device and the displayed newsfeed item information can include: an automatically generated text summary for at least some of the news source items in the first collection; and news source names and any assigned news source ratings for each of the news sources having one or more news source items in the first collection. The assigned news source ratings can be associated with one or more of a location or region associated with the first news event or first topic; an origination location or region for a news source having a news source item incorporated in the first collection; an identity of a news source owner, publisher, or author associated with a news source having a news source item incorporated in the first collection; an identity of an author, reporter, or byline for a news source item incorporated in the first collection; a time or date of publication for a news source item incorporated in the first collection; a number of news source items previously published by a news source having a news source item incorporated in the first collection; a presence or absence of a news source item describing the first news event or first topic for one or more news source rating categories; an age or duration of a news source having a news source item incorporated in the first collection; a number of instances of false news reports associated with a news source having a news source item incorporated in the first collection; a number of previous news source item corrections or updates associated with a news source having a news source item incorporated in the first collection; and a number of edits or republications for the first news source item in one or more news sources to generate one or more additional versions of the first news source item. The first news source item can be generated from the corpus of news sources independently of: identification of the news event or topic as trending on a social media platform or on a news event or topic aggregation platform; and human selection or curation.

Additional advantages of the present disclosure will be set forth in part in the description that follows, and in part will be apparent from the description, or may be learned by practice of the present disclosure. The advantages of the present disclosure will be realized and attained by means of the elements and combination particularly pointed out in the appended claims. It is to be understood that both the foregoing general description and the following detailed description are exemplary and explanatory only and are not restrictive of the present disclosure, as claimed.

DETAILED DESCRIPTION OF THE DISCLOSURE

Figure 1:
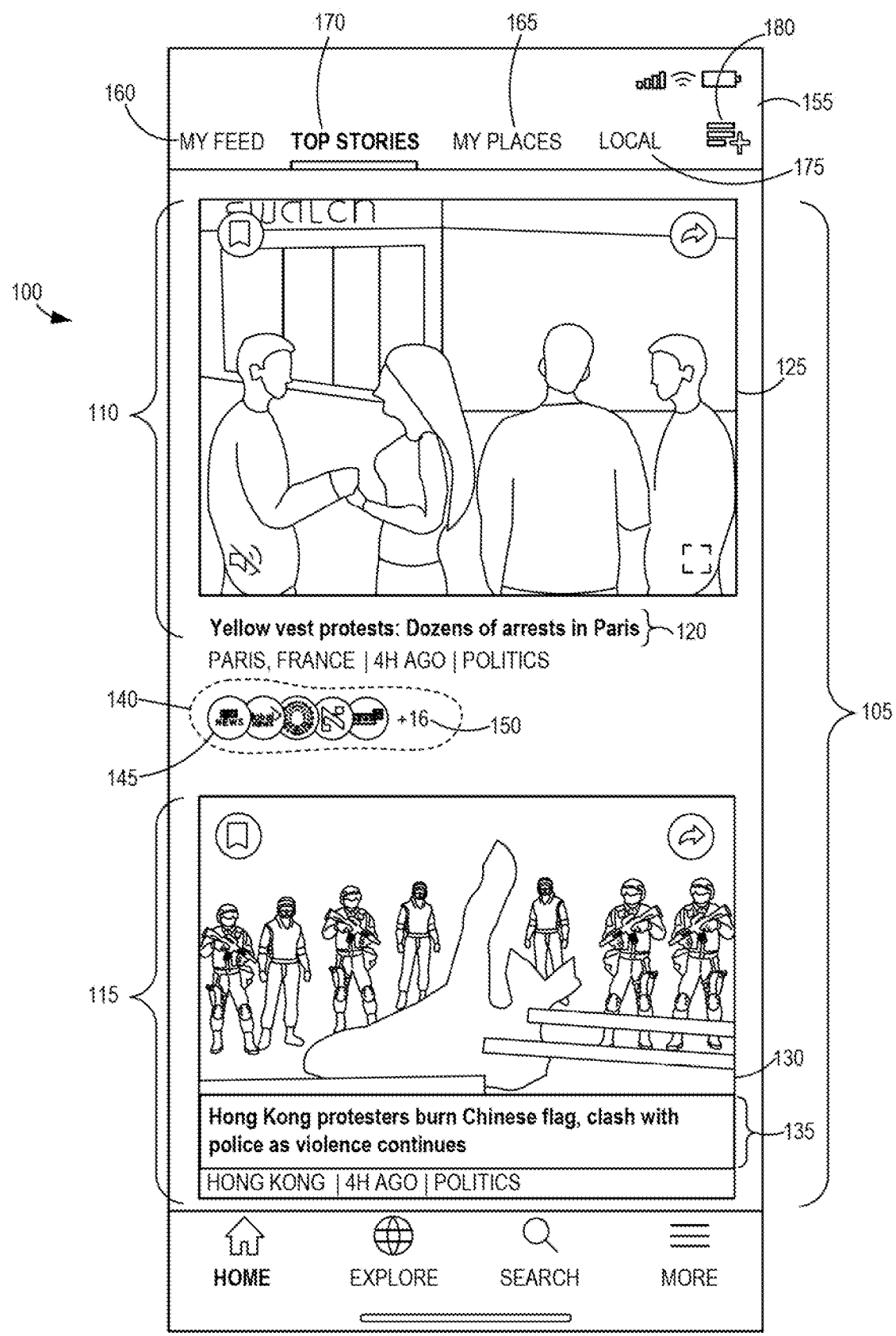
FIGS. 1-9 illustrate various implementations of the methods and systems herein, in accordance with various embodiments of the present disclosure.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The term "substantially" is meant to permit deviations from the descriptive term that do not negatively impact the intended purpose. All descriptive terms used herein are implicitly understood to be modified by the word "substantially," even if the descriptive term is not explicitly modified by the word "substantially."

As used herein, the term "news sources" is meant to be expansive and can include a written reporting, video reporting and audio reporting from corporate publishers that are known for written reporting that spans international, national, and local news in context (e.g., The New York Times, The Wall Street Journal, Time Magazine, The Boston Globe, The Miami Herald, The London Times etc.), video news sources (CNN, NBC News, Fox News, YouTube, etc.), radio news (BBC News, NPR, local radio stations, etc.), and online news aggregations platforms (HuffPost, Raw Story, The Daily Beast, Brietbart News, etc.), blogs, etc. Interest-based news publishers are also incorporated as new sources (e.g., TechCrunch, Wired, MotorTrend, Cosmopolitan, Vogue, Chronicle of Higher Education etc.). Scientific or medical journals, as well as trade publications are also included herein as new sources. Social media feeds incorporating news and information, such as by persons or organizations, (e.g. "content moderators" or "content curators") can also comprise "news sources."

As used herein, "byline" means a named author of a news source item. In some contexts, the "author" can also comprise a content moderator. As would be appreciated, news sources typically employ a plurality of authors, and such employed authors can have varied ideological or political viewpoints. For example, the New York Times is known for employing "conservative" and "liberal" columnists, as well as some reporters who can, for some readers, be viewed as more or less objective. Thus, it can be beneficial to include a bias, skew, or viewpoint rating for bylines for some readers. A "byline" can also apply to a news source that is generated in whole or in part by a computer. Such machine-generated news reports, which can be termed as "bot-generated" news, can be biased or skewed based upon the configuration of the underlying algorithm. The "byline" in such a case may be a fictitious name for a reporter, or the news source may be assigned to unspecified "staff," among other options. In other contexts, an author or group of authors can be a "byline." For example, individual or teams of researchers can be identified, such as when listed as authors on a scientific or medical publication.

The form of the "news source items" incorporated herein is also expansive and can include material such as news articles, magazine articles, journal articles, blog posts, photographs, videos, audio, and combinations thereof. "News source items" include published articles that include only text and text articles that include images and videos embedded therein, as well as stand-alone images and videos. Audio can be extracted from podcasts and video and converted to text using known methods. Optical character recognition can be used to convert text in images to text that can be ingested into clustering processes. Readily available translation software, such as Google Translate, can suitably be used to normalize content to a particular language (e.g., English) so that categorization, news event or topic identification, clustering, summary generation, etc. can suitably be conducted, as such are described hereinafter. In other contexts, a news source item can comprise a collection of items that are assigned a title for the collection (e.g., Getty Photos).

For each of these types of news source items, the title and attributes such as timestamp, source derivation, geolocation, IP address information, editing history, etc. can be derived from metadata to provide useful information. The relationships of the news sources items to the news source from which they are derived can also be useful, as well as the relationships of different news source items in and between collections can also be relevant.

A "news event or topic" can be defined as information that is newsworthy about events/happenings or subjects/topics, especially as reported or included as published or derived content by a news source. From a news consumer perspective, the term "newsworthy" will be highly contextual in nature in that what is "newsworthy" can be highly dependent on the personal characteristics of the news consumer such as her demographics, age, family situation, location, profession, interests, education level, financial situation, among other things. From the professional journalism perspective, five factors can be evaluated in the determination of whether an event is "newsworthy:"

1: Timing: how new is the topic or content;
2. Significance: how relevant is it to a group or class of people;
3. Proximity: where is the news in relation to or how relevant is the news to the person consuming the news;
4. Interest: how important is the person or group of people for whom the news is about; and
5. Human interest: does the news appeal to emotion.

When an editor needs to decide whether to generate a potential news source item describing a first news event or first topic, she normally will consider how well the subject news content meets each of these criteria. Normally, a news source item should perform well in at least two areas for it to meet the standards for publication by a professional journalist or journalistic publication in context.

In addition to the contextual aspects of newsworthiness for a news item generated by a professional journalist, the business model of a news publisher will come into play in that some publishers focus on certain topics (e.g., general news, financial news, political news, scientific and academic research, entertainment news, etc.). It follows that something that is "newsworthy" for a financial publication may be wholly "un-newsworthy" for an entertainment magazine or an academic publication. In some aspects, the topic or topics that are generally associated with a news source can be used, as least in part, to generate the bias, skew, or viewpoint rating for that news source.

News can also often be reported on an early, or "breaking," basis by people who may be considered to be "journalists" in that they are providing relevant content about recent events or happenings, but who have not obtained formal training in journalism. Such "citizen journalists" may be "on the ground" before a professional journalist reaches the location to report on the event or to otherwise obtain access to information about a news event or topic.

As would be appreciated, a "news event" can also be a "news topic" in some contexts. For example, in 2016, Colin Kaepernick, a US professional football player, kneeled during the playing of the American National Anthem during a football game. Mr. Kaepernick's action of kneeling during the anthem was a "news event" that was discussed extensively in the US for several years. The propriety of Mr. Kaepernick's action of kneeling was also discussed as a "news topic" for an extended period. Similarly, the Black Lives Matter Protests in the US and in many countries of the world in the Summer of 2020 were "news events" in the context that each happened on a day and at a location that was identifiable, and the Black Lives Matter Protests were also discussed as a "news topic" in the context of why the protests were happening and whether the protesters were justified in their actions. When distinguishing between a similarly named "news event" and "news topic" is relevant in the context of the methodology herein, the news source items can be analyzed to assess the context of the reference. For example, a news source item that discusses a Black Lives Matter Protest in the context of a daily news report may be formulated with minimal, if any, language from which an opinion for or against the subject can be inferred. This is how most journalistic outlets will endeavor to present the reporting of a news event on a factual basis (e.g., Associated Press, Reuters, BBC etc.). In contrast, a opinion-based news source item can often be formulated with language and sentiment that imparts a bias, spin, or viewpoint—be it derived from one or more of the news source, the author/reporter, etc.—on the subject matter. The methodology herein can be configured over time to distinguish between "news events" and "news topics," especially when training models have been generated by a human reviewer to allow improvements in the analysis of the news source items in the corpus of new sources.

Information does not have to be "fake"—that is, objectively false—to pose a problem in context. Objectively truthful information can be undesirable in some contexts if it is presented with a "bias," "spin," or "viewpoint," that overtly imparts the opinion of the writer or publisher into the content. To use an analogy, someone from South Florida may feel that a temperature of 50 degrees F. is "cold," and so news reporting this temperature may indicate that it will be a "cold" day. However, someone from Toronto may feel that this temperature is quite balmy and, as such, may find the subject weather report "biased." An "objective" weather report may often be contextual: a South Floridian may find the report of "cold weather" unbiased. If the person only reads weather reports focused on South Florida, she may develop a point of view about weather that is only relevant to her location, and she may remain uninformed about weather generally. Thus, the "falsity" of a news source item or a collection of news source items vis a vis a news event or topic of interest can be contextual.

The present disclosure includes news source items that are generated from and/or are derived from news sources that have been incorporated into a database, or "corpus," of news sources, as it can be expected that these already profiled news sources would normally be arbiters of "newsworthy" events given their general reliance on journalistic principles. Still further, the present disclosure includes news source items that are generated from "non-traditional" journalists and publishers, such as by "citizen journalists," so long as the content therein can be associated with an identifiable news event or topic that may be of interest to a news consumer in context. Other types of news sources that can provide news and information to users that is relevant in context, such as scientific journals with articles written by scientists, are also pertinent to the present disclosure. Whether something is associated with an identifiable news event or topic will become clear in the context of the following disclosure.

In a first aspect, the present disclosure provides systems and methods for delivering to users a collection of news source items that are related to or are associated with a single first news event or first topic. A news source item describes, or is associated with, (collectively "describes") a single first news event or first topic by its subject matter or topic and the temporal context of the item, as set out in more detail herein. Each collection of news source items describing a first news event or first topic of interest can delivered to the user in a newsfeed display viewable by on a mobile device (e.g., smartphone, smartwatch, tablet, laptop, or the like) or the generated information can be useable in other forms.

As discussed further hereinafter, the methodology is useful to generate information about news events or topics of interest. In a broad implementation, the disclosure provides a method of generating information about a news event or topic of interest by providing, by a computer, a corpus of news sources comprising a plurality of individual news sources. Each of the individual news sources is configured to generate news source items describing a news event or topic of interest. Because it can be relevant to have an understanding of the bias, viewpoint, spin, context, objectivity etc. of one or more of the news sources from which the news source items can each, independently, be assigned a rating from a list of ratings as discussed later in the disclosure.

An improvement herein is the ability to recognize a news event or topic directly from the corpus of news sources. When a previously unrecognized news event or topic is recognized in a news source, an "orphan news event or topic' can be created automatically by the computer. Once the orphan news event or topic is created, the corpus of news sources can be searched for additional news source items that also describe the same news event or topic as the orphan news event or topic. In other implementations, the news event or topic of interest can be selected by a user, as discussed hereinafter.

In implementations, a plurality of news source items describing a news event or topic of interest can be incorporated into a collection of news source items. Information associated with the collection, the news event or topic of interest, the news source items in the collection, and/or the news sources from which the news source items are generated can be configured as useful frameworks including as newsfeed items in newsfeed configured for display on a user device, printed or displayed reports (e.g., the "blind spot report" discussed hereinafter), as dashboards configured for review of various types of information of interest, and as information sets configured for use in machine learning processes.

To enhance the utility of information generated from the methodology herein, various time periods can be generated for either or both of the news event or topic and the news source items so as to generate temporal context for the news event or topic of interest itself or for the treatment or sentiment of the news event or topic by news sources as shown by a plurality of news source items generated over time.

When configured in the form of a newsfeed for display on a user device, the information can allow the user to scroll through her delivered newsfeed to view a generated textual summary of the identified or selected news event or topic. The textual summary can be derived from a news source item by selecting or extracting one or more sentences from the opening paragraph or "the lede" of a first news source item—that is, the "orphan" news source item from which a news event or topic is identified, or a news source items identified based on a user selection of the news event or topic of interest. Generally, a topic for a subject news event or topic will be present in this first paragraph and, as such, the summary can be an optimal place from which to generate the newsfeed summary. At times, it can be beneficial to replace a "breaking" news summary that is from a news source item published early in the occurrence of the first news event or first topic with one derived from a news source item published at a later time. Such summaries can also be incorporated into printed or displayed reports, viewable in dashboard configurations, and as components of information sets suitable for use in machine learning processes.

In some implementations, a news source in the corpus of news sources is assigned a rating from a list of generated ratings that is appropriate to a new source type in context. The ratings used herein can be expansive. In this regard, the generated ideological ratings can be in relation to an ascribed political viewpoint (e.g., far right, right, center right, center, center, center left, left, far left) as such terms are generally known. In some use cases, the ratings can be assessed in relation to 14 different "ideological bias" framings as framed by the BridgeAlliance.org (https://www.bridgealliance.us/beyond_left_vs_right_14_types_of_ideological_bias) (retrieved Aug. 21, 2020):

Authoritarian versus Libertarian. Policy positions often deal with the trade-off between authority and liberty. What personal freedoms should people be willing to give up to create order and flourishing in society? Many, some, none at all? Which ones? To what degree should people follow a strict adherence to authority, specifically the authority of the government? In non-limiting examples, social and economic issues that fall along the authority-liberty matrix are many: border control, abortion, marijuana legalization, plastic bag bans, occupational licensing, building permits, gun ownership—these are just a few examples of issues where one's stance may be biased toward authority or liberty.

Individualist vs Collectivist. How do people balance individual interests with what's good for the group? Is the individual the most basic unit of society, the unit for which people should maximize freedom? Or is the most basic unit of society the family, or some other group? How do people balance tendencies that often feel at odds? As would be appreciated, "individualism" and "collectivism" can be associated with issues of authority and liberty. An individualist may not want to give up personal freedoms to benefit the collective, while someone who values collectivism more may be willing to do so. News sources that are generated from either of these frameworks can often be seen as presenting the readers with information "biased" or "skewed" in favor of either of these vantages.

Secular vs Religious. Should the government uphold morality as outlined in religious texts, such as the Bible? Is morality relative, or universal? Should a single religion be shared and practiced amongst members of a nation, or are religious beliefs unnecessary for a moral society that maximizes human flourishing?

Traditionalist vs Progressive. Traditionalists can be viewed as tending to believe prevailing norms and structures are the result of hard-won wisdom that has been handed down and should be preserved. Progressives may believe some traditions are outdated or no longer necessary, and that in order for humanity to move forward, people must dismantle or change those norms. Traditionalism and progressivism can be seen across many social issues in particular. Do people need more women in positions of economic and political power, or are women happier and better suited to home and community life? Do children have better outcomes in life when their mother stays home, or is it okay to send children to daycare? Should children have both a mother and a father, or are different family formations okay? News sources that are generated from either of these frameworks can often be seen as presenting the readers with information "biased" or "skewed" in favor of either of these vantages.

Elitist vs Populist. Populists can be seen as viewing members of the political, economic, cultural or media establishment ("the elite") as self-serving, corrupt, powerful figures who disregard or act in opposition to the concerns of everyday people. Populist groups may be based on class, ethnic, or national lines. Because major institutions of powerful are perceived as being concentrated in American coastal cities, people often hear about the conflicting values and ideologies powerful coastal elites" and "rural/middle America"—another way of framing elitism v. populism. A news report that incorporates a well-researched scientific conclusion may be considered to be "elitist," for example.

Rural vs Urban. Geography may impact or reflect political views. For example, the types of jobs concentrated in rural versus urban areas tend to differ—say, farmers versus financiers—which may signal or lead to differing ideologies, values, and stances on policy issues. An article or news report may be framed from how a national story, such as tariff conflicts between the US and Chinese governments, affect the financial and social aspects of farmers in rural areas. Moreover, such "rural" ideology may be wholly absent or misinterpreted from a news report that is generated from a new source that presents news from the vantagepoint of a what would be interesting to readers in a large population center. News sources that are generated from either of these frameworks can often be seen as presenting the readers with information "biased" or "skewed" in favor of either of these vantages.

Nationalist/Localist vs Globalist. Localism and nationalism typically are not classified together. However, these terms can be considered to be somewhat interrelated because they both reject the integration of people, companies, and governments on a worldwide scale (globalism). Someone who sees society as functioning better or not when governments plan, optimize for, and make decisions in the interests of local communities and nation states or on a global scale may determine possess a political bias in favor of or against globalism. Nationalists and localists generally reject decision-making that benefits global corporations or foreign capital rather than the citizenry and maintain the viewpoint (or "bias") that globalization erodes local identity and culture. On the other hand, proponents of globalism believe it offers economic benefits such as access to more goods and services and lower rates of poverty, and social benefits, such as sharing of cultures. News sources presented from a nationalist/localist vantagepoint will thus typically generate new source items that are "biased" or "skewed" toward favorability of policies or ideas that favor a nation or locality.

As would be appreciated, there can be overlap between the various categories above. For example, a "nationalist bias" may be associated with a "traditionalist bias" in the context of US policies and ideologies, if only because "globalism" is a more modern philosophy and thus, by definition, is "non-traditional." In some frameworks, a "religious bias" can be associated with a "traditionalist bias," if only because religiosity tends to be associated with a time when people adhered to religious tenets that tended to be more grounded in long-standing institutions. Nonetheless, oversimplistic categorization can lead to incorrect results. In this regard, "The Catholic Worker" is a publication that focuses on social justice, which would be considered a "progressive bias," even while the use of "Catholic" in the title could result in a conclusion that news source items generated from this publication might be skewed towards religion which some might consider to be "traditionalist," that is, more conservative. Thus, any automatically generated news source ratings, as well as any connections or relationships between ratings may be enhanced and, in some contexts, validated by at least some human review.

The news source ratings can also be generated, at least in part, by review of a plurality of news source items appearing in a news source. Such review can be within a single publication and/or longitudinally over a number of news source items published in that news source over time. In this regard, the content of the news source items published in a news source can be analyzed for one or more ideological viewpoints that can be associated with a useful rating. The authors, bylines, content moderators, etc. can also be assessed, with some authors or bylines having a known or expected ideological bias or viewpoint. The frequent appearance of a writer who is known to have a particular viewpoint without the appearance of writers who do not have a countervailing viewpoint can provide a signal that the subject news source may have an ideological bias that aligns with that of a frequently appearing writer who appears in the news source regularly. Information such as the type of content appearing in a news source and/or the frequency that an author having a known ideological bias appears in a news source can be automatically determined and a rating generated therefrom. However, in some implementations, it can be useful to have any automatically assigned ratings reviewed by a human supervisor to validate the automatically determined ratings.

Yet further, a generated rating can be enhanced by conducting a secondary review of a news source for any attempt by the publisher thereof to reduce the appearance of bias in the subject news source. To this end, some publications that have a strong bias or viewpoint can seek to reduce the appearance of bias by attempting to appear more "balanced." Such publications will republish, without editing, news source items from news sources that are understood to be "straight" or "unbiased" factual reporting sources. The appearance of such known factual reporting sources in a newsfeed could cause some search algorithms to generate a determination that a news source that includes news source items from factual wire services (e.g., AP, Reuters, etc.) may overall report news source items that are less skewed or biased toward a particular viewpoint (e.g., left, right, religious, etc.). To counter such a determination that might lead to an erroneous conclusion about a specific news source item, the rating generation system can be configured to search for republication of news source items from other sources and to provide an assessment of the amount and type of content that is republished and that which is likely to be of an editorial or opinion content. In this regard, the editorial or opinion content can be assessed to generate a rating therefore that is independent of the republished content. To the extent that content is republished without editing, the bias, skew, or viewpoint rating of the republished content can also be generated. A rating generated for such a news source can be provided. Human review of such automatically generated rating can be provided.

In some situations, the mix of republished material with editorial or opinion news source items can be from a local news source that does not have a national news presence. These local news sources may not intentionally seek to obfuscate their editorial bias, skew, or viewpoint, however, this may be the effect seen from automatic analysis of the news source items therein. Notably, however, these local news sources generally will also include local content that is factually based, albeit as original content. In implementations, the news source items appearing in a news source can be assessed for the type of news source items appearing therein to provide a news source rating. Again, some human review can be beneficial to validate or confirm any automatically generated ratings.

The generated list of ratings can also be associated with an academic framing (e.g., Chicago School of Economics vs. Keynesian School), or any other bias list (which can also be termed "viewpoint" or "framing") that would be relevant in context. The generated ratings can provide information of the source of the news source, for example, as being from an independent news publisher or as being generated from a government source. The rating can be associated with a business context for the news source, that is, as trade publication, a scientific or medical journal, or a "straight" news source. The generated rating can also be associated with whether a scientific article from which the news source item from which it is derived is peer reviewed and, if so, the apparent quality of such peer review (e.g., nature and characteristics of such peer review as identified by the publisher).

As with the ideology-based ratings discussed above, the connections or relationships between non-ideologically based ratings can be generated. For example, a medical article discussing the dosage and effectiveness of a drug that appears in a trade magazine may be characterized as "business or marketing related" and as "low level of peer review," especially when it can be determined that the author was paid to conduct the subject research by the institution that profits from the subject drug. Similarly, a peer-reviewed or peer-refereed article from a particular news source can be authored from an ideological framing. To this end, and as an illustrative example, research indicates that economists tend to research topics that are associated with their political or societal leanings. Thus, a well-peer reviewed article published in an economics journal authored by Nobel Prize-winning economist Paul Krugman on a specific research topic may be also be connected with a political bias rating of "left-leaning" because he is known to be quite liberal in his economic and political viewpoints. If analysis indicates that a particular peer-reviewed economics publication publishes more topics that are understood to be "left-leaning" by way of the content therein (e.g., Keynesian economics theories, Single Payer US healthcare, universal basic income recommendations, etc.), the economics publication can be automatically given a rating that reflects such a viewpoint or ideological framework. Again, over-simplistic characterizations based on algorithmic assessments can lead to incorrect characterizations of the subject news sources. Thus, at least some form of human supervision can be beneficial to better ensure the accuracy of the generated ratings and any connections generated between the ratings.

In order to obtain consistent information that can be useful for longitudinal comparisons among and between a plurality of news sources, it is beneficial that any bias, skew, or viewpoint ratings and any connections between ratings that are used in a particular context be both consistently applied in relation to the news source that is being rated and that the list from which ratings are generated be maintained consistently to ensure that that ratings characterizations are kept fairly regular over time. In relation to the latter, it can be beneficial to first generate robust news source rating lists or categories in the first order to reduce the need to re-assign ratings at a later date if the characterization was found to be flawed when the rating list was initially created. Moreover, it can be beneficial to re-evaluate the ratings lists and any connections therebetween from time to time. If corrections or edits are needed, any changes can be propagated throughout the corpus of news sources, as well as into news source items included in previous collections.

Turning back to the news summary generation and any information generated therefrom, given an observed higher likelihood that a news source item having a rating of "center" would incorporate a "more nuanced" summarization of an underlying news story, it can be beneficial to include a summary from a news source not having rating skewed to either the "left" or "right" direction in a collection of news source items relating to a news event or topic. In this case, and from time to time, the summary that was first presented to a user in her newsfeed or used in other summary format for a news event or topic can optionally be replaced with a second summary if the second summary is identified as being a "center" or "neutral" rating and the first summary was associated with a more "right-skewed" or "left-skewed" rating. For example, the news source item from which a first text summary associated with a collection of news source items was generated can remain as a news source item in the collection of news source items in her newsfeed along with display of an associated rating that is generated from another new source item that is determined to be less biased, skewed, or directed toward a viewpoint. Such news event or topic summary review can also be at least partially be generated by a human reviewer trained to identify sentiment and/or bias in news source items. Yet further, a machine learning system can be configured to review generated summaries for a collection of news source items for a collection of news source items. Still further, a machine learning system can be trained to flag a text summary that has been generated if it comprises language that may be indicative of bias, skew, or viewpoint that is of interest to identify in a feed. In this regard, a human user can review such flagged information for review. The bias, skew, or viewpoint of interest can be selected by a user, for example.

The generated textural summary of the collection of can be presented to a user with an image that is derived from one of the news source items in the collection of news source items describing a news event or topic of interest. For each news event or topic, a collection of news source items generated therewith can comprise one or more individual news source items, wherein each news source item is derived from a news source in the corpus of news sources. In some implementations, the identity/name (e.g., logo, image, tradename) of the publisher or source of each news source item in the generated collection can be displayed on the user's newsfeed as thumbnails, images, or icons that can allow the user to quickly identify the source each of the news source item incorporated in the collection.

As discussed herein, the systems and methods of the present disclosure can have broad utility for generating information that can be useful in various contexts. Therefore, even when the methodology is discussed in relation to specific Figures herein that are illustrative of newsfeed implementations, it is to be understood that the described examples may also be applicable to the generation of information that is also useful in one or more of printed or displayed reports, dashboard configurations, and information sets that can be used in machine learning processes as discussed herein.

FIG. 1 provides an illustration of an exemplary implementation of a summary of a news item or topic delivered in the user's newsfeed. Mobile device screenshot 100 shows a portion of a user newsfeed 105 having identified news events or topics 110 and 115 visible thereon. A newsfeed such as 105 that appears on a mobile device screen can be generated via an "app" configured with the systems and methods that is operational on a suitable mobile device, for example, an Apple iPhone XR loaded with a version of IOS, for example IOS 12.1, as in the illustrated mobile device screenshot 100. The systems and methods herein can also be operational on Android and other types of devices having suitably configurable operating systems, as would be appreciated. First news event or first topic 110 relates to the "Yellow Vest Protests" that were occurring in Pans the weekend of Sep. 21, 2019 ("Yellow Vest Protests"). First news event or first topic 115 relates to protests in Hong Kong also occurring on the weekend of Sep. 21, 2019. Each of these news events or topics were "breaking" at that time and, as such, were identified as news source items to appear in the subject newsfeed as summaries thereof, as discussed hereinafter.

A text summary 120 associated with first news event or first topic 110 appears below an image 125 selected for association with the subject Yellow Vest Protests. Image 125 appears in the real life newsfeed 105 as a selectable video clip, although in some cases, a text summary associated with a news source item can appear with a stationary image, as in image 130 for text summary 135 associated with the referenced Hong Kong protests of first news event or first topic 115, a news source logo (not shown) or the like.

Also, as shown for identified news event item or topic 110, a plurality of news source logos selected by the news aggregation systems and methods described herein appears as collection 140, where the collection indicates the individual news sources that will be provided for review by the user if she selects first news event or first topic 110 for further review from newsfeed 105, such as by clicking image text summary 120 or image 125, for further review from beyond the summary information and images appearing on newsfeed 105. Alternatively, she could scroll through newsfeed 105 to select news event or topic 115 or continue scrolling to view additional news event or topics (not shown) that appear in the newsfeed.

In the example illustrated in FIG. 1, for some topics that are considered to be significantly newsworthy among a number of news sources, a relatively large number of news sources items may be selected by the news aggregation systems and methods to provide a collection of user reviewable news source items. The Yellow Vest Protests of news event or topic 110 was such a newsworthy event, and a relatively large number of news source items were identified as collection 140. The number and type of new source items can be identified to the user by news source logo for BBC 145, and the notation 150 of "+16," which shows the user that there will be many individual news source items for her to review if she clicks news source item 110 for further review from user newsfeed 105. Such indication of the number of news source items associated with a news event or topic can provide a user with an understanding of a degree of significance of a news event or topic appearing in her newsfeed, at least because it can be assumed that a news event or topic that is highly reported may be more "newsworthy." Note that unlike newsfeed aggregation systems that collect news events or topics for display to a user by an assessment of popularity (or as "trending topics"), the news event and topic selection, and the associated new source items displayed to the user in her newsfeed, are selected via a novel methodology that is discussed in more detail herein.

Also visible on mobile device screen 100 is navigation bar 155 that includes additional features for operational on user newsfeed 105, for example, arrangement of the newsfeed according to user personal preferences as "my feed" 160 and "my places" 165, "top stories" 170 as selected by newsfeed curation methods discussed further herein, local news sources events or topics 175, and further user preference settings 180.

Figure 2A:
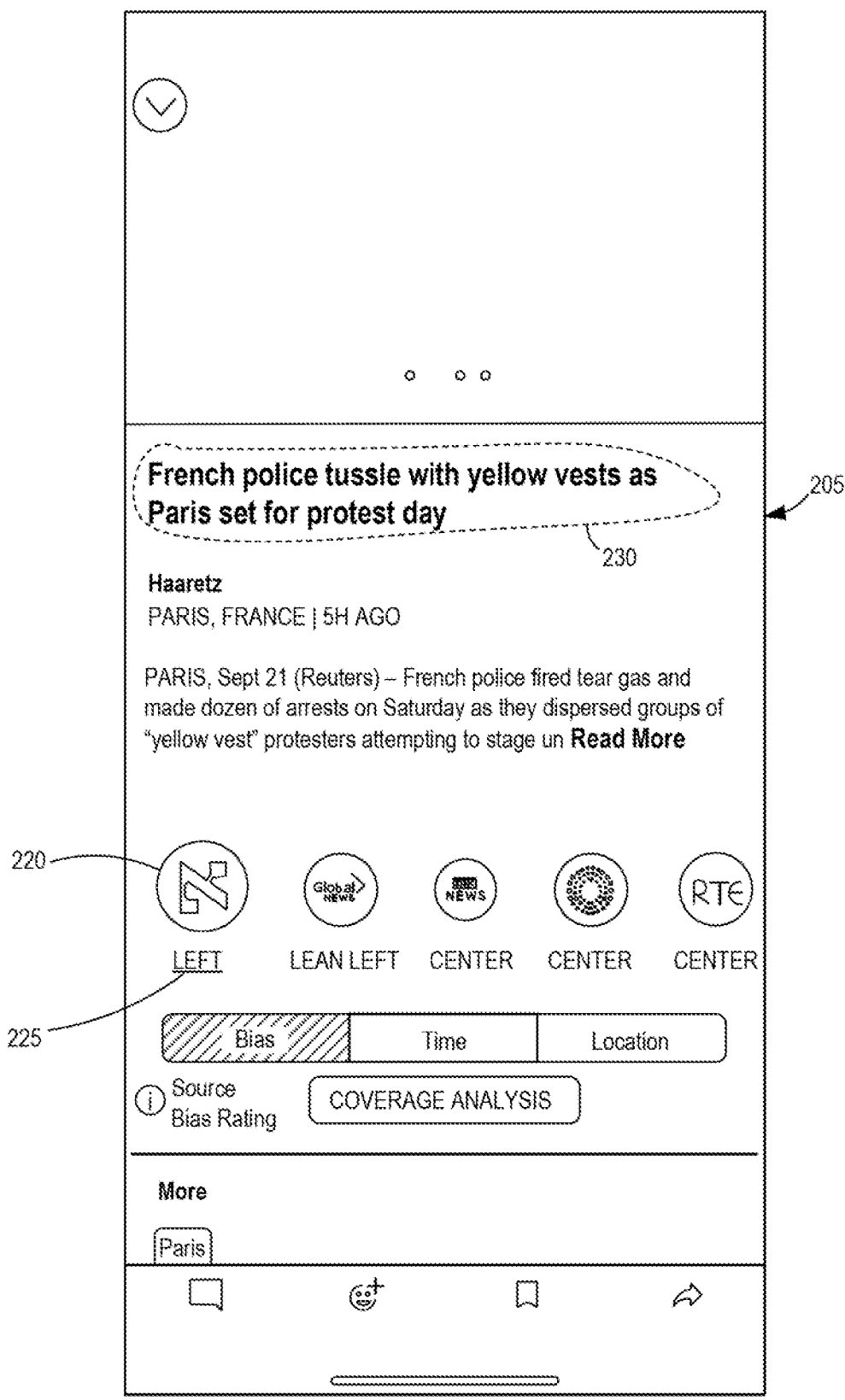
Figure 2B:
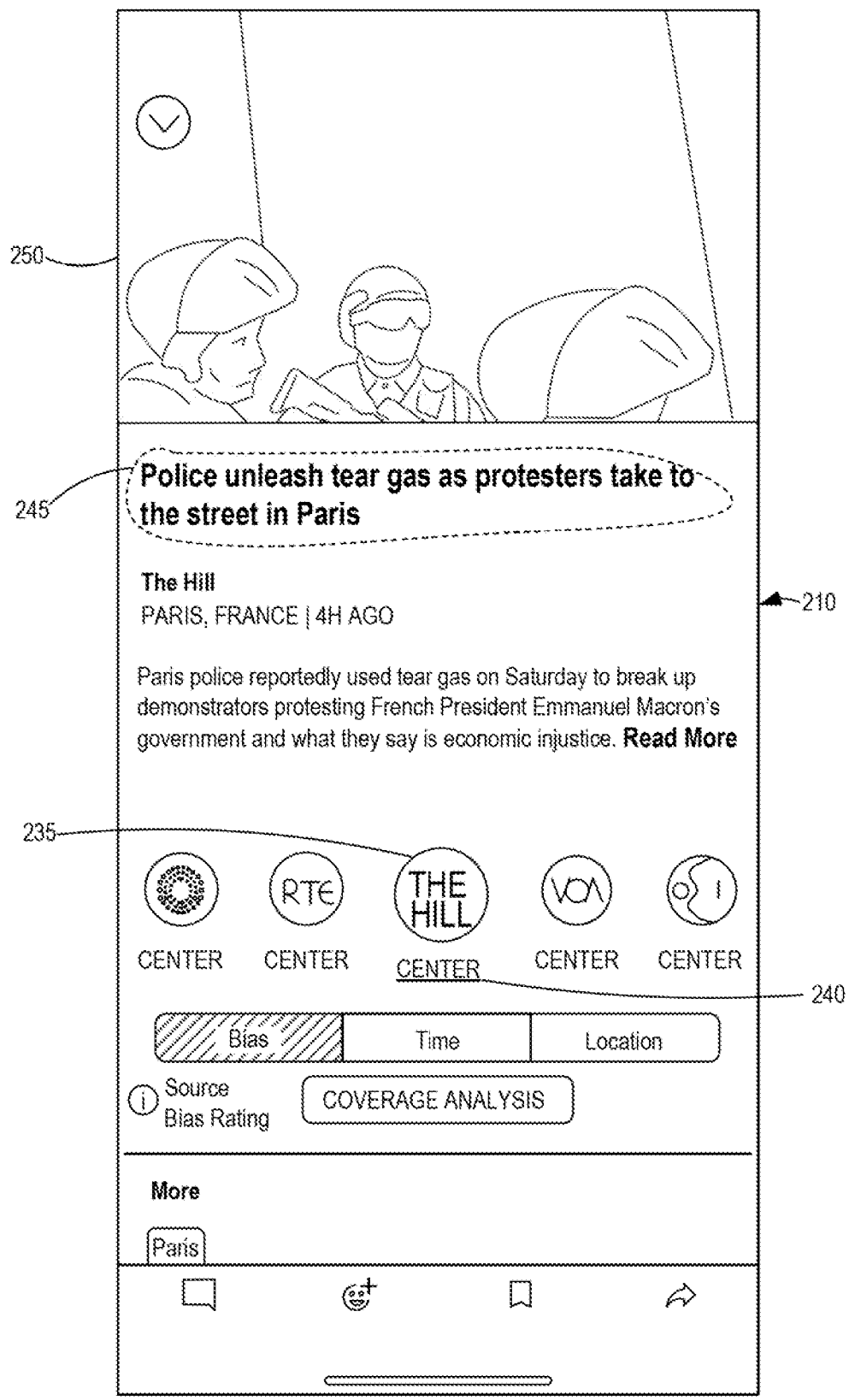
Figure 2C:
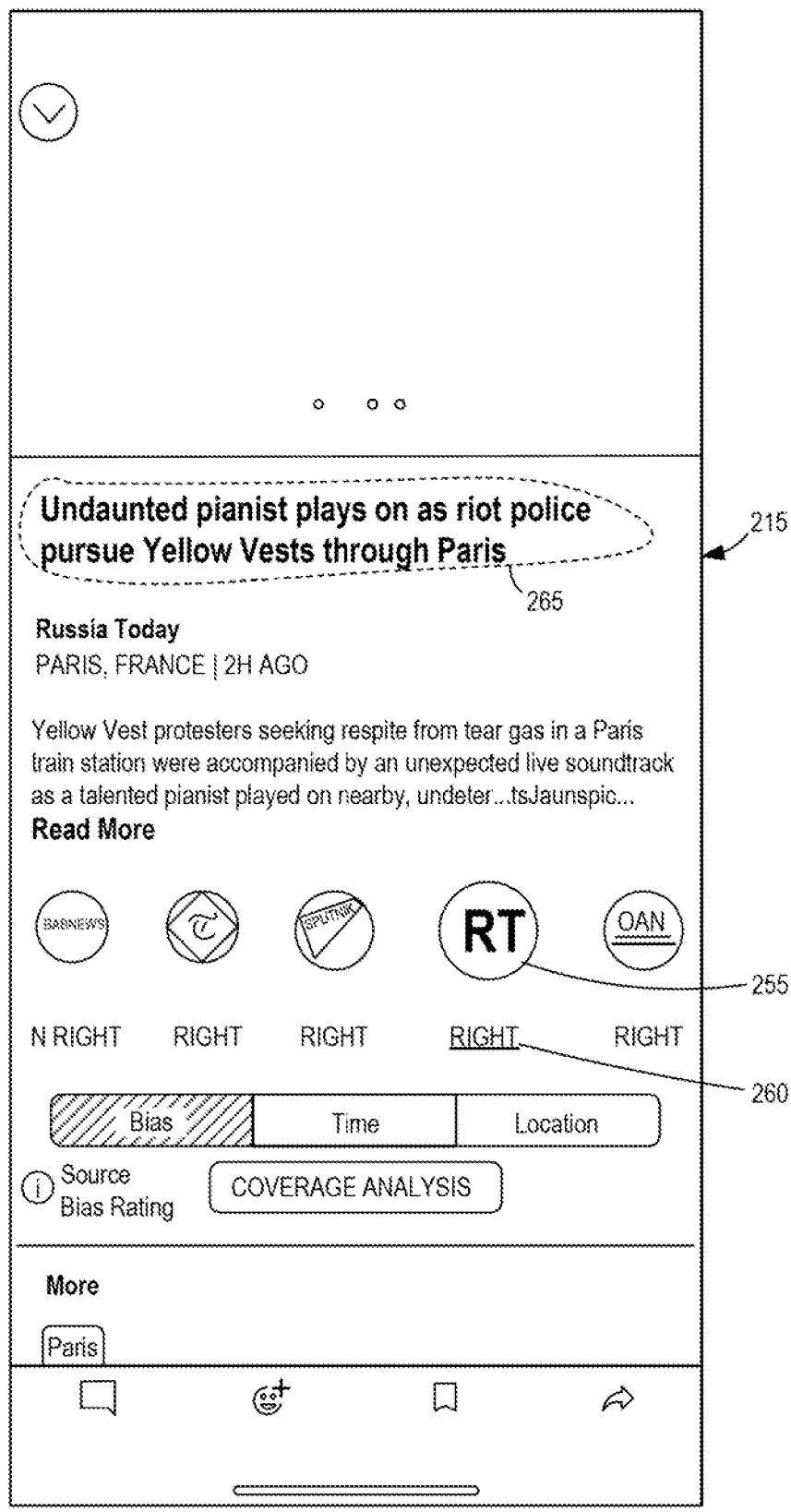

When the user selects a displayed news event or topic appearing in the users' newsfeed, as illustrated for first news event or first topic 110, mobile device screen 100 will display to the user at least one news source item in a collection of news source items to the user that have been identified as being associated with the first news event or first topic. This is shown in FIGS. 2a, 2b, and 2c, which present different mobile device screen shots 205, 210, and 215 presented to a user in relation to the news event 110, namely, the Yellow Vest Protests as indicated. As would be appreciated, the number of news source items presented to the user in a collection can vary. When there are too many news source items to appear on a single screen as for news event or topic, such as that of 110, the user can swipe left or right to see, and thus select, more news source items in generated collection 140. In this regard, FIGS. 2a, 2b, and 2c show three different mobile device screens 205, 210, and 215 that, collectively, show each of the individual news source items appearing in the collection of news source items about the Yellow Vest Protests available to the user at the text summary 120 appeared in user newsfeed 105.

FIGS. 2a, 2b, 2c show each of three (out of about 20 total in this real time example) individual representations of news source items from three different news sources. FIG. 2a shows, for example, source 220 (Haaretz) that is indicated as being "left" in 225 with headline 230 extracted from the original Haaretz newsfeed. (Note that no image is shown because the original news source item derived from the news source did not include an image. However, an image or video can be generated from a third-party news source to provide an image or video for a news source item that does not incorporate one.) FIG. 2b shows, for example, source 235 (The Hill) that is indicated to be "center" 240 with headline 245 and image 250 extracted from the original The Hill newsfeed in this real time example. FIG. 2c shows, for example, source 255 (Russia Today) that is indicated to be "right" 260 with headline 265 extracted from the original Russia Today news source. Each of the news source items in collection 140 will be selectable by a user, with an associated headline being indicated by an underlined rating below, or otherwise visibly associated with, a name or identity via display of a logo for each selectable news source, as shown in each of FIGS. 2a, 2b, and 2c for each of the news sources appearing for news event or topic 110.

Figure 3A:
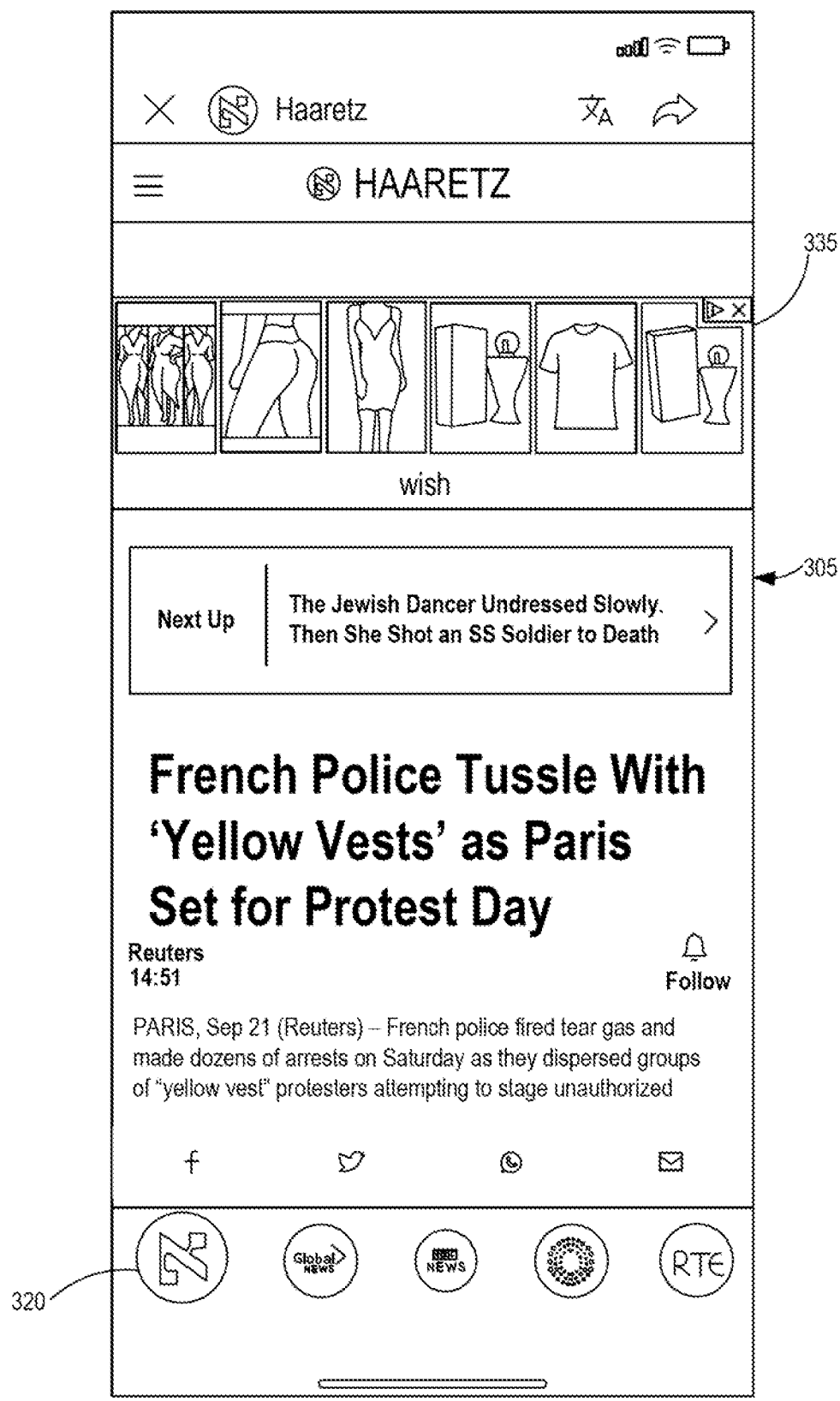
Figure 3B:
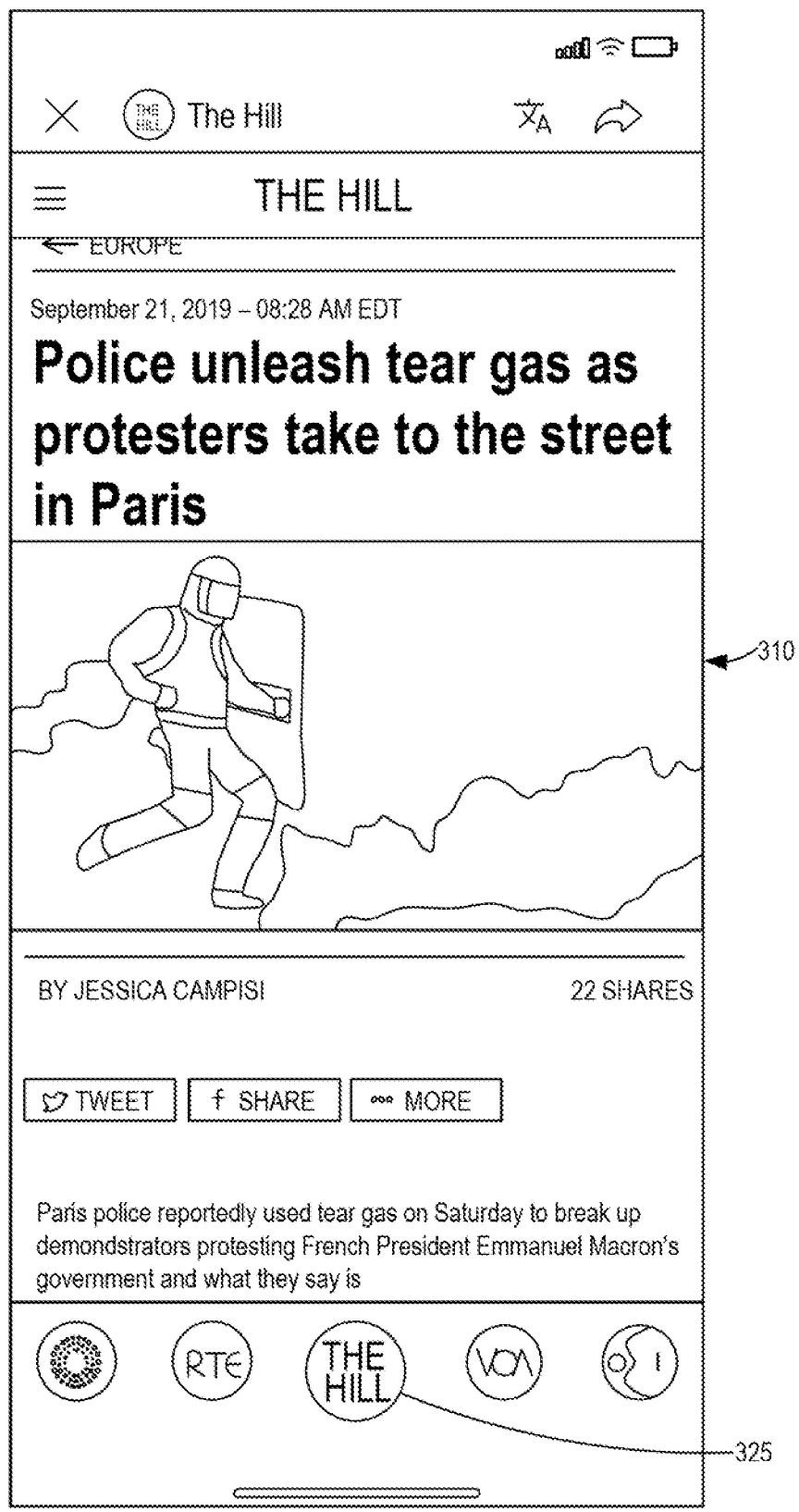
Figure 3C:
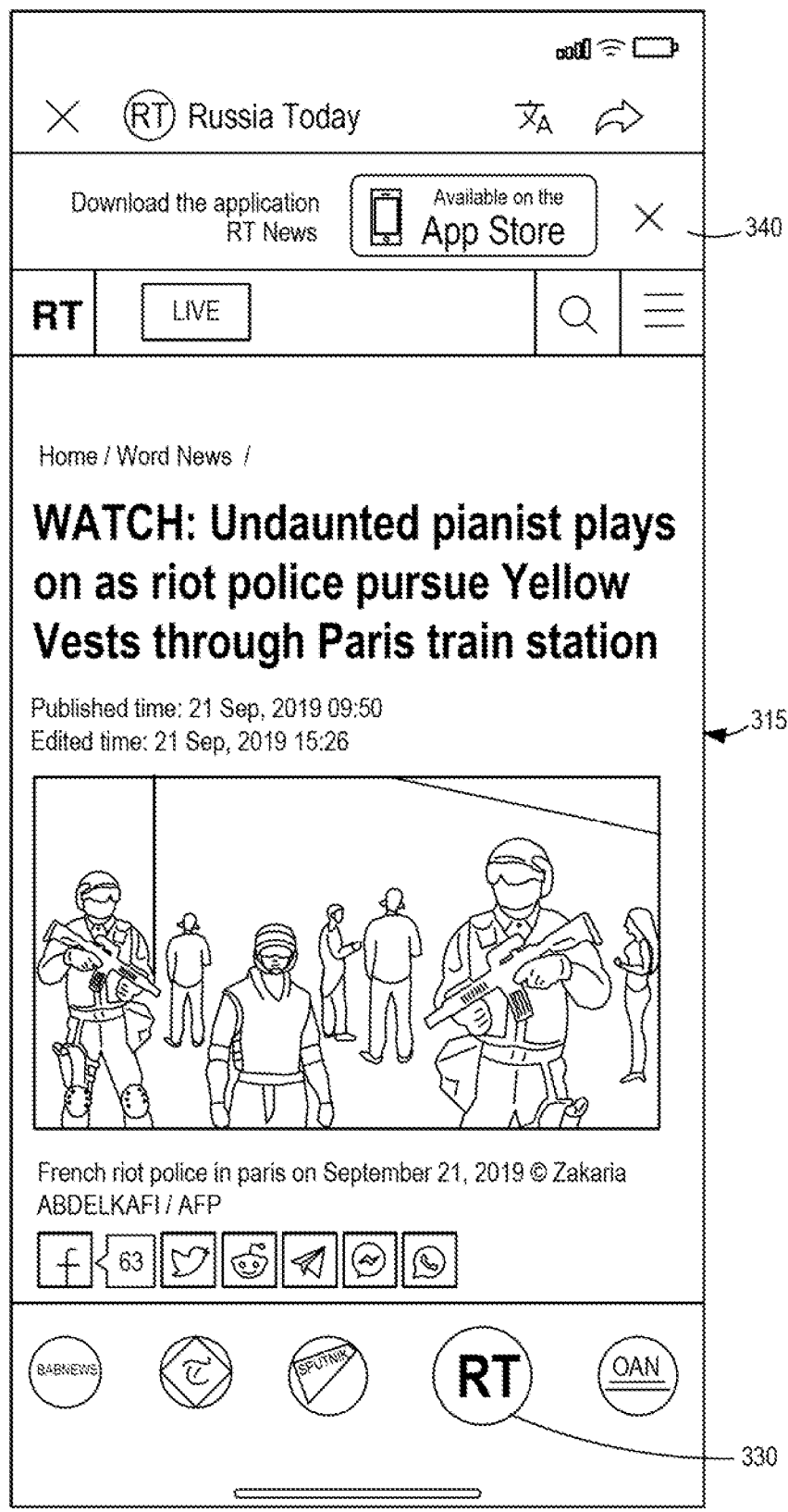

Yet further, and as shown in FIGS. 3a, 3b, and 3c, the user can select a news source item from the generated collection display (FIGS. 2a, 2b, and 2c) and be directed to the original news source for review of the actual news source item directly on the publisher's platform, for example. For example, FIGS. 3a, 3b, and 3c show screen shots 305, 310, and 315 of the original report on Haaretz, The Hill, and Russia Today, respectively. Moreover, and as a significant improvement over prior art news aggregation programs, when a user is directed to the original news source by clicking, the rating can remain visible on the device screen, such as in shown at 320, 325, and 330. The user is thus consuming each news source item that is selectable from newsfeed 105 via the selection of generated collection 140, she can also understand the type of rating that has been assigned to the news source that published the specific news source item. Such real time presentation of bias information can be expected to provide a news consumer with a better understanding of a potential ideological or political bias, skew, or viewpoint that may underlie the information as is being presented by a particular news source. As such, the user need not make a separate evaluation of a secondary source of bias, skew, or viewpoint because such information can be automatically presented to her in real-time along with other information in her newsfeed. Also, as shown on screen shot 305 for the news source item from Haaretz, advertising revenue can be generated by the news source via banner advertising 335 or the like. Alternatively, the user can be directed to download a publisher app as shown by 340 on FIG. 3c. Other publisher revenue models can also be accommodated with the newsfeed generation methodologies herein, including various revenue sharing arrangements between the news curation providers and the publishers.

In implementations, in the context of a news source item that is associated with an event or topic of interest, a bias, skew, or viewpoint rating can be derivable from the list of ratings available from commercial sources such as mediabiasfactcheck.com, adfontesmedia.com and allsides.com, or the like. Rating information can be automatically derivable for use in the present methodology according to development of a suitable API, or the use of existing APIs. The methodology for adfontesmedia.com and allsides.com are believed to be described in detail in US Patent Publication No. 2017/62592397 and U.S. Pat. No. 9,285,973, the disclosures of which were previously incorporated by reference. Yet further, the bias, skew, or viewpoint rating can be generated using the methodology of mediabiascheck.com. Other suitable sources of bias, skew, or viewpoint ratings generated for news events or topics can also be used, as such ratings and associated measurement thereof are being developed regularly. For example, information from other rating sources associated with press reports can be evaluated, for example, the "World Press Freedom Index" published by Reporters without Borders (https://rsf.org/en/ranking). As noted, other forms of bias, skew, or viewpoint ratings can be applied to news sources that are associated with other forms of information (e.g., academic or medical journals, trade publications) that may exist or that may be created can be suitable to derive and present ratings in context.

Yet further, a user can incorporate her own rating of bias, skew, or viewpoint for a news source that can be presented to her. A user-generated rating can be compared with a rating generated by a commercial news rating source and evaluated for validity. For example, if a user rates a news source as "far left," but that same news source is rated by a commercial news rating source as "center," or "right," that rating can be rejected and/or the user can be provided with guidance in how a news source rating can be generated. A plurality of user-generated news source ratings can be averaged or otherwise consolidated for application to a news source that has not previously been rated by one of the existing news source rating services, agencies or products. Such "crowd-sourced" ratings can be incorporated into the system.

Figure 4:
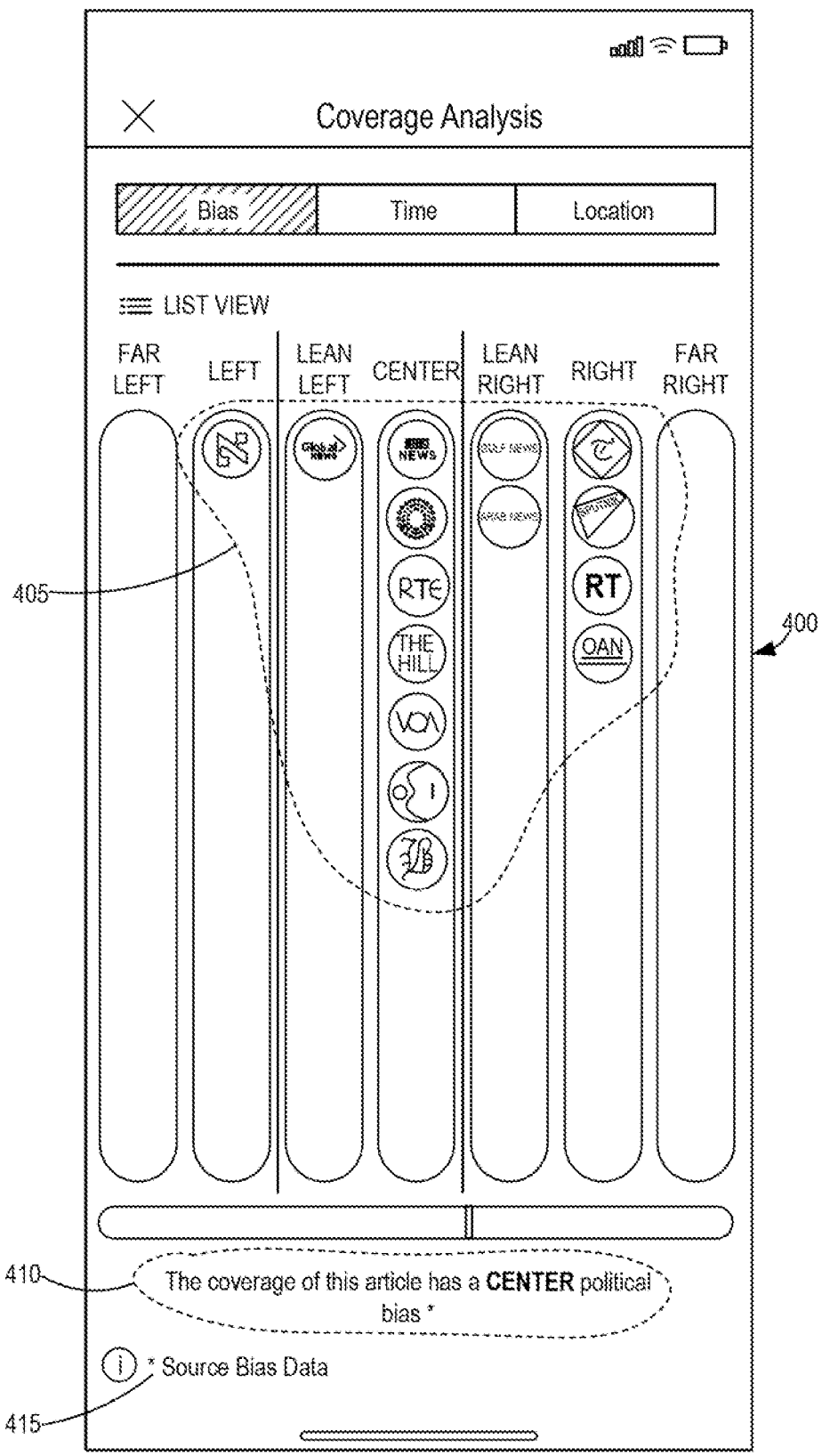

In a further improvement associated with the systems and methods herein, the user can review a coverage analysis, as shown in FIG. 4. For news event or topic 110, the coverage analysis is shown in FIG. 4 as screen shot 400. Such coverage analysis information can also be included in one or more of the report, dashboard configuration, or as a component of the information set. Collection of news sources can be shown on a scale of "left" to "right" generated from a news bias rating, as shown by 405. A summary 410 of the coverage rating scale can also be displayed, including a selectable link 415 to access source rating data and information about generation of news source ratings. The user can then quickly gain an understanding of the types of news sources that are associated with the first news event or first topic, here the Yellow Vest Protests. Such information can be useful to identify what news sources are missing from the coverage of a particular news event or topic, for example. As would be appreciated, the absence, over-representation, or under-representation of a particular news source from a collection of news source items can provide useful insights as to a bias, skew, or viewpoint of the other news source items appearing in the collection, as well as for the news source that is absent therefrom. The "blind spot" report discussed hereinafter is a further example of a use of the presence or absence of coverage.

Figure 5A:
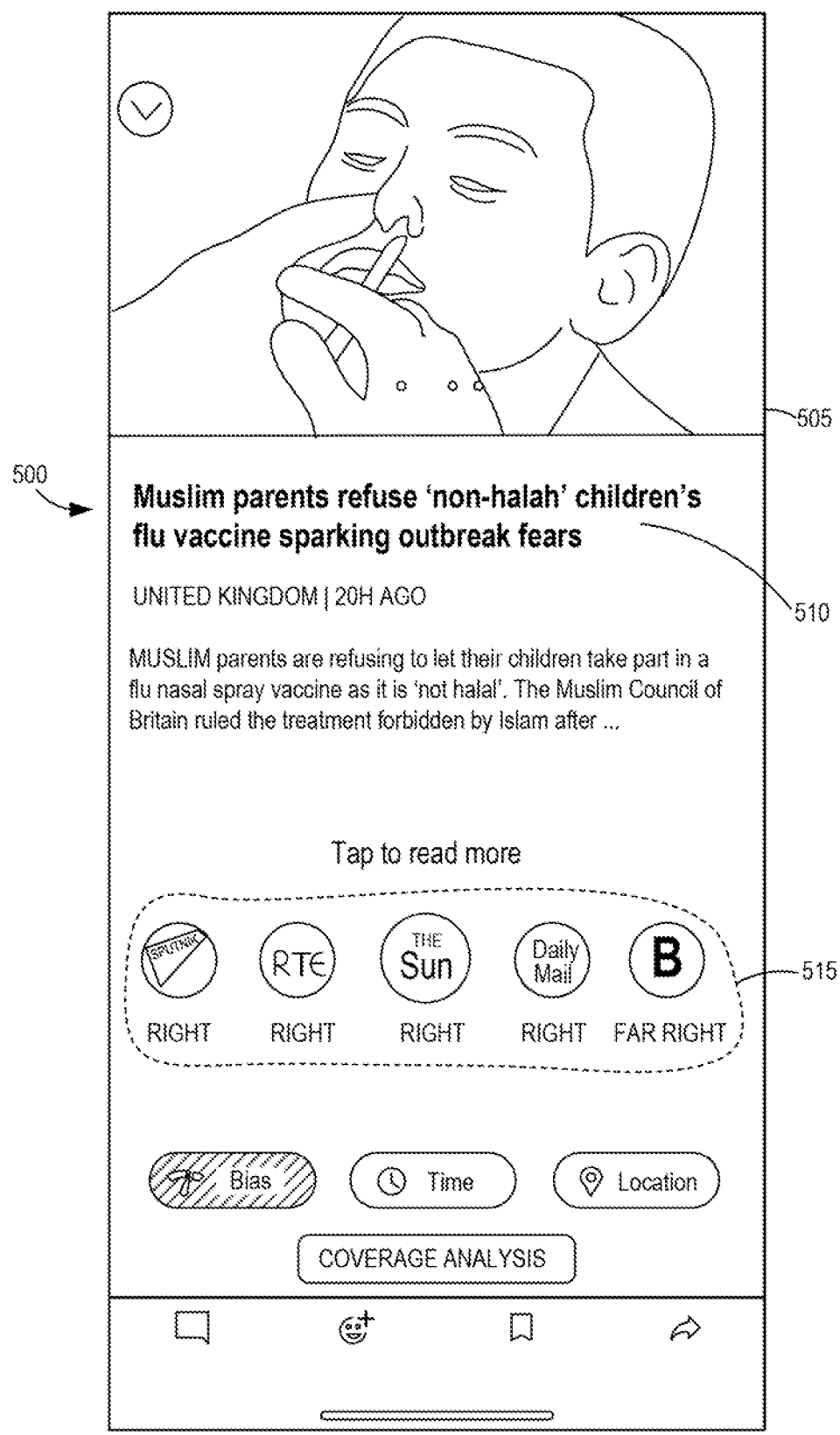
Figure 5B:
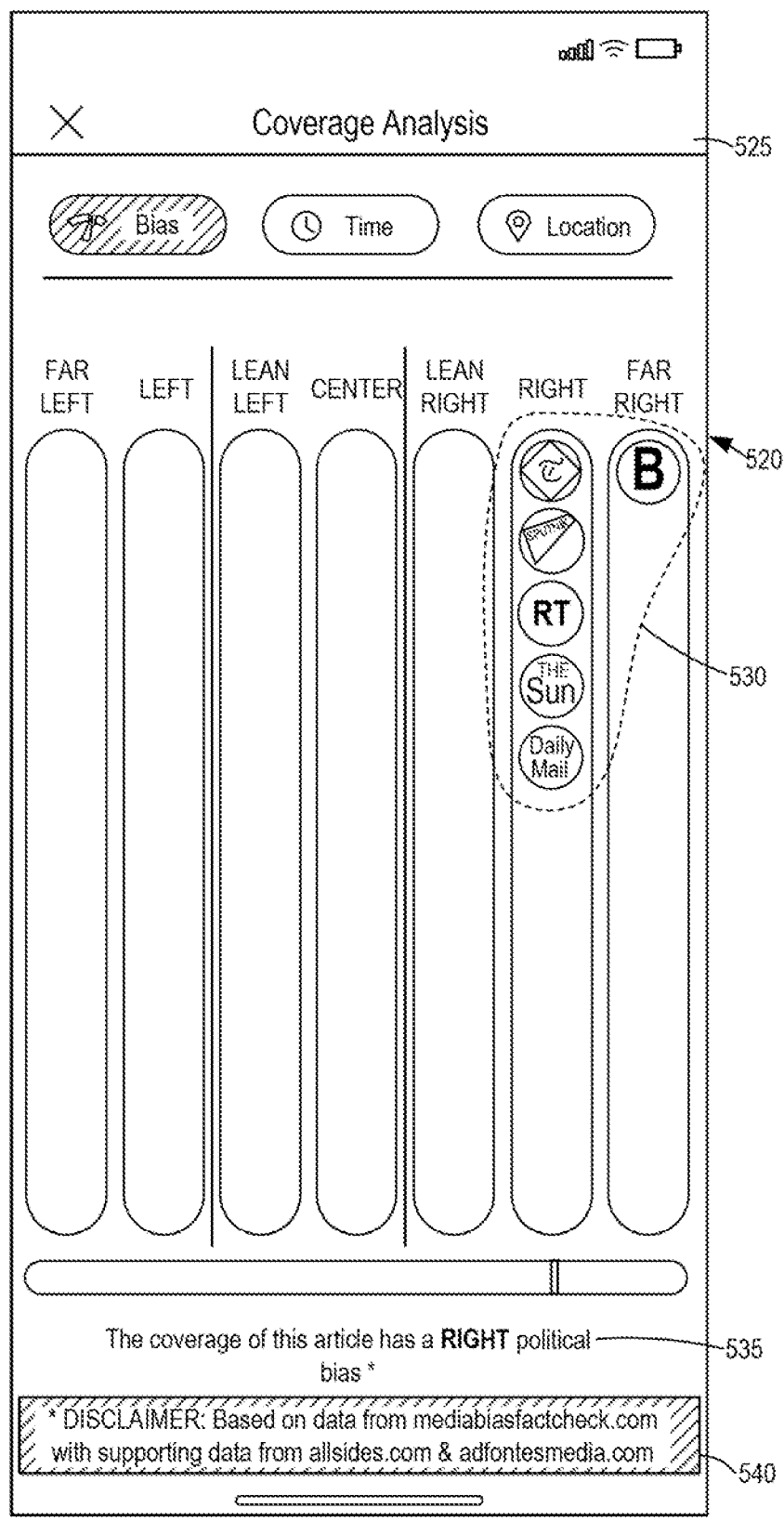

In relation to the presence or absence of a news source item in a coverage analysis, consider screen shot 500 in FIG. 5a that presents news event or topic 505 that is associated with summary 510 that states that Muslim parents are rejecting vaccinations for children that are not Halal. Several news sources are shown in 515, which would ostensibly indicate that there is a spectrum of coverage of this news topic. However, as shown in screen shot 520 in FIG. 5b of the coverage analysis 525, the generated news source collection 530 from which the news source items 515 are provided for the news event or topic or event 505 are indicated as being "right-leaning" on the coverage analysis spectrum, as summarized in 535, along with the bias, skew, or viewpoint rating explanation provided by 540. As such, a reader seeking to better understand if the news event or topic 505 should be considered a "real" topic of news or concern may find that the one-sided ratings of the news sources in the generated collection of news source items problematic. For example, such one-sided ratings may indicate that each of the news source items were generated from a single news source, such as a website that aggregates news source items as a function ideological/political bias.

As a further beneficial implementation, each of the news source items in the generated news source collection 530 can be evaluated to determine whether one or more of the news source items are, in fact, identical or substantially identical and/or whether they were generated or republished from one or group of news sources. Such an analysis can provide information about whether an appearance of a plurality of news source items is actually associated with multiple publications of the same, or substantially the same, news source item that originated the news source item. The methodology can also be configured to identify a source for a news item of interest, such as a publisher, author, content moderator, news aggregator, etc. of one or more of the news source items in the generated collection 530. This can allow tracking of the origination and distribution pathways for a news source item that has been republished. As a further implementation, the discussion of a news source item in one or more other news sources can be durably linked to the original news source. In this regard, if news event or topic 505 was discussed in another publication in relation to the content thereof (e.g., the propagation of false information about Muslims declining vaccines), such discussion can be linked to the news source collection 530. Such an implementation can provide a user with deeper context about the content of news source collection 530.

In a further aspect, a news report, such as news event or item 110 (FIG. 1) for the Yellow Vest Protests, can appear in a number of news sources, as shown by the coverage analysis information appearing in FIG. 4, thus that news report can be identified as potentially "more factually valid," "more likely true," "less likely false," or any other suitable language via notification or the like than that of news event 505 if a reader can or should conclude that a news event or topic presented in a collection that includes a range of ideological or political biases is more likely to have more critical analysis applied thereto. It follows that a collection having a "more balanced" or "more truthful" range of reporting may have a higher probability of truth or validity. Information about such a probability can be provided for use in the methodology herein, such as via a user notification or as use in one or more of the report, dashboard, or information set.

To this end, simultaneous presentation, and collection of information associated therewith, of at least one news source item associated with a news event or topic of interest, where the news source items can also be displayed with associated news source ratings, can provide notable improvements for news consumers. For example, the display of a rating associated with a news source item in a collection of news source items relevant to a recognized or selected news event or topic can allow a user to observe and consider the presence or absence of one or more relevant ratings types for a news source in the collection. For example, if the news source items in a collection are generated from only "right-leaning" or "left-leaning" news sources, the user might seek to generate an opinion of why only a particular type of news aggregator, content moderator, publisher, byline, author, etc. is reporting on the subject news event or topic. In other situations where a range of bias, skew, or viewpoint ratings are included in a collection of news source items associated with a news event or topic, the user might seek to review a range of viewpoints on a topic by selecting more than one of the news source items to review in a generated collection, as opposed to reviewing only a single story that is presented in the context of a single bias, skew, or viewpoint. Notably, when a single news source item is presented having a single viewpoint or perspective—be it conservative, center, liberal or other rating type variations that make sense in context—the user will likely consume that news source item with that single viewpoint, often without also realizing that other viewpoints on that topic may exist. It follows that the ability for a user to readily consume a range or variety of viewpoints regarding a news event or topic of interest, where the viewpoints are a function of the byline, author, publisher, content moderator, news aggregator, author etc., as opposed to being provided with a single bias, skew, or viewpoint from a single news source item, may reduce the propensity of a user to obtain a siloed news perspective that can result a person herself generating one-sided opinion of an event or topic that mirrors a bias, skew, or viewpoint associated with that news source. In other words, it can be anticipated that, at least for some users, the availability of multiple news source items associated with a particular news event or topic can improve user news literacy or a user's engagement with a news event or topic when the items are delivered with a wider variety of perspectives.

Moreover, the availability of multiple news source items for a news event or topic of interest can reduce the actual or perceived selection bias that is imparted when an algorithm selects one news source item associated with a news event or topic. As noted previously, there is increased recognition that the selection of news content for delivery to a user via existing algorithms can determine what is included, excluded, highlighted, or de-emphasized to a news consumer, such as in a newsfeed. As discussed previously, Google and Apple News have been shown to select and deliver news that is more likely to have a "liberal bias." While such skewed delivery may relate to selection of some news source items on an ostensibly "objective" assessment of the reliability of each news source to deliver truthful news to user, this nonetheless can result in a significant perception of viewpoint censorship from news aggregation platforms when a user is expecting a news source item to appear in her newsfeed from a specific news source and it actually does not appear.

For example, for newsfeed aggregators that select news for display to a user on the basis of popularity of a particular publisher, news source items from that source will appear more frequently in a newsfeed. If that publisher has the perception of presenting news from a "liberal" viewpoint, a user will be presented with "liberal-leaning" news source items more frequently. The presentation of at least one news source item including different ideological or political viewpoints, such as shown in relation to news event or topic 110 above for example, can reduce user perception that the news source items being presented to a user are directed to a single bias, skew, or viewpoint, perhaps for the purpose of persuasion or indoctrination. To this end, a user can directly observe on a device display a plurality of news source items delivered as a collection associated with a news event or topic quickly and easily, where the items are each associated with an objectively determined rating, which is an improvement over existing newsfeed generation and presentation methodologies. When used to generate reports or dashboards, such improvements can also be seen. Use of such generated information about news sources and news source items derived therefrom also can have utility in information sets for machine learning processes.

As would be appreciated, the present disclosure provides in a significant implementation a news aggregation system and methods for the delivery of news and information describing a news event or topic that is newsworthy in context. A "news aggregator" is client software or a web application that aggregates syndicated web content such as online newspapers, blogs, podcasts, and video blogs (vlogs) in one location for easy viewing. The new stories or information content can be provided for consideration—that is, aggregator—in a user's newsfeed via web crawlers, RSS ("real simple syndication") feeds, and/or APIs ("application programming interfaces"). When used as a verb, "news aggregation" refers to the steps of: 1) data gathering (e.g., identifying news source items present in a news source or plurality of news sources that might have relevance to a particular news event or topic); 2) news source item extraction from a news source in which it appears and is identified as relevant in context; 3) clustering (e.g., grouping articles relating to a specific news event or topic); 4) summarization of the related news source items; and 5) visualization (e.g., presenting for display on a user device a plurality of news source items to the user in a newsfeed appearing on a mobile or other device screen). In this regard, the methodology herein broadly provides systems and methods for news source item aggregation and delivery of aggregated news source items to a user in a newsfeed and or use as other forms of information.

With regard to the steps of news source item recognition and collection, the systems and methods herein are configured to process reviews of a plurality of news sources in a corpus of news sources to recognize at least one news source item or, in some implementations, a plurality of news source items associated with a recognized or selected news event or topic for generation of information related thereto. At least some of the collected news source items can each, independently, be associated with a rating, and the rating is generated from at least one ratings source, such as a list or other consistent categorization of bias, skew, viewpoint associated with one or more of an author, news aggregator, content moderator, publication type, publisher, owner, publisher business model, intended audience, etc.

In a notable aspect, the present methodology can comprise the recognition of a news event or topic that may be of interest to a user from a corpus, or database, of news sources. Unlike methodologies that identify news events or topics as a function of identification of "trending topics," such as that disclosed in US Patent Publication No. 2016/0232241 (to Facebook, Inc. as Applicant, or the Facebook '241 Publication), the disclosure of which is incorporated herein in its entirety, at least some of the recognition of a news event or topic occurs when an "orphan" news source item is ingested for processing from the corpus of news sources that make up the full collection of news sources available for processing according to the methodology herein. Put simply, and in a notable implementation, a news event or topic will not be generated as information to be displayed in a user newsfeed etc. unless there is at least one news source item independently identified via the methodology for that news event or topic in the corpus of news sources. In this regard, and in some implementations, a news event or topic does not exist for display in a newsfeed until a news source item is recognized as not having been previously associated with a different news event or topic. In some implementations, this initial identification of a news source item can be generated automatically by identification of an item that has not previously been grouped, or clustered, with other news source items that are already associated with a previously recognized news event or topic. The corpus of news sources can be processed and analyzed by the computer to identify a news source item that can be determined to be associated with a newly occurring, or at least previously unreported, news event or topic. In other implementations, the user can select the news source item for generation of a collection, as discussed hereinafter.

In contrast to prior art methodologies, the news event or topic recognition by the computer and the clustering or grouping of a plurality of news source items therewith can be initially conducted automatically by the computer. A human supervisor or a properly trained machine learning system can be used to confirm or validate the event or topic recognition and the clustering or grouping. When combined with at least the presentation of a generated rating for at least some of the news sources having news source items in the collection, the present disclosure generates significant benefits over previous news aggregation and curation methodologies.

As an illustrated example, FIGS. 6a, 6b, 6c, and 6d show a timeline in a sequence of screen shots 600, 625, 630, and 635 for timeline view 605 of news event or topic 110—that is, the Yellow Vest Protests of the weekend of Sep. 21, 2019, can be seen to have first appeared as an "orphan news source item" as a report in Globalnews.com (610). The news event or topic was recognized from this orphan news source item, which operated as a seed post for the identification of the news source item appearing in Arab News (615), The Telegraph (620), etc., as shown by screen shot 600 in FIG. 6a. As shown by review of the time and coverage analyses of news event or topic 110, the coverage of started first with Global News and Arab News, both "left-leaning" sources, with the "right-leaning" Telegraph appearing shortly thereafter in timeline view 605. As the news coverage further evolved, the overall coverage of news event or topic 110 became "center" overall as shown FIG. 4.

Figure 6A:
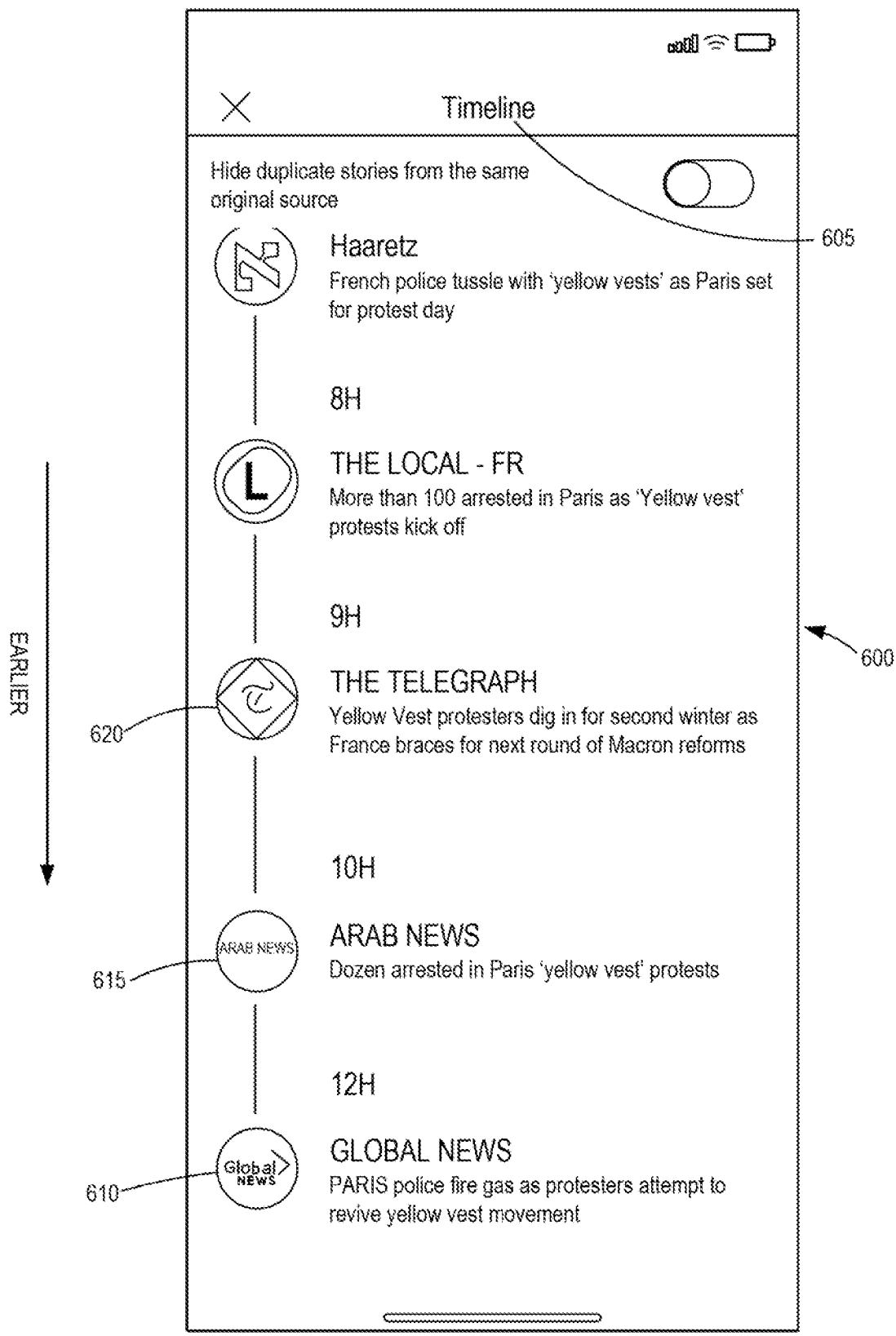
Figure 6B:
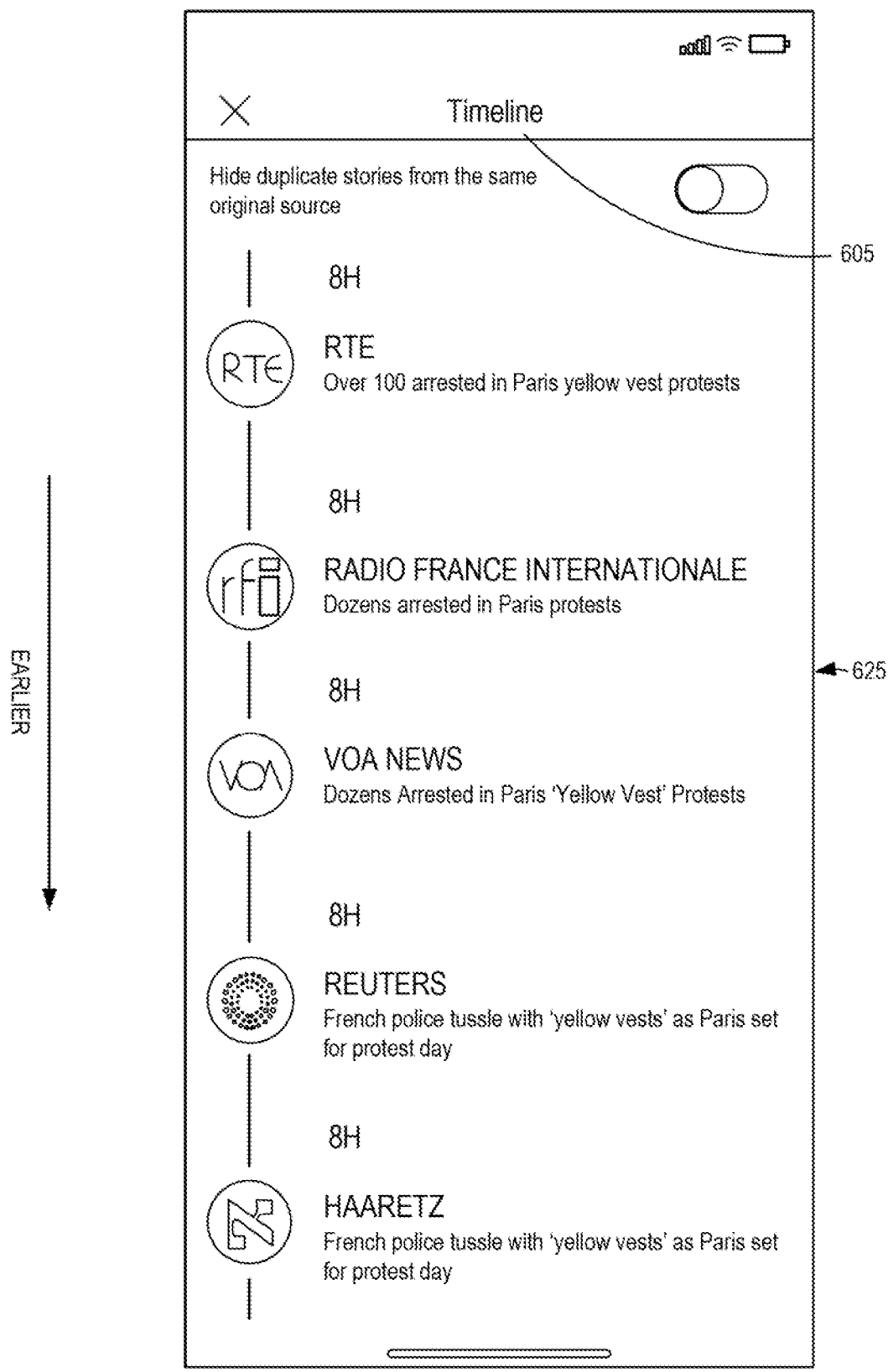
Figure 6C:
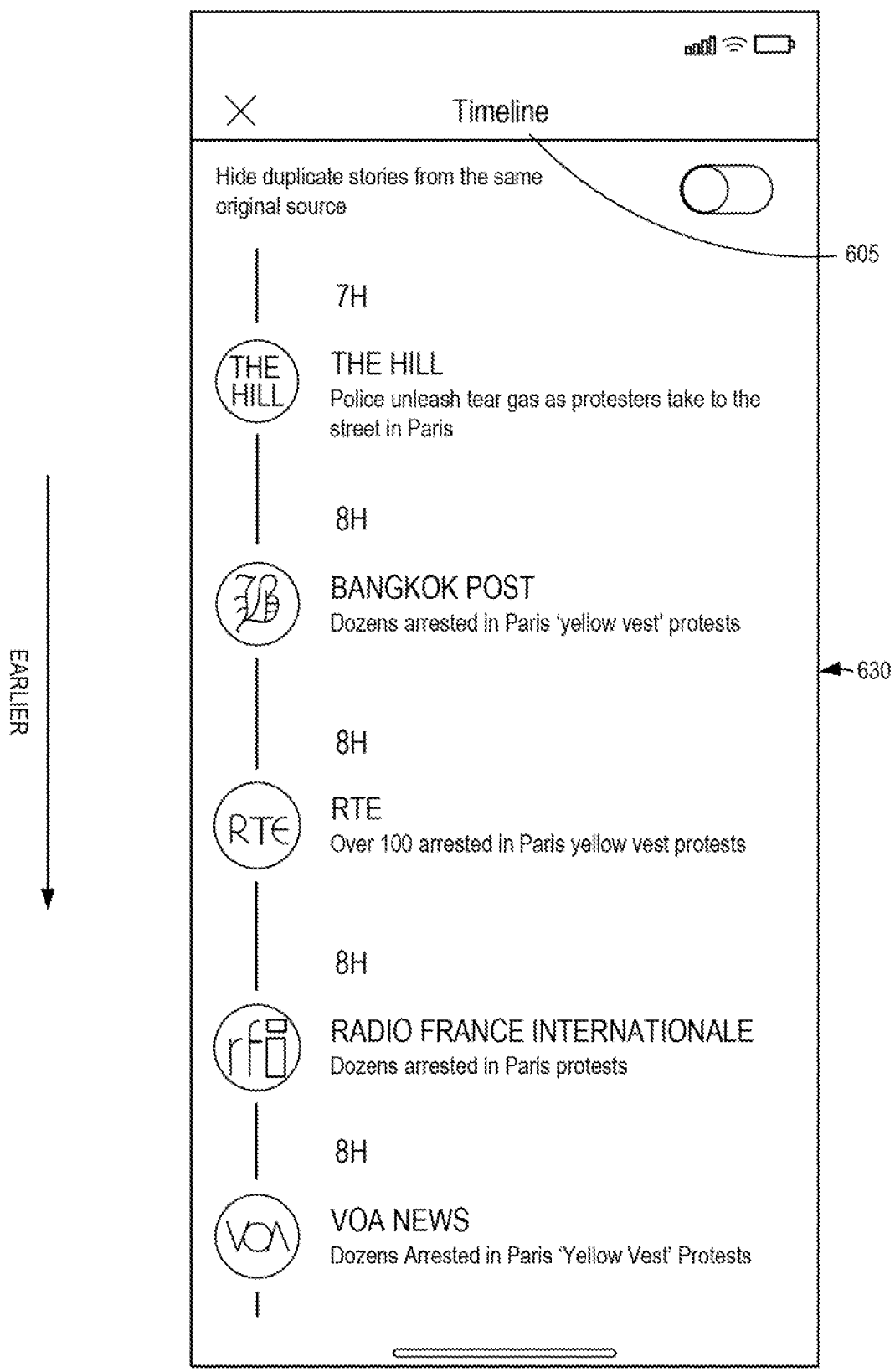
Figure 6D:
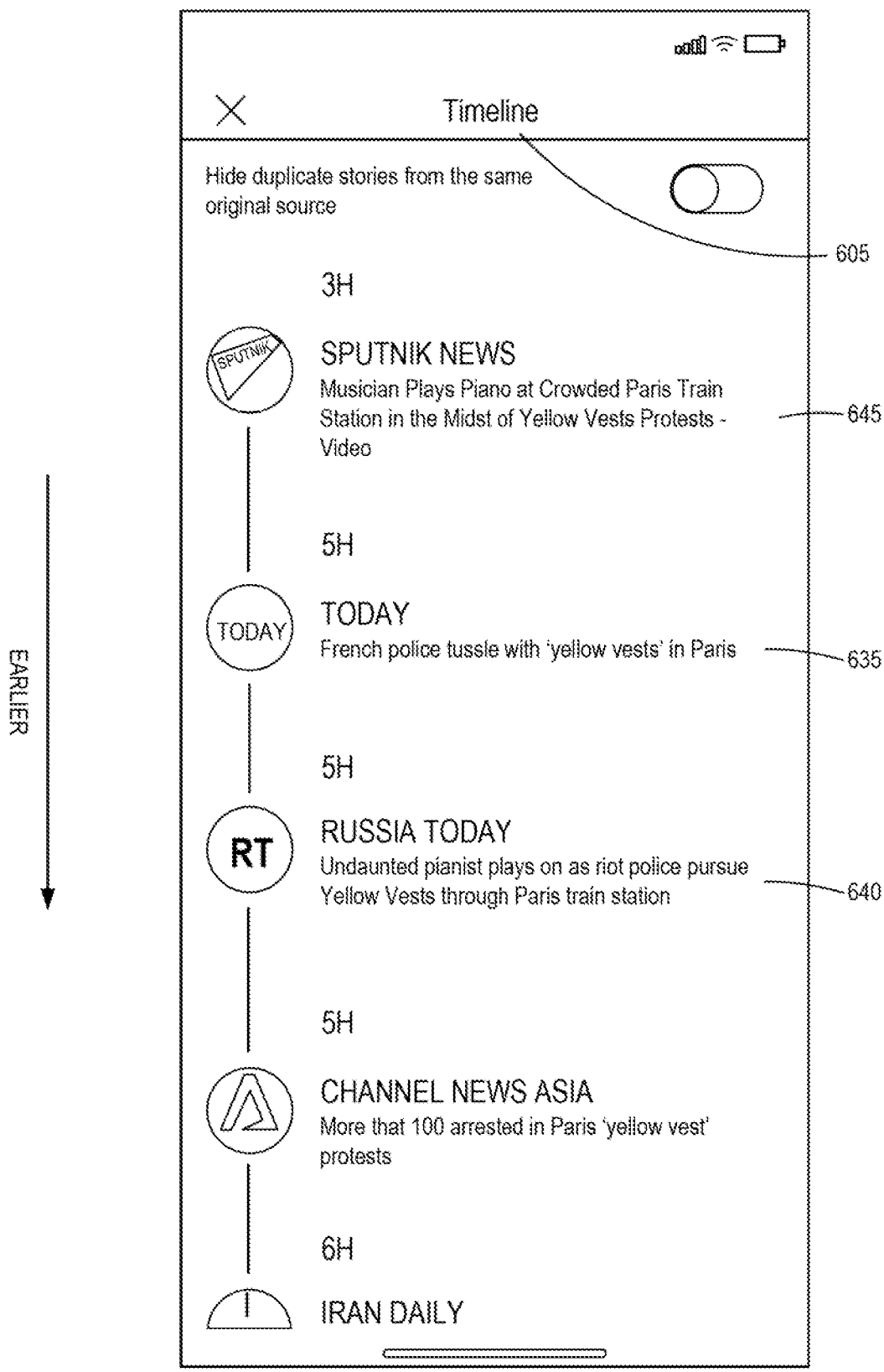

A collection of news source item headlines can be reviewed to develop information about whether some of the individual news source items were originated from a single news source, even though a plurality of news source items may be presented in the collection. For example, FIG. 6d shows that Russia Today (640) and Sputnik News (645) headlines referring to a piano player's actions at the identified Yellow Vest Protests, whereas Today (635) displays a different headline. From the similarity of news source item 640 and 645 summaries, a user might infer each of these individual news source items originated from the same news source (e.g., publisher/owner), such as a wire service or translation service. Since both of news source items 640 and 645 are also from news sources rated as "right," a news consumer or other information processing methodology might make a determination that each of these news source items might be substantially similar and, as such, may decide that reading one of these news source items would provide substantially the same content as would occur from reading both. Duplicate news source items can be removed from the collection.

In an implementation, once a recognized orphan news source item is automatically registered or indexed to generate a news event or topic of interest, the orphan news source item can be considered to be a seed post that operates as a basis for identifying additional news source items that should be clustered together in relation to the news event or topic, where the clustering can be conducted for items that are published in a specific time period. Once an orphan news source item is identified or recognized, a news event or topic having a category of "new" is generated and a clustering event can commence. Such news event or topics can be arranged according to set categories typically associated with a news aggregator, such as by object types. For example, an object type or tag can be assigned to content or subject matter present in a news source item (e.g., "Pepsico" is an organization; "London" is a place; and "Hurricane Dorian" is an event or occurrence). Assigned object types or tags can conform to a news event or topic created from the recognition of an orphan news source item having such object type or tag, as well as being used in the clustering of news source items associated with the news event or topic as discussed herein. Such tags can be durably associated with the subject news source items, collections, news sources, etc.

Two or more news source items can be identified as being associated with a single, or first recognized news event or topic of interest if they share several keywords and/or comprise similar metadata information, such as tags, close times/dates of publication/origination, which is a common methodology of grouping news source items together in prior art news aggregation products. The processing of news source items can incorporate NLP techniques to identify keyword commonalities between the items, such as are present in the headline, bylines, and body text, for example. NLP results can be incorporated in the metadata of the corpus of news sources and in the subject news source items, as well as from information derived from relationships therebetween. Analysis of metadata and any changes in the nature and characteristics of the corpus of news sources in the aggregate can also be conducted to identify similarities and differences. The methodologies herein also can incorporate one or more time periods of interest, which can be selected as discussed elsewhere herein, for publication of a plurality of news source items as a collection of news source items generated during one or more time periods. Previously known similarities in the news sources, such as geographic scope and interests covered, can be used to prioritize and configure the search for additional news source items in the corpus of news sources once an orphan news source item is discovered in the corpus of news sources operational in the network. For example, when a first news event or topic of interest is generated, a search query can automatically be configured to facilitate identification of other news source items describing the news event or topic. Users can also be provided with an ability to suggest a news source for addition in the corpus of news sources items covering specific news events or topics if the news source item of interest does not already have an item listed for an event or topic of which they are aware but that is not included in the generated collection of news source items. At least this implementation can facilitate the identification of local or regional news that can be relevant for reporting but that is not yet included in the corpus of new sources. A newly added news source can be profiled for inclusion in the corpus and also can be reviewed for generation of a bias, skew, or viewpoint rating as discussed herein.

A beginning and an end of a news event or topic can be identified by analyzing the content and number of news source items that are processed therefore. For example, a reduction of the number of news source items identified that include current dates, words that indicate current events, or other designators might indicate that the event has happened in the past. Thus, news source items that are indicative of a news event or topic being current should, in some implementation, not be collected with news source items that occur with news source items that address an event or topic after the fact. For example, news source items that discussed identified news events or topics 110 or 115 (FIG. 1) on the same day or in the same time period in which they occurred may not be appropriate to group together, such as in the context of what the respective French and Hong Kong governments are going to do to address the protesters' concerns. In this regard, the methodology herein can suitably identify the beginning and end of a news event or topic as represented by the reporting context, as well as group news source items appropriately in a temporal context. Such beginning and end determination can be conducted even when an event does not have a precise start and general end time, such as would be present with a sporting event or the like.

The methodology herein can provide significant improvements over the referenced Facebook '241 Publication, which relies in a significant extent on the popularity of a first news event or first topic—as indicated by identification by a topic as "trending"—to assign the category of "news event or topic" to a collection of data signals occurring in a network. In contrast to this methodology, the present disclosure registers a data signal occurring in the network as being a relevant "news event or topic" when an ingested data element is not like a data element that has been seen in the network before—as indicated by the appearance of an orphan news source item. Put another way, the referenced Facebook methodology looks for many received signals to define a "news event or topic" by way of similarity, whereas the present methodology can be configured to look for differences in current signals from signals that have be received previously in the network.

This means that a Facebook user's newsfeed will often be populated by "news event or topics" that are identified according to what others in her social network consider to be newsworthy, not by what may, in the context of journalistic standards, may in fact be newsworthy. As would be appreciated, the Facebook methodology represents a significant deviation from longstanding journalistic principles. To this end, journalistic standards refer to categories such as recency, conflict, unexpectedness, relevance, proximity, social impact, among other things. With the rise of online media, algorithms are inherently serving a role in curating journalistic content delivered to users. For a methodology like that in the Facebook '241 Publication, a proverbial "wisdom of crowds" standard is being imparted as a curation means for newsworthiness in that a "news event or topic" is generated, at least in part, by how many users, which may include non-human users (e.g., "bots") interact with a topic in the network. It follows that by defining newsworthiness, at least in part, as a function of popularity may cause events that are more important from a societal level may be ignored because they are not topics with widespread popularity.

Moreover, sensationalized topics, which may include falsities or skewing from bias or ideological viewpoints, are often shared more frequently and, thus, may be identified as "newsworthy events," even while other, less sensational topics may be judged as "less interesting," and will be shared less frequently. It will be appreciated that just because a news source item is shared less frequently does not mean that the topic is less newsworthy.

For example, when 2016 presidential candidate Hillary Clinton fell in public as a result of having the flu, this became significant news about her purported "health." This is not surprising because if a presidential candidate is not well, she will no doubt have trouble performing her job if elected as US President. It was later reported that Ms. Clinton's overall health status was excellent, but this information was not widely reported, at least because "good news" does not typically impart as much interest as "bad news." The erroneous reports of Ms. Clinton's poor health traveled more widely—that is, was a "trending topic"-even while the more substantively correct reports of her overall good health did not become a trending topic. This meant that more people obtained the "news" that Ms. Clinton may have been in poor health-something that was true for the short time she had the flu, but not as a true representation of her overall health status—and many news consumers may have been left with the impression that she was not a good candidate due to an erroneous belief of her long term health status. This could have affected the propensity to vote for Ms. Clinton for at least some of these news consumers.

In further implementations, the methodology can further comprise analyzing the information associated with a first time period and a plurality of additional time periods to generate information for the first news event or topic over at least some of the plurality of time periods. For example, using the Colin Kaepernick example discussed previously as a news event or topic of interest, a change in sentiment—for example, positive or negative emotional context signifying the presence or absence of support for Mr. Kaepernick's kneeling during the US National Anthem—can be identified over a period of time, such as over days, weeks, months or years. Such a timeline view can be presented for viewing or otherwise used to generate information by analysis of how a plurality of news source items in each collection that is grouped over a plurality of time periods, where the time period of interest can be generated by either or both of the computer or the user.

In a further implementation of the presently disclosed methodology, when a news source item recognized in the corpus of news sources included information about Ms. Clinton having received a "clean bill of health," that would be added to the first collection. For example, for a news event or topic of "Candidate Clinton's Health," any subsequent reports published that described that specific news event or topic, such as "Mrs. Clinton's health cleared by a doctor," or something similar, where the specific language would be added to the collection of news source items generated for that news event or topic. Because a news event or topic that is generated from an orphan news source item (or that is generated from a user selection) is durably maintained by the system, news source items that are generated at a later date can be matched to the generated news event or topic. News source items related to Mrs. Clinton's health status in 2016 that indicated that she did not have an ongoing health issue would be added to the a news source item collection addressing her health even though such information would have been generated at a later time. Any searches of the corpus of news sources in relation to Mrs. Clinton's health status would thus be presented with a collection of news source items that indicated a fuller report of her health status. Moreover, the clustering methodology can allow different news source items associated with the news event or topic of interest to be compared, designated by time or publication, etc. In this regard, any subsequently generated news source items that indicated Mrs. Clinton's health status after she had been examined by a doctor could be linked to previous reports prior to the examination along with an indication of when each news source item was generated vis a vis a timeline associated with the news event's time.

The collection of news source items including all news source items associated with Mrs. Clinton's health in Fall 2016 could then be displayed in the user's newsfeed for selection thereof for review by the user if she desires. Notably, each of the news source items in the collection can be displayed with a generated rating for that news source, if available. This methodology can allow less popular news—that is, news that is less likely to be a "trending topic"—to be presented in the user's newsfeed even if the subject news source item was generated later, such as in a fact-checking article. In a non-limiting example, if the present methodology could have been applied to the subject of Ms. Clinton's health status in 2016, a variety of news reports would have been collected beyond the most popular, and the collection would have appeared in the user's newsfeed. It could be expected that the subject of Ms. Clinton's "good health" would have been less likely to be eclipsed by the more prevalent reports of her supposed "poor health," and the user could have obtained a more accurate view of her actual health status. Moreover, the user could have been presented with information about the lack of accuracy of previous news source items appearing in the collection, especially if the later-added news source items were generated by news sources demonstrated to be more credible via generated ratings. Information about the likely lack of credibility of one or more news source items previously included in the collection can also be useful, such as to generate notifications to the user, generate or enhance news source ratings, or the like.

Figure 7A:
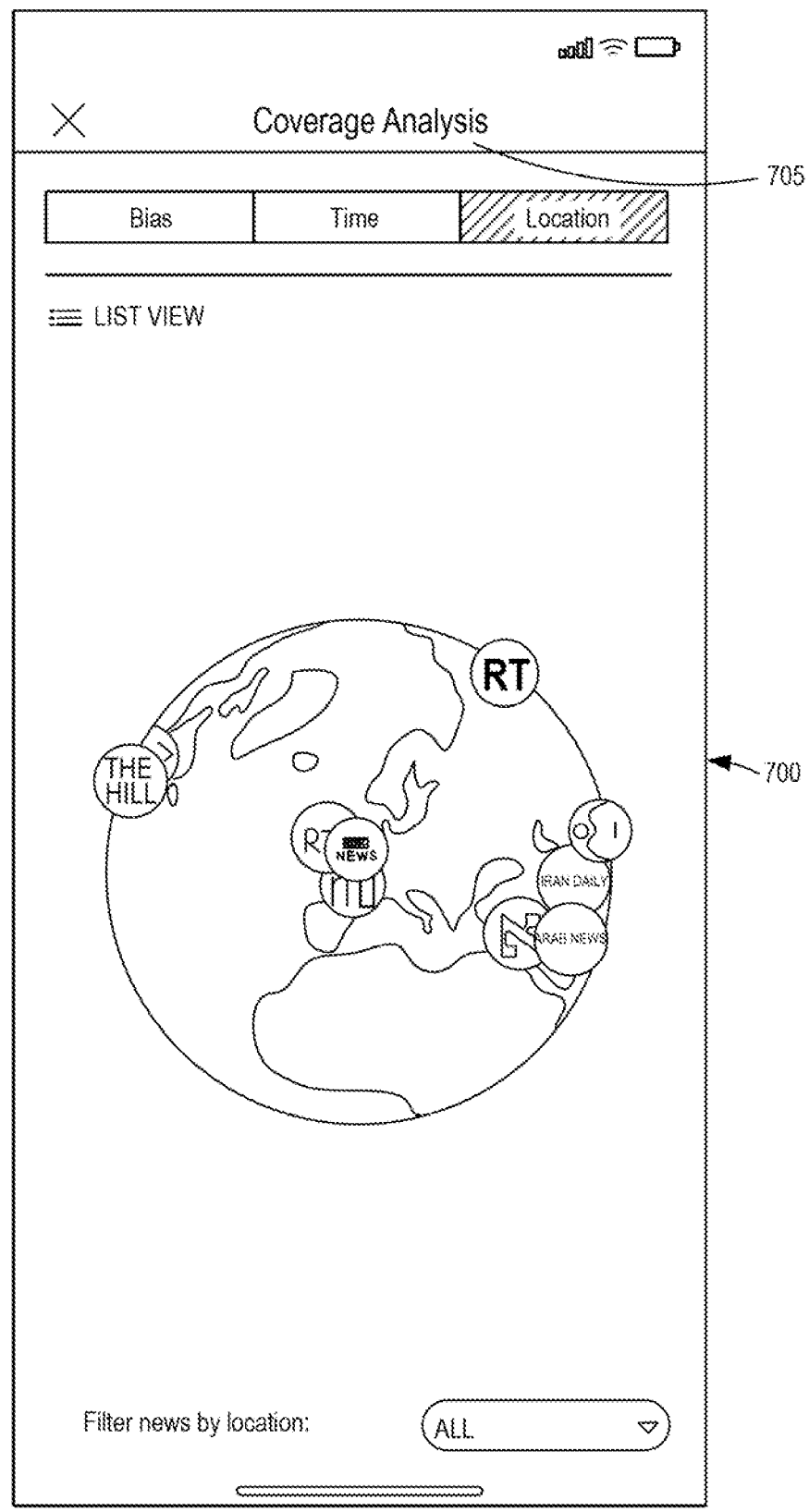
Figure 7B:
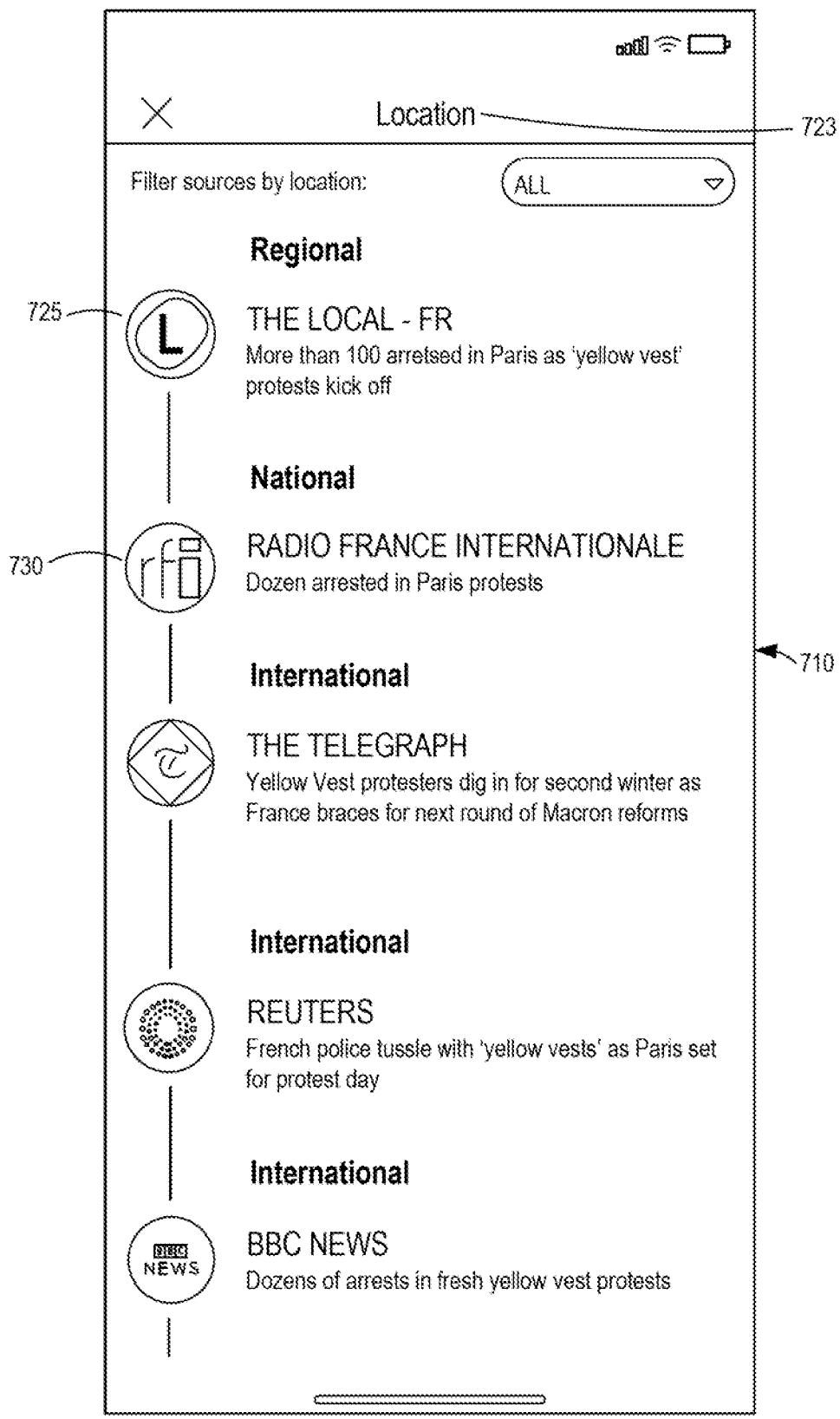
Figure 7C:
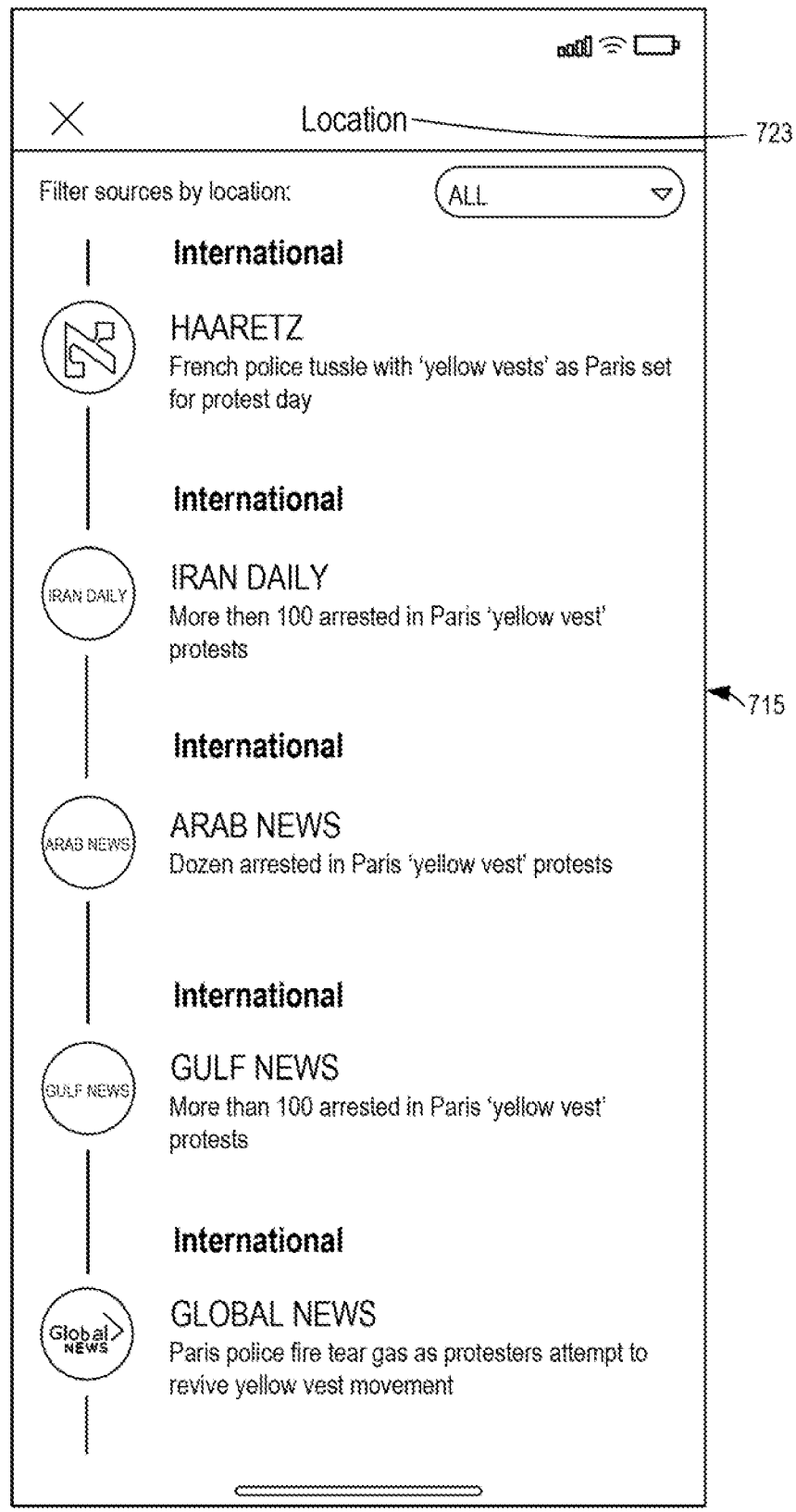
Figure 7D:
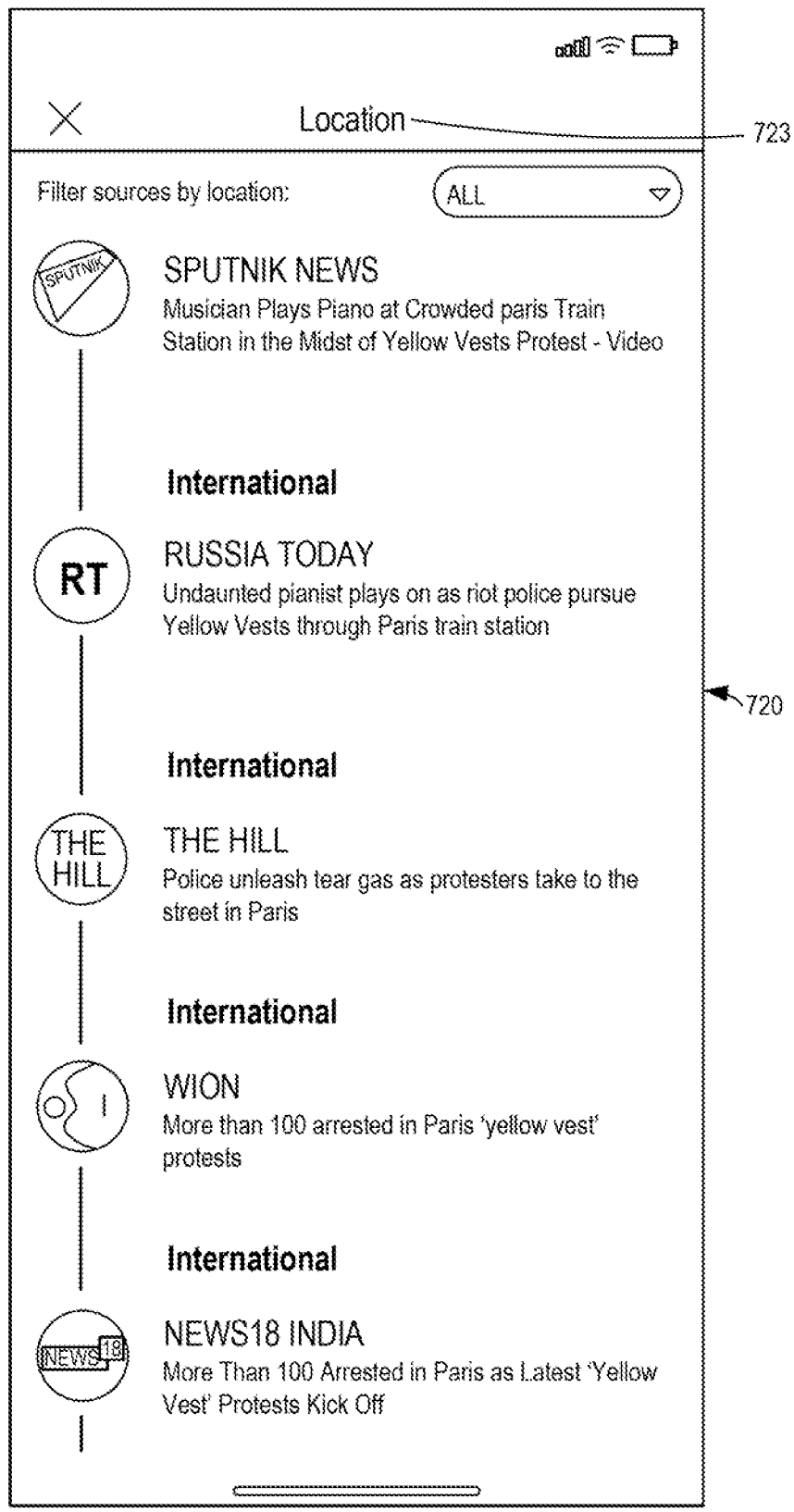
Figure 8A:
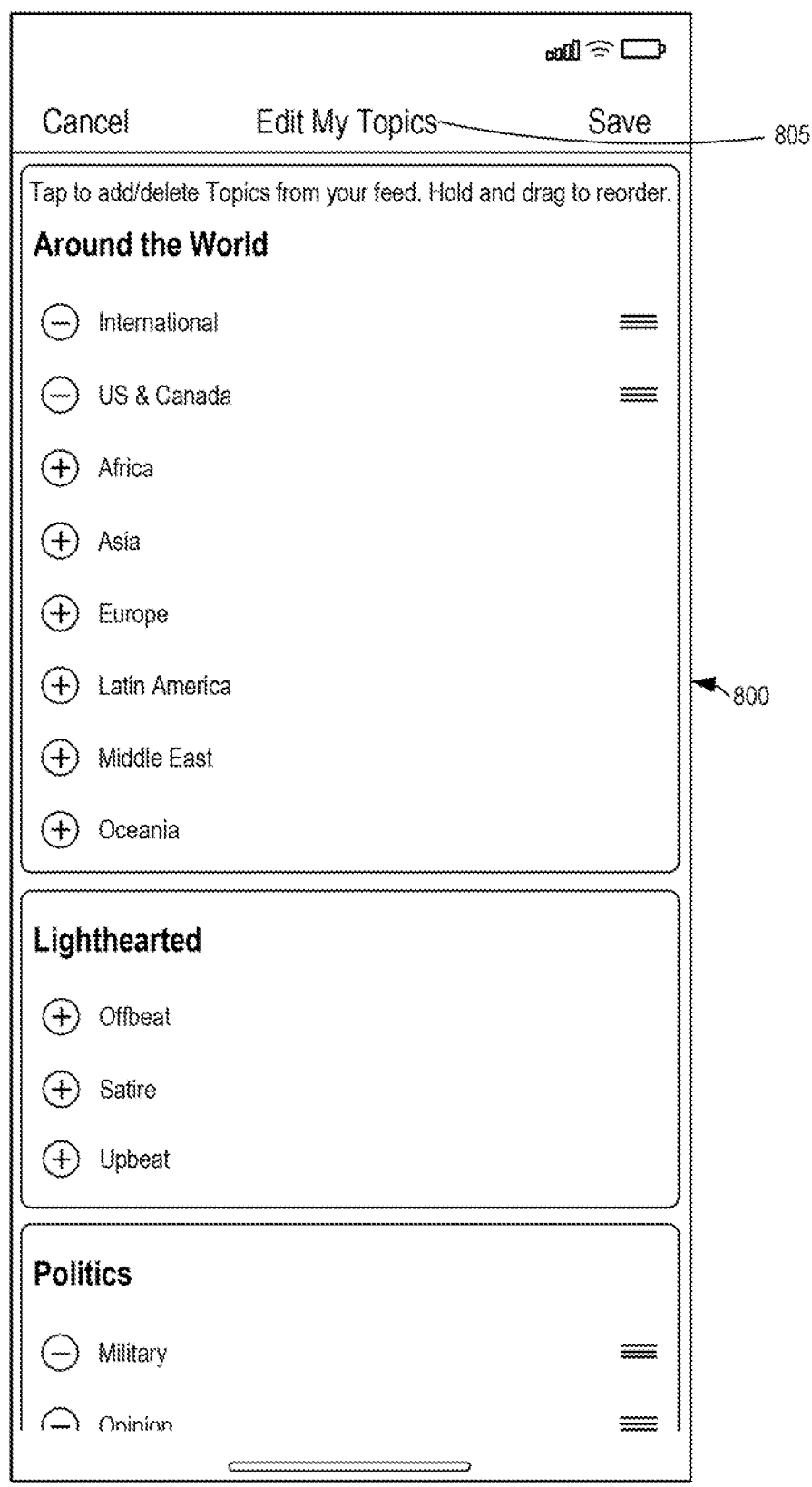
Figure 8B:
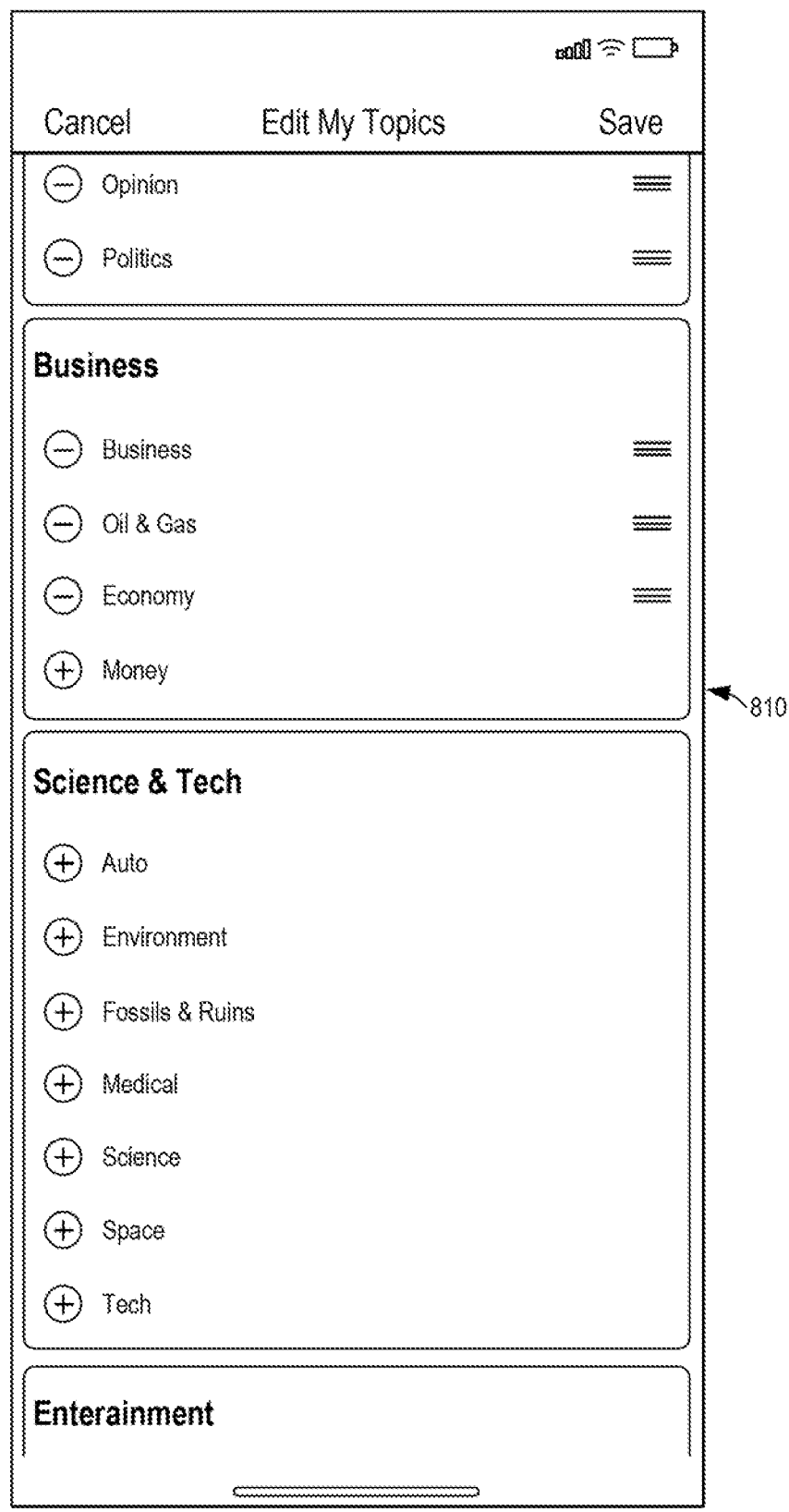
Figure 8C:
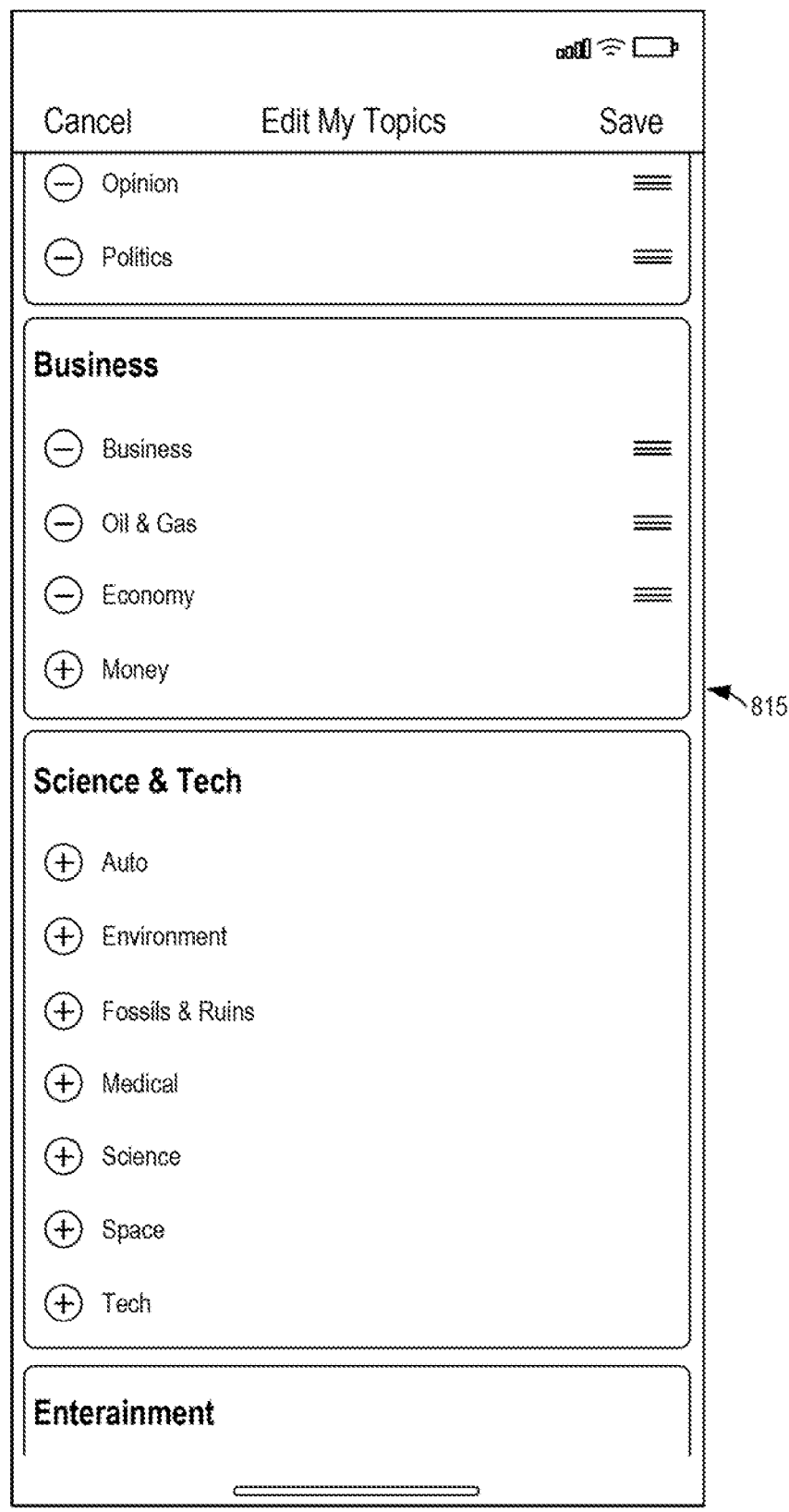
Figure 8D:
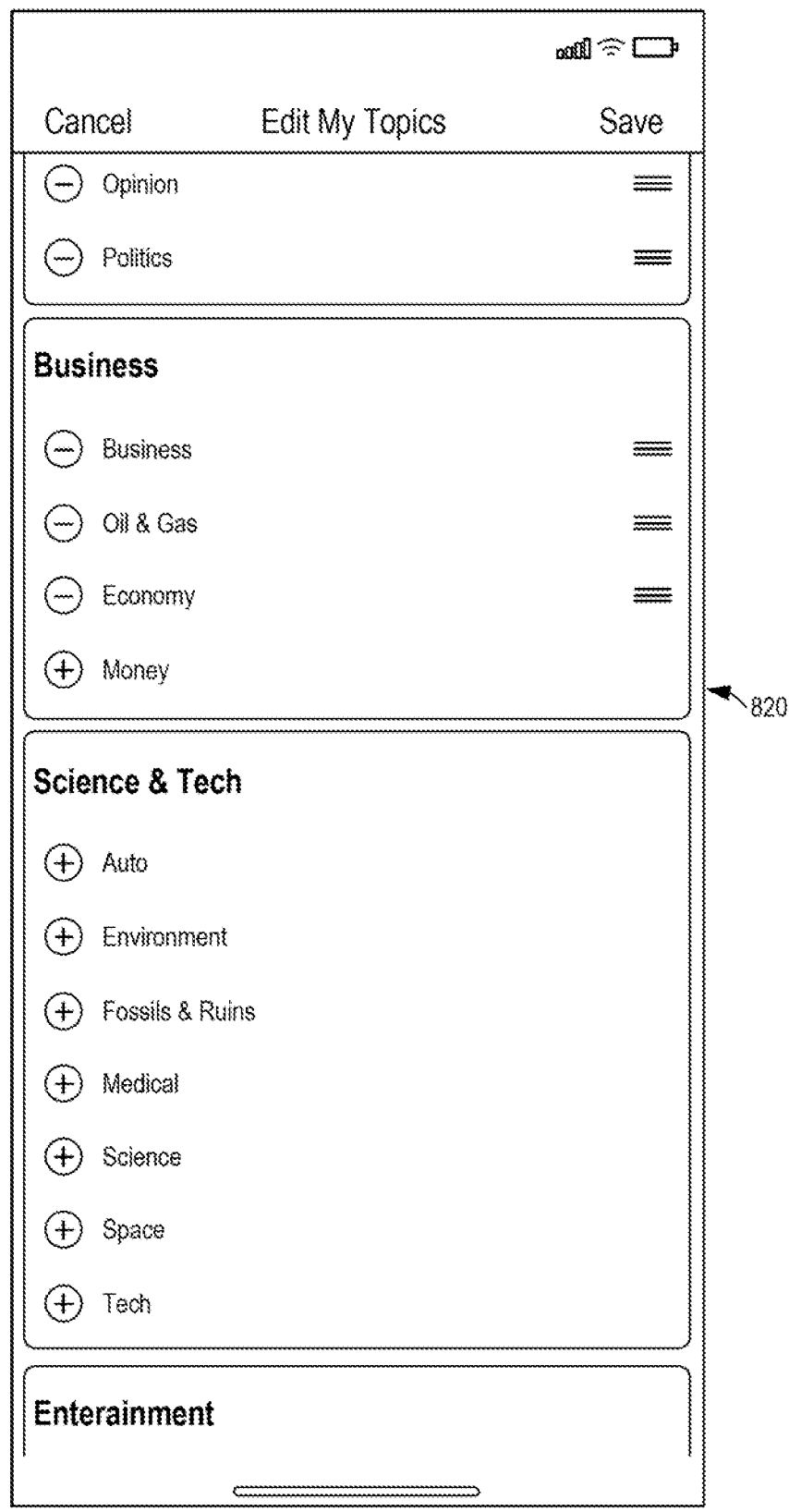
Figure 8E:
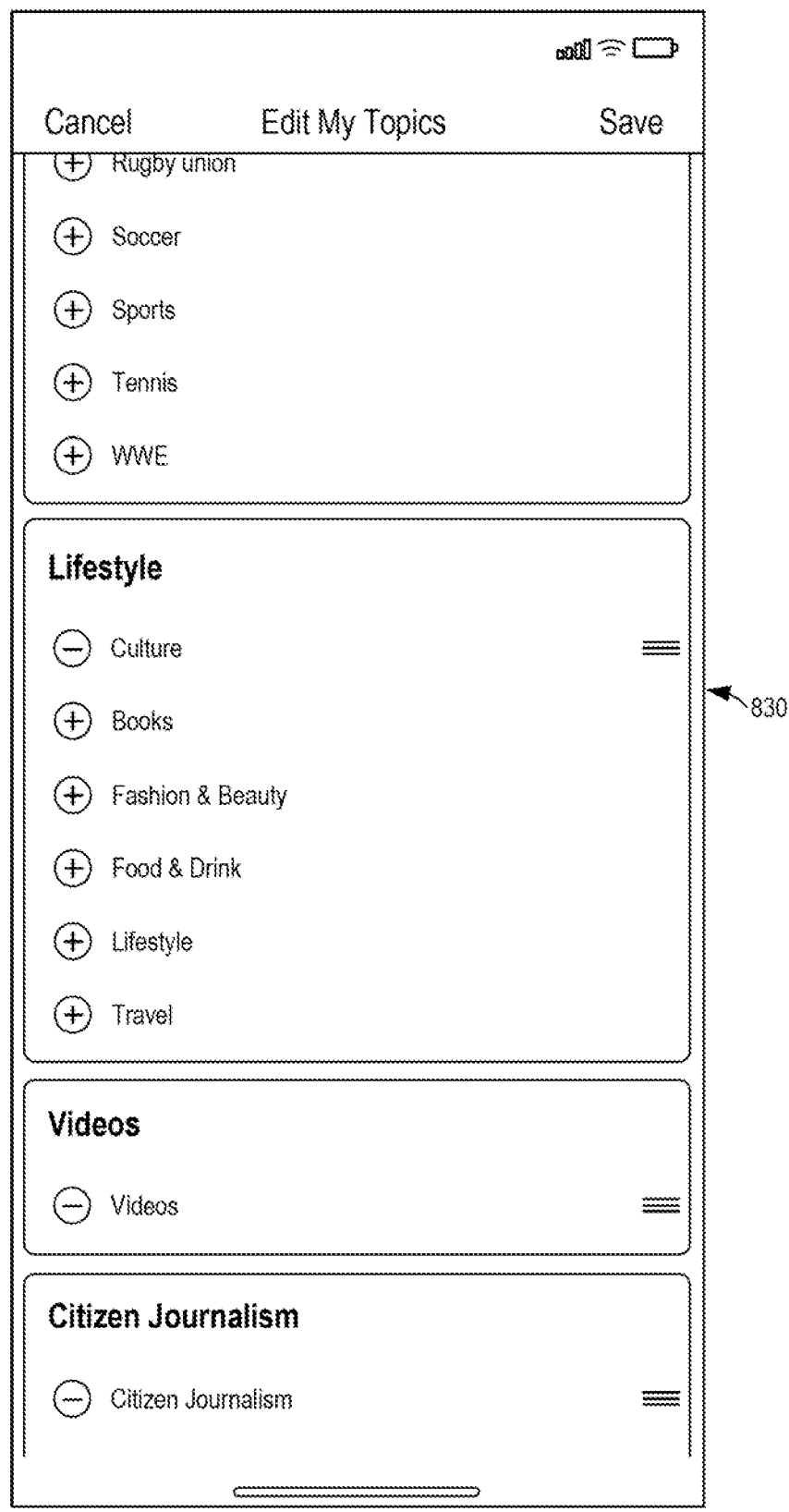

Location of reporting for the news source items in the generated collection can also be provided to a user. Again, using the newsfeed as a non-limiting example, as shown by identified news event or topic 110 (FIG. 1), screen shot 700 in FIG. 7*a* on a globe representation for coverage analysis view 705, and screen shots 710, 715, and 720 on FIGS. 7*b*, 7*c*, and 7*d* show each of the locations of the news sources in collection 140 (FIG. 1) in a list view. Such information can be useful to allow a user to assess the potential factual accuracy of a news source item as function of where it originates by specific news source location 720. For example, it could be expected that a news source item about the Yellow Vest Protests occurring in Paris could be more accurately, or at least would be more timely, reported from a local or national source, here The Local (725) or Radio France Internationale (730), both French publications. It might also be of interest to understand that the first news source item reported and included in the collection for the Yellow Vest Protests appeared in non-French news sources several hours before news source items appeared in the French news sources, as shown by timeline view 605 in FIG. 6*a*. It might then be inferred that these non-French-origin sources (Global News 610 and Arab News 615) might have reported news event or topic 110 (FIG. 1) remotely via second-hand reports, whereas the French sources 725 and 730 could be a more reliable source of in-person reporting.

Such assessments of locality, timeliness, etc. underpin how professional journalists consider the veracity and credibility of news reporting made by others, and the methodologies and presentations of the news aggregation systems herein can allow news consumers to improve their news consumption activities by providing them with such investigatory tools. Information generated therefrom can also be useful to enhance generated ratings for the subject news sources. That is, if a news source regularly found to be reporting news that appears to be based on hearsay or secondhand reports, such information can be used to infer that the subject new source does not incorporate in-person reporters for the generation of news source items. Moreover, as discussed below, information such as age of a news source, number of news source item corrections/updates, etc. can be analyzed to enhance information associated with the generation and/or enhancement of ratings for news sources that appear in the corpus.

Information associated with the sourcing of a news source item can be useful to inform users about a probability that the information therein is true (or not). For example, a news source item that is republished, often with edits that change the original information context to generate a bias, skew, or viewpoint associated with the news source that is doing the editing and republishing can result in news or topic reports that were originally based on correct reporting to change over time to become less or even incorrect/false. To this end, the system can be configured to identify edits/changes/rewrites of an originally identified news source item and to compare the different versions to assess the content and context of the changes in that news source over time. For example, if a news source item is originally from a first news source such as the AP, which is widely considered to be an originator of objectively factual and relatively unbiased reporting, can be tracked as being republished with substantial edits by a second news source (e.g., a "far left" or "far right" rating) with substantial edits to the original news source item from the AP, useful information can be provided therefrom.

In some implementations, a correction can be identified in news sources other than the news source in which the news source item originally appeared. To this end, reporters may provide correction to a statement or report that they made in a social media feed (e.g., Twitter, Facebook, etc.). Such separately presented corrections can be associated with the original news source item to better ensure that incorrect or false information that was propagated by a news source, reporter, publisher, etc. is connected to any corrections issued later that may appear outside of the original news source in which it appeared.

Updates to news source items can also be of interest. While not necessarily "corrections," some news sources may release a news source item in multiple "versions," that is, with updates to add new, additional, or validated information. Professional journalism ethics mandates that such updates be identified to users. Typically, a website will notify users in a header or footer of updates (as well as corrections), and the incorporation of such information can be used to enhance a rating a credibility of a news source. In implementations, the system can analyze different versions news source items describing the same news event or topic in the same news source to identify instances of updates (or corrections) that are generated without notification to users of the presence of the multiple versions, that is, that the subject news source item has been updated (or corrected). Such information can be used in generating useful insights about the news source item, the news source, publisher, byline, author, content aggregator etc., such as for use in providing user notifications or generating a wide variety of news-related analytics.

Yet further, the ability to investigate information that is typically hard to find, if provided at all, about news source items provided in a user's newsfeed can improve a news consumer's news literacy or be useful in information that can provide insights into areas with and without coverage. The absence of a news source in a collection of news source items describing a news event or topic can be akin to "proving a negative." The methodology herein can allow the scope of news event or topic coverage by one or more news sources or type of news sources to be analyzed and information generated therefrom. For example, the system can allow analysis of whether and how a particular event or topic is or is not being covered in one or a plurality of news sources of interest, for example, the number of deaths resulting from a global pandemic in a certain location. From such information a bias, skew, or viewpoint for the subject news source can be generated by the system and/or by a human reviewer. Such information can be useful to generate ratings for the news source, at least because that news source that is found to not report a topic or event that other news source are reporting can be inferred to have at least some bias, skew, or viewpoint against reporting the subject news event or topic.

An additional category available for the systems herein can include news sources that comprise "citizen journalism" so as to allow presentation of content that does not fall into the definition of "standard journalism," but that still might comprise important information, especially in a "breaking news" situation. For example, the Yellow Vest Protests of news event or topic 110 incorporated videos and images generated by people who were present at the location of the news event. Images, video, and audio can be identified for incorporation into a user's newsfeed in relation to a first news event or first topic by use of metadata information, such as geotags, titles, keywords, and the like. Such information can be selected for incorporation into a user newsfeed by a human reviewer, an automated system, or a combination thereof. In some implementations, a human reviewer can confirm the accuracy of an automatically selected image, video clip, audio clip etc.

The corpus of news sources can include a large number of news sources for evaluation to identify news events or topics for which at least one news source item for incorporation in a collection of news source items. The RSS feeds or API's associated with the previously categorized news sources can be functional to provide regular updates therefrom. Web crawlers can also be directed to review the corpus of news sources regularly. As would be appreciated, the identification of a news event or topic in the first order necessitates a corpus of news sources that can be ingested on a periodic basis to recognize an orphan news source item. In this regard, the systems and methods herein are configured to continually ingest information from a large number of news sources that together make up the corpus of news sources available for recognition of a news event or topic therefrom and from which news source items associated therewith can be processed.

As noted, titles, tags, and times assigned to a news source item that are used in the processing herein can be derived from metadata associated with each individual news source item, as well as any information associated with the news source from which the news source item was generated. Such metadata can be expected to be somewhat standardized for news source items generated from a professionalized news source, such as a professional journalist, editor, or someone writing from an academic or professional context. Nonetheless, someone reporting either in an official journalistic context or via social media feed would be expected to use words that would be representative of the underlying event being described such that it would make logical sense to generate a collection of news source items associated with a single news event or topic within a summary of the news event or topic for display in the user's newsfeed.

For example, an article that mentions "El Paso" and "Walmart" and "Shooting" would be different from previous articles that mention "El Paso" because this was a *sui* generis event and, as such, would be recognized. As such, this article would be recognized as an "orphan news source item" in the corpus of news sources, and the El Paso Walmart shooting would become a news event or topic of interest. To this end, the appearance of "Walmart" and "Shooting" along with "El Paso" as an orphan news source item would then comprise a seeding a clustering event against which other news source items having these same or similar words would be automatically identified in the corpus. The "El Paso Walmart Shooting" would be a news event or topic that seeds the generation of a collection of news source items also describing this news event for display in a user's newsfeed as a news event or topic summary. The first news source item that mentioned "El Paso," "Walmart," and "shooting" together would then form a seed post for the first news event or first topic of "shooting in an El Paso Walmart," where additional news source items describing this same news event or topic can also be identified and included in the collection of news source items. A summary of this first news event or first topic can be generated to appear in the user's newsfeed, for example. If the user selects the summary from her device display, she can be directed to the individual news source items associated with this news event or topic. The user can select one or more of the individual news source items for viewing thereof in the user's newsfeed.

The system can be configured to build a profile of each news source in advance of any ingestion of a news source item from that source to identify a news event or topic in the first order or the use thereof in a clustering event. A news source profile can comprise publicly available information of the news source's self-description as per its website, an external description from a third-party such as Wikipedia.com or MuckRack.com, as well as basic information such as headquarters location and year founded, which would help a consumer understand the news source's maturity, scale and mission. Other information can be included to enrich the context associated with a news source. Such information can be selectable from the user's newsfeed or for use in other contexts. To this end, the assigned profile for each news source can include a rating generated by a third-party methodology or otherwise, as discussed in more detail herein. While it is not dispositive for a news source to be assigned a rating before a news source item from such unrated news source is selected for inclusion in the collection of news source items describing the news event or topic of interest, the availability of a rating can facilitate at least some of the consumer benefits discussed herein. In some implementations, each of the news source items describing the event or topic of interest in a collection can incorporate a generated news source rating. In other implementations, at least some of the news sources in a collection of news source items can incorporate generated ratings. In still further implementations, the collection comprises news sources that do not comprise generated ratings.

The methodology herein can comprise a corpus of a large number of news sources from which news source items can be evaluated for inclusion in a user's newsfeed when a news event or topic is identified from an orphan news source item recognized therefrom. The corpus of categorized and indexed news sources thus comprises a database or ecosystem of news sources that can be analyzed and processed according to the methodology herein. More news sources can be added on a regular basis. To facilitate real-time or near-real time news event or topic identification, there can be a preference for including news source items generated from news sources that have already been assigned a rating, that is, the news source is incorporated in a corpus of rated news sources. However, some news sources in the corpus of new sources may not be previously assigned a generated rating. Thus, the absence of a generated rating does not preclude a news source item from such a new source from being included in a collection.

A newly ingested news source can provide a news source for inclusion in a news source item collection without an associated rating for that news source, or the newly ingested news source can be segregated for generation of a rating before a news source item therein is included in a news source collection. A plurality of news source items in a corpus of news sources with and without generated ratings can then be processed to allow any news sources and/or news source items displayed in a user's newsfeed to be presented along with an associated rating, if present.

If a news source item from a news source, byline, content aggregation platform, etc. for which a rating has not previously been generated is identified as an orphan news source item or is identified as being associated with a recognized news event or topic, that news source item can optionally be placed in a queue for review for human supervisor prior to its use as a news source associated with the news event or topic prior to being used as an orphan news source item. Information relevant to rating a news source with generating a probability that a news source item therein is likely to be objectively true or false (e.g., age, owner, origin location, number of corrections, updates, number of news source items previously generated) can be automatically generated to assist in the rating assignment step. To generate a rating for a news source, the human reviewer can perform an evaluation to determine whether the news source is genuine (e.g., not "bot-generated") and, if so, a rating can be generated or derived for that news source, such as by the methodologies discussed herein. In some implementations, a computer can conduct the bias, skew, or viewpoint review, such as by applying modeling to the language used in a plurality of news source items derived from the news source over time. Yet further, both human supervision and computer review can be conducted to generate a rating for a previously unrated news source.

In contrast to the methodology of the US Patent Publication No. 2016/0232241 disclosure, and in one or more implementations herein, there is no element of "friends," "contacts," or otherwise connected users used to select news events or topics for insertion into each other's newsfeeds through interactions with news source items. There may be no need for a user's posting activity to "seed" a news story or topic to trending topics to generate all or part of the user's newsfeed. Collections of news sources describing news events or topics of interest can be generated by the recognition of an orphan news source item and clustering of similar news source items to generate a collection of news source items associated with the first news event or first topic can be through identification of other news source items describing the same news event or topic through one or more of metadata extraction, NLP and assisted prediction machine learning on using previous linkages between news sources and news source items.

Yet further, once ingested, a plurality of news source items can be separated into one of a plurality of pre-assigned topics or categories, which may be quite numerous. For example, and as illustrated in FIGS. 8*a*-8*e*, for topic preference listing 805 (i.e., "edit my topics"), a wide variety of categories can be included as groupings for topics by which a first news event or first topic and associated news source items can be grouped. An assortment of topics is shown on screen shots 800, 810, 815, 820, 825, and 830. Such topics, and others, can be beneficial for the clustering step.

A further aspect of the methodology comprises generation of classifications by sections in a wide variety of topics. Examples can include "politics," "tech," "football," or any number of additional classifications. In one aspect, an initial classification is performed when a profile is generated for a news source. For example, "Motortrend," is assigned the category of "auto," when a profile is built for this publication.

In addition to the generation of a durable news event or topic by which to collect a plurality of news source items associated therewith, a further aspect of the methodology herein can comprise the clustering of a plurality news source items describing a first news event or first topic as a function of publication/origination time. This characteristic can allow news events or topics to be arranged according to the time at which they develop, for example, early/breaking, evolving, and after the fact analysis, for example. As would be appreciated, the ability of a user to understand the nature and content of a news source item in the context of the time in which it was reported can improve the understanding of a news event or topic by the user. Moreover, such temporal information can allow a user to better gauge the likely accuracy of a news source item presented to her, with early reports possibly being gauged as less credible than later reports regarding the same topic or event.

There could be a wide variability in the overall content of news source items that are generated at various times. It can reasonably be expected that both professional and citizen journalists alike would likely assign titles and tags to such information generated by then about a shooting in an El Paso Walmart will include the words, such as in the title or in the text thereof that at least include the words "shooting," "El Paso," and "Walmart." Thus, the appearance of such words in an orphan news source item recognized by the system can then serve as a news event or topic against which other recognized news source items are clustered. The topics associated with the "Walmart El Paso Shooting" would also change over time. To this end, initially, the reports would likely focus on the victims primarily; later, reports could be expected to focus more on the shooter and his motives. Each of the victims and the shooter can be included in a news event or topic of "Walmart El Paso Shooting," as well as in separate news events or topics each associated with the victims of the shooting, and the shooter and his motives. In other words, a single news source item can be included in multiple collections of news source items depending on the context that may result in the generation of multiple news events or topics having different assortments of news source items in generated collection.

The review of the content of the news source items can be in text form, such that NLP can be performed on the text content thereof, with the orphan nature of a second news source item being the identification of a material difference in a story about a particular subject matter that can signify a temporal aspect of a news event or topic, such as in the switching of a news event or topic that is underway to one that has happened in the past, but that is still a relevant news event or topic for presenting to a user's newsfeed. Text content review can be helpful when an audio feed has been transcribed from video or audio news reports. For such feeds, tags, metadata, etc., can also be analyzed. In some cases, it will not be possible to review all of the content of a news source item to make a conclusion if a suitable confidence level can be generated to substantially prevent the generation of false positives.

An aspect of the disclosure herein comprises the clustering of a plurality of news source items according to time associated with the publication thereof. Such clustering can provide highly useful insights that can be used to generate information for display in user newsfeeds, as printed or displayed reports, as dashboard configurations that allows a large amount of information to be reviewed and analyzed simultaneously, as well as for use as information sets in machine learning processes as discussed hereinafter.

In one example, the clustering methodology herein can allow a plurality of news source items describing first news event or first topic to be separated by time such as by separately clustering news source items associated with a first news event or first topic according to a first time period, second time period, third time period, etc. This can allow identified news events or topics that extend over longer periods to be reported as a function of time of the reporting. Such time-based clustering of news source items can allow the temporal aspects of a news event or topic of interest to be separated for display in a newsfeed or for use in other frameworks. As discussed, "breaking" news that is just emerging is more likely to be associated with factual errors, reporting inaccuracies, and subsequent clarifications. If such early reporting for a first news event or first topic is combined indiscriminately with later reporting, a user newsfeed comprising a plurality of news sources associated with a single news event or topic can include, without distinction, news source items ostensibly reporting the same news event or topic, but that should be gauged with different assessments of the degree (or not) of factual accuracy in the reporting. This is not to say that a news source item that is generated from a news source that is present in the corpus of news sources and for which a profile exists will intentionally include factual errors, but this is often a nature and characteristic of breaking/early stage news reports. When a user seeks to better understand whether the news sources presented in her newsfeed are more or less likely to be accurate or error free with respect to the facts incorporated therein, ability to evaluate the news sources associated with a first news event or first topic as a function of time can be beneficial, as shown in FIGS. 6*a*-*d*, for example.

Other useful clustering frameworks for news source items information generation can be by one or more of the following criteria: time decay (i.e., the age of the first news event or first topic), available images or video content; comments; number of news articles merged and, optionally, a rating or selection by a human supervisor who is directing or at least confirming the validity of at least part of a clustering process. In some implementations, ratings for a news source for inclusion in a clustering event can be enhanced when there is a larger number of sources, references, or links in a subject news source item, as it is generally understood that such can provide a higher level of credibility to a subject news source item.

News source items can be identified as being associated with, or as describing, substantially the same news event or topic if each includes the similar keyword commonalities in one or more of the headline/title, byline or text of each news source. Publication/origination time—that is, the time the news source item is generated as shown by the meta-data and/or by the corpus of news sources (e.g., an identified changes in the contents of news source database that is the corpus) can also be relevant, where the time evaluation can be gated to a period of less than about 24 hours, or about 12 hours, or about 8 hours or less. In applications, the news source items can be analyzed as function of the publication time, with publication times of greater than a selected time period from a current time being excluded from inclusion as a single news event or topic in some implementations. Put another way, a first time and a second time can serve as a gating criteria for a first news event or topic. Thus, a user can review a plurality of collections describing the news event or topic where each generated collection is associated with a specific time period.

Once clustered, the news source items describing a news event or topic can be filtered to limit the generated information to only that which aligns with the user's preferences for news event or topics that align with certain topics. For example, a user may wish to obtain in her newsfeed only news source items that correspond to information in which she is interested in reviewing. Such preferences can be selected, for example, from those identified in FIGS. 8a-8e. When setting up a newsfeed, report, dashboard and/or information set for use with the methodology herein, the user can select categories for news source items. For example, she can select topics, locations, news sources, places, bylines etc. As noted, the news item content associated with such selections can be presented along with other content, as discussed elsewhere herein. News aggregation that incorporates user preferences for the presentation of news source items in a user's newsfeed are well-known. For example, the previously incorporated Facebook '241 Publication details such methodology. Such clustering steps can also be applied when the generated information is incorporated in a report, dashboard, or information set.

In some implementations, a clustering process can be conducted with at least some human supervision to assist in the appearance of false positives, for example. As would be appreciated, a human reviewer or supervisor can apply a form of reasoning to the content of a news source item in relation to other news source items grouped together to better determine that the clustering that is used to generate the news source items collections is accurate. A false positive from the news event or topic identification step can occur when similar stories share common facts or generate similar metadata associated with the event but refer to different events. For example, two news source items can include similar titles, tag, geotags etc. in their respective metadata. An example of this could be when there are reports of unrelated two fatal car pedestrian accidents that occur near each other in a city. If these two events are registered or indexed together as relating to the same news event or topic, a conclusion may be made that these two accidents are, in fact, a planned contemporaneous attack on pedestrians by a vehicle or vehicles. Such incorrect reporting can lead to incorrect beliefs, assumptions, etc. that can cause readers to infer that a terrorist or other form of coordinated attack may be underway. For news sources that are more often to focus on sensationalized news, an early incorrect co-registration or indexing as two actually unrelated events can lead to the spread of "fake news." In some implementations, the systems and methods herein can reduce incorrect indexing of one or a plurality of news source items with an orphan news source item that is used as a seed news source item to identify a news event or topic. Such validation methods can be conducted in near real-time to provide correct combinations of news source items at a greater than 99% accuracy, meaning that, with the methodology herein, it can be less likely that news source items will be incorrectly clustered.

A human reviewer and/or machine learning system can be configurable to reclassify a news source item when review indicates that the subject matter of the news source item does not conform to that of a previously generated identified news event or topic and/or news source item clustering event. An example of such classification is when a news source item in MotorTrend.com is about the business viability of Tesla. In this case, the category can be reassigned automatically if a human reviewer and/or a machine learning process identifies a better or more accurate category for the news source item. This can improve both at least the clustering step aspect of the processes herein.

In some implementations, the automatic clustering of the news source items can be at least partially reviewed by a human supervisor or reviewer for the appropriateness of the clustering of the news source items as being associated with the news event or topic of interest. While such human review might, at first, be thought to potentially introduce selection bias into the new source identification process, in fact, this step can serve as a check on the algorithmic bias that might result from the news event or topic identification and/or clustering steps. If identified news events or topics are mis-identified and/or news source items are not clustered correctly, the user may obtain incorrect information about a news event or topic. In some circumstances, it may be determined that an identified orphan news source item was generated in error, meaning that the event did not even occur, even while there might be multiple reports of such event that would be clustered for display to a user in her newsfeed. A human reviewer can therefore substantially prevent such erroneously generated news source items from being included in a collection thereof.

As would be appreciated, relegating a human reviewer to confirm the previous steps (i.e., news event or topic identification and identification of news source items for association therewith) can greatly accelerate the information generation processes over the methodologies discussed previously. Accordingly, the methodology herein can be suitably used in breaking news situations where it is desirable to be able to provide news source items to a user close in time to when the event or topic occurs, that is, when it is still "breaking."

Yet further, such automatic news event or topic identification and clustering steps to generate a set of news source items for potential display to a user in her newsfeed is an improvement over news aggregator products that rely solely on human selection of news source items for newsfeeds, at least because of an ability to quickly recognize newly occurring news event or topic that can be relevant for delivery news source items to a user's newsfeed along with ratings for each of the news source items. The automated identification of orphan news source items to generate a news event or topic of interest along with the continuous ingestion of potentially a large number of news source items that can be clustered in relation to such news event or topic can improve the speed that news event or topics can be both identified for reporting in a user's newsfeed, as well as making sure that they are reliably reported therein.

Moreover, at least some review, by a human, via machine learning, or a combination thereof can further improve the timely composition and delivery of news to a user in a newsfeed, as well as improve the value of information generated from the methodology herein when to be used to generate reports, for configuration into dashboards, or for use in information sets that have utility in machine learning processes. In this regard, data derivable from the human supervision step can be used to seed the clustering machine learning algorithms for continuous improvement thereof. Thus, it is expected that, over time, the news event or topic identification and clustering steps can be improved, thus reducing the need for human supervision. However, it can be expected that at least some human review can be beneficial to serve as an ongoing check on the output of the algorithms so as to better maintain the quality of event identification and associated news source item display to the user. While it is possible that at least some human review might be needed to ensure the correct clustering of news source items over time, it is expected by the inventors herein that the machine learning processes can be suitably trained to reduce the amount of human supervision needed in the future.

While news aggregator products SmartNews.com and Allsides.com provide ratings for news source items presented in newsfeeds provided, the need for human selection of news source items prior to delivery to user greatly reduces the speed with which a news event or topic of interest is reported to a user. The methodology of the present disclosure has been observed to permit faster identification-such as closer to real-time—of new events or topics that may otherwise stay "under the radar" as when a human would be required to recognize the significance prior to identification of a news event or topic on the Smartnews.com and Allsides.com platforms as "newsworthy." Moreover, by using human review as a check against event identification and clustering results, the methodology herein offers the ability to prevent erroneous event information from being generated as news event or topic information that will have to be corrected or rescinded. Notably, a news item can be delivered, such as by a user's viewing of it in her newsfeed, the process cannot be undone, for example, a user cannot "unsee" the news source item. This means that it can be important to reduce the inclusion of news source items having inaccurate information in a collection of news source items, such as in a newsfeed. With the combination of automated news event or topic identification and news source item collection generation in conjunction with at least some human review step and/or application of machine learning processes that are based, at least in part, on information sets generated from human review of previously run collection generation events, a balance can be provided with the present methodology between fully automated/algorithmic editorial control and purely human editorial control. As such, the present methodology can allow better management of the ever-expanding number of news source items that need to be reviewed today, while still providing a news consumer with a greater range of viewpoints about a news event or topic in a timely fashion.

In some aspects, a set of user preferences can allow identification of news source items that can be delivered to the user's newsfeed, or that are useful in report form, configured as dashboard information, or for use in information sets. If a user likes or otherwise engages with one or more of a byline, news source or a specific news event or topic, this information can be included in the development of subsequent information that can be specifically useful for a user, manager, publisher, etc. Engagement information can be derived for a user from not only selecting the article in the first order, but also by generating metrics associated with a user's substantive interaction with the article. Such substantive activities for written news source items, such as articles, blogs etc., can comprise one or more of scrolling through the article, highlighting of portions of the item, clicking of links embedded in the item can be used to enrich user preference information for subsequent application in newsfeed content generation for the user, a group of similar users etc. For audio or video-based news source items, substantive engagement for the user can be measured by how far the user gets through the audio or video content.

For example, if a user engages with an article about horse racing, such information can be used to include such a topic in subsequent news source and news source item content for that user. Yet further, frequent engagement, such as shown by co-visitation by a user, with a particular news source or an aspect of a news source (e.g., a section, topic, author, etc.) can also be used as information that can enhance subsequent news source item delivery for a specific user. If a user often reads several New York Times articles through to the end of an article as indicated by scrolling activity, that information can be used to deliver more content from the New York Times to the user in a newsfeed, for example. Engagement activity can also be classified into byline, author, and/or topic, among other things. If the New York Times reader appears to read all of some New York Times content, but not others, the news item sources can be evaluated to assess engagement at a more granular level. The user may engage with some reporters but not others, or some topics but not others.

The delivery of news source items to a user that aligns with content (e.g., events or topics, news sources, bylines, etc.) to which the user has previously shown affinity, as indicated by engagement information discussed elsewhere herein, can be associated with a news event or topic having a plurality of news source items available, where each of the plurality of items can be associated with a rating. To this end, when a first news source item is identified as being relevant to one or more user preferences for topic, byline, source, publication etc., and a news event or topic can be identified as being associated with that first news source item, additional news source items can be identified for that same news event or topic for inclusion in the first collection or in further generated collections, as appropriate. This process can allow a news source item generated as a result of user preferences to appear in the user's newsfeed or for use by the user in other forms (e.g., as a report, in a dashboard configuration, or in the generation of an information set for use in machine learning processes), along with other content associated with that same news event or topic as a generated collection of news source items. Thus, the system can facilitate personalized content feeds for users that comprise a broader range of bias, skew, or viewpoints.

Consider the situation where a user engages with an article on demonstrations occurring in a US city by citizens who are protesting a recent mass shooting and advocating for increased government intervention to reduce the proliferation of assault weapons. A user who holds a viewpoint that government restrictions on gun ownership is a bad policy may engage with a news article that takes a harsh view of enhanced government regulation. Moreover, the typical newsfeed generation process that relies on user engagement metrics will typically deliver more news source items of the same type, tone and tenor to that user, thus further decreasing the variability of the viewpoints presented to that user. Put another way, existing news aggregators, publishers, content moderators etc. are incentivized to improve user engagement metrics will provide more of the same content type to the user since the goal of those monetizing such content platforms is to increase the time that a user spends with individual items of content, and with the platform overall.

In contrast to such "siloed" nature of newsfeeds or other news source item information frameworks generated by presenting more of the same type of content to a user, the systems and methods herein not only provide the content expected by a user associated with a news event or topic of interest—that is, content for the news event or topic that aligns with the viewpoint as indicated by her previous news source item engagement, specific news source item selections, and indicated news source preference selections—the user can also be presented with content for that same news event or topic that is generated from a plurality of news sources having different bias, skew, or viewpoints. For example, if a user typically engages with content on "left-leaning" news sources, standard newsfeed generation methodologies may typically populate her newsfeed for a news event or topic with articles generated from left-leaning sources. The present disclosure can provide the user with not only news item sources from the typical left-leaning news sources that are identified from a corpus of news sources, but also will provide her with news item sources from news sources that are, for example, assessed to comprise viewpoints that are "neutral," and "right-leaning." Moreover, such plurality of news sources having differing bias, skew, or viewpoints can be presented to the user, for example, in a format that allows the user to engage with more than one news item source associated with the same news event or topic, as well as providing a visualization of the rated bias for each news source. It follows that a user can view, in real time, how a plurality of presented news source items associated with a single news event or topic of interest to her appear on a viewpoint spectrum scale.

In a further implementation, the disclosure comprises methodology to identify one or more news source item news events or topics that may be missing from one or more news sources. For example, one or a plurality of news events or topics can be identified in a corpus of news sources over one or a plurality of time periods. A user or a computer can also select a news event or topic and the corpus of news sources can be reviewed to determine whether the selected news event or topic is present or absent from one or more of the news sources therein. In some use cases, the absence of a selected news event or topic from one or a collection of news sources can signal the presence or absence of bias therein. As an example, when "Climate Change" is selected as a news event or topic by a user or a computer, a collection of news sources can be examined to determine whether that news event or topic is present or absent. The inventors have found that identification of the absence of news event or topic coverage can be facilitated by the review of a corpus of news sources, as is possible with the present disclosure. The absence of coverage from one or more groups of news sources can be characterized as "blind spots" for each collection in which a selected news event or topic because persons who read only news source items derived from such sources will be "blind" to such topics. Such blind spot characterization can also be applied to the absence of specific news source items that are identified for presentation in a newsfeed.

Such blind spots can have value for users who seek to understand the scope of coverage from one or a collection of news sources. The blind spot information can be configured for presentation as a user newsfeed, in a written or printed report, as a dashboard, or for configuration as information sets for use in machine learning processes. Such presentation can be formatted along an axis showing the rating (e.g., left, center, right) of the presence or absence of the news event or topic of interest to provide the user with an indication of those new source(s) in which the news event or topic appears, as well as where it does not appear, where such non-appearance is shown by an absence of such news source in a listing of the news source item of interest. Yet further, a collection of news sources can be generated where each of such collection includes or does not include the news source item of interest. The blind spot information can also be configured as a function of time to see if the presence or absence of a specific news event or topic in a news source has changed over time.

Such blind spot characterization can also be used to inform the managers of the subject news sources (i.e., the editors or publishers) from which the information is derived, as well as competitors, educational institutions, advertisers, governmental agencies, or the like as to whether a news event or topic is or is not covered in one or more news sources and, if it is covered, the frequency, amount, and characteristics of such coverage.

To this end, an entity that seeks insights into whether a particular news source or group of news sources does or does not include news source items associated with a news event or topic(s) of interest can perform a query that identifies news sources where and where not such topics are included. The corpus of news sources can be searched to identify news sources items having different amounts of coverage in a plurality of news sources. The plurality of news sources of interest can be selected by a user for search or the system can be configured to automatically identify the news sources in which the news event or topic of interest does or does not appear.

In relation to coverage of one or a plurality of news events or topics of interest, or lack thereof, a coverage distribution can be configured into a dashboard form. The dashboard can be configurable to identify coverage by one or more of ratings (e.g., "left," "center," "right" etc.) for a collection of new sources to allow a user to review a concise characterization of coverage over a number of news sources. The information can also be configurable to allow coverage distribution to be provided as a function of news event location, news source location, news source owner/publisher, news source identity (e.g., an individual news source by itself), content mediation, and news event or topic, etc. This list is not meant to be limiting, however; the coverage distribution can be arranged for presentation in any manner that might be useful in context. The coverage distribution information can also be provided in a summary report form. Yet further, the coverage distribution information can be used in machine learning processes as discussed herein.

In further broad constructs, the systems and methods herein enable a user to receive a news source item associated with a news event or topic in a social media environment where news events or topics may be presented for along with other content appearing in a social media feed on a social media platform. As noted previously, social media platforms have become a primary source of news consumption in recent years for many users. Often news is presented in social media feeds without context such that a user may be unable to assess the credibility or sentiment of such news source items. The inventors herein have determined that it is possible to enhance a user's news consumption experience when news events or topics are provided in a social media environment along with other social media content in a user feed using the innovations developed for use in a newsfeed environment as discussed elsewhere herein.

As used herein, a social media feed can be associated with any currently available social media platform (e.g., Twitter, Facebook, Instagram, Reddit, SnapChat, TikTok, LinkedIn, Twitch, Discord, YouTube, Substack, etc.), as well as any social media platforms that may emerge in the future on which news source items associated with news events or topics can be included as social media content. In use, a social media feed on a specific social media platform may comprise a plurality of social media feed content items that comprise a user's social media feed, some of which may or may not be associated with news events or topics as well as other social media feed content that may not be related to news events or topics (e.g., photos, videos, memes, social media posts from persons/companies, advertisements, etc.).

In implementations, the corpus of news sources can include individual social media accounts for news sources. As would be appreciated, news companies, news organizations, and media personalities (bloggers, independent journalists, etc.) can publish news source items and thus may have social media accounts for one or more social media platforms. Users can interact with such social media accounts on their own social media feeds associated with their own social media account. For example, a user who follows The Washington Post on Facebook may be provided with news source items describing news events or topics from her feed from time to time. The bias, skew, or viewpoint rating of a news source's social media feed will typically be substantially the same as a bias, skew, or viewpoint rating of the news source itself. Thus, the assigned bias, viewpoint, or skew rating for the social media account of a news source that existing within the corpus of news sources can be assigned therefrom.

For social media accounts not owned by news sources, such as those owned by persons (or "third parties") who themselves interact with news sources, news source items, and news event or topic in their own social media accounts, a bias, skew, or viewpoint rating can be generated by an analysis of news information associated with news sources appearing in their social media feeds. In this regard, for a user of interest the news sources with which a person interacts—or engages with—in her social media feeds, such as by subscribing, selecting/clicking, quoting, liking, re-posting, etc. can be evaluated to assess engagement of a user with news sources having a bias, viewpoint, or skew rating selected from a list of ratings. The engagement of a first person with the social media content of a third party can also provide insights to a bias, skew, or viewpoint associated with the first person's news diet, at least because the first person can be expected to be influenced by third party social media content. Moreover, the bias, skew, or viewpoint ratings of social media content ingested by the third party can also be useful to assess. A percentage or ratio of engagement with each of a plurality of bias, skew, or viewpoint ratings for a plurality of news sources and/or social media accounts can be generated or each of the first user, the third party, or for others. The bias, skew, or viewpoint rating can be configured as information for display, reports, dashboards, or for use in machine learning processes.

Other social media accounts with which the user interacts in her social media account can also be assessed for bias, skew, or viewpoint of the news sources incorporating a news source item describing news events or topics therein. A user's social media accounts may be analyzed to determine engagement with other social media accounts, such as by subscribing, liking, selecting/clicking, quoting, or re-posting. The news sources with which those social media accounts engage can be analyzed to identify a bias, skew, or viewpoint for each, and such bias, skew, or viewpoints can be presented to a user for review or as other useful information. The social media accounts with which the user engages most can be identified as "influencers" for the user and generated bias, skew, or viewpoint ratings for these influencers can be associated with a user of interest in some contexts such that the user can be expected to share or at least align in some way with the view of a social media account that is a "top influencer" for that user. However, in other contexts, a high degree of engagement with a social media account may signify that a social media account is disfavored, such as when a user re-posts a social media account where such re-posting is accompanied by a negative sentiment. Thus, any degree of engagement can be analyzed with other information available for a user of interest to validate a generated bias, skew, or viewpoint rating for that user.

In some implementations, the social media accounts associated with news sources in the corpus of news sources can include a plurality of "verified accounts." As would be appreciated, a "verified social media account" is a confirmation that the subject account is owned and operated by a specified real individual or organization. A number of websites, for example social media websites, offer account verification services. Verified accounts can be, and are often, visually distinguished by, e.g., check mark icons or badges next to the names of individuals or organizations. For example, on Twitter a "blue check mark" next to an account name shows that Twitter has confirmed that the subject account is owned by the entity that appears as the owner of the account.

A news event or topic can be identified from other content in a user social media feed by the recognition of news information associated with a news source in a social media feed. In this regard, a news source can be associated with an intent or purpose of providing news source items to users and, thus, the recognition of that news source in a user's social media feed can serve as a signal that a news event or topic is present, where that recognized news event or topic can be distinguished from other "non-news" content appearing in the user's social media feed. Thus, the corpus of news sources as described herein is populated with news sources identified via marking, tagging, or other news information otherwise being recognizable as being associated with an intent and purpose of providing information about news events or topics to the user when the news source appears in a social media feed.

In implementations, a new source event or topic can be identified from the identification of news information such as a known uniform resource locator ("URL") for a news source. In an example, a collection of URLs for a news source where such URLs are known to be associated with news events or topics that can be identified in information used to generate a user social media feed. In this regard, news sources incorporated in the corpus of news sources will typically include standardized tags that are searchable, for example, a news source such as the Washington Post will create tags for organization and classification of the subject content. The identification of a news source item in the Washington Post having a URL associated with a category that is known to be associated with news events or topics can operate as the news event or topic identification in a user social media feed.

In some situations, a news source may include content that cannot be automatically identified as being (or not being) associated with news events or topics. In this case, the processes can be configured to not identify the news source item as a "news event or topic." This news source item can then appear in the user social media feed without added content from other news sources in the corpus of news sources. The processes can thus be configured to identify news events or topics, and any collection of news source items from a plurality of news sources that describe the identified news source events or topics, only when there is a high degree of confidence in such identification. Such "high confidence" can be provided when the subject URL or other standard categorization that is known to be generated for "news events or topics" has been validated by a human, for example. It can be expected that any news source items appearing in a user social media feed that also includes the previous validated URL or other information can also be associated with news events or topics.

It can be beneficial to have at least some human review of the identification of at least the seed content that serves as a basis for other information generation. For example, not all content generated from news sources appearing in a social media feed may be associated with news events or topics. Some news sources may push out a mix of content that is "real news" and other content that may be opinion, advertisements, etc. To better ensure that news source items are properly identified as describing news events or topics appearing in a user social media feed, a human can review any recognition of news information associated with a news source and/or news source events or topics in a user's social media feed content. The results of such human review can be propagated to other user social media feeds in some implementations.

In some implementations, a user social media feed content item that is not associated with a URL or other standardized categorization not known to be associated with content typically describing "news events or topics" can be identified by the user's engagement with the content in her social media feed. For example, content appearing in user social media feed may not be identified as news source content that describes a news event or topic in the first order, such as when a URL or other information associated with the social media feed content item does not indicate that the subject content can be considered to comprise "news." However, engagement of a user with the content, such as by selection of a news source item appearing in her social media feed, can serve as a seeding event upon which a news source item is identified. Once a social media feed content item is identified as a news source item, a news event or topic can be generated, followed by the collection of additional news source items describing that news event or topic as discussed elsewhere herein.

Any news source that is in the corpus of news sources, some of which can be associated with bias, skew, or viewpoint rating from a generated list of ratings, can serve as a mechanism for recognition that a news source item associated with a news event or topic may be appearing in a user's social media feed. When one of these news sources are identified in a social media feed as a social media item and the subject matter of present in that social media feed item has not previously been identified, a news event or topic can be created as a seed post. The steps discussed elsewhere herein with regard to the newsfeed can then operate to generate useful information about that news event or topic, as well as any news source items mentioning the identified news source item, and the news sources in which the news source item appears.

Some social media feed content may not be readily identifiable as being associated with conventional news sources but may otherwise be content that describes a news event or topic that may be relevant for collection with other, more easily identifiable news sources. For example, content on the social media platform Twitch comprises videos in which commentators may play video games or watch entertainment videos with their viewers, while simultaneously discussing various news events or topics. The popularity of some of these Twitch commentators has resulted in their being elevated to a status that can be termed "news influencer," especially in relation to younger audiences. Thus, the corpus of news sources can also include social media platform channels or groups that have been identified as often including discussion of news events or topics. These news channels or groups can be associated with a bias, skew, or viewpoint rating as discussed herein. These influencers will typically tag their content to allow others to identify the content. Such tagging can operate to allow a news event or topic discussed in the subject content to be identified either as a seed post or as content that is collected with other posts. User interaction with the subject post, such as by commenting about the topic of the video, can also be used to identify the contents of a social media feed content item as describing a news event or topic.

The functionality that allows recognition of news events or topics from the presence of a news source configured for incorporation in a user social media feed occurs substantially in real time, as is the collection of additional news source items describing that same news event or topic. Such real-time operation can provide the user with greatly enhanced functionality without reducing the speed at which the subject social media platform operates for the user. The display of the social media feed content item identified as a news event or topic as well as the attendant collection of additional news source items describing that news event or topic and news source bias, skew, or viewpoint ratings associated therewith can be invisible to the user. For example, when a user incorporates an API or browser add-on that incorporates the subject functionality, the user social media feed content can be displayed as per usual for non-news content and the content identified as being associated with news events or topics can be displayed with the additional content.

Figure 12:
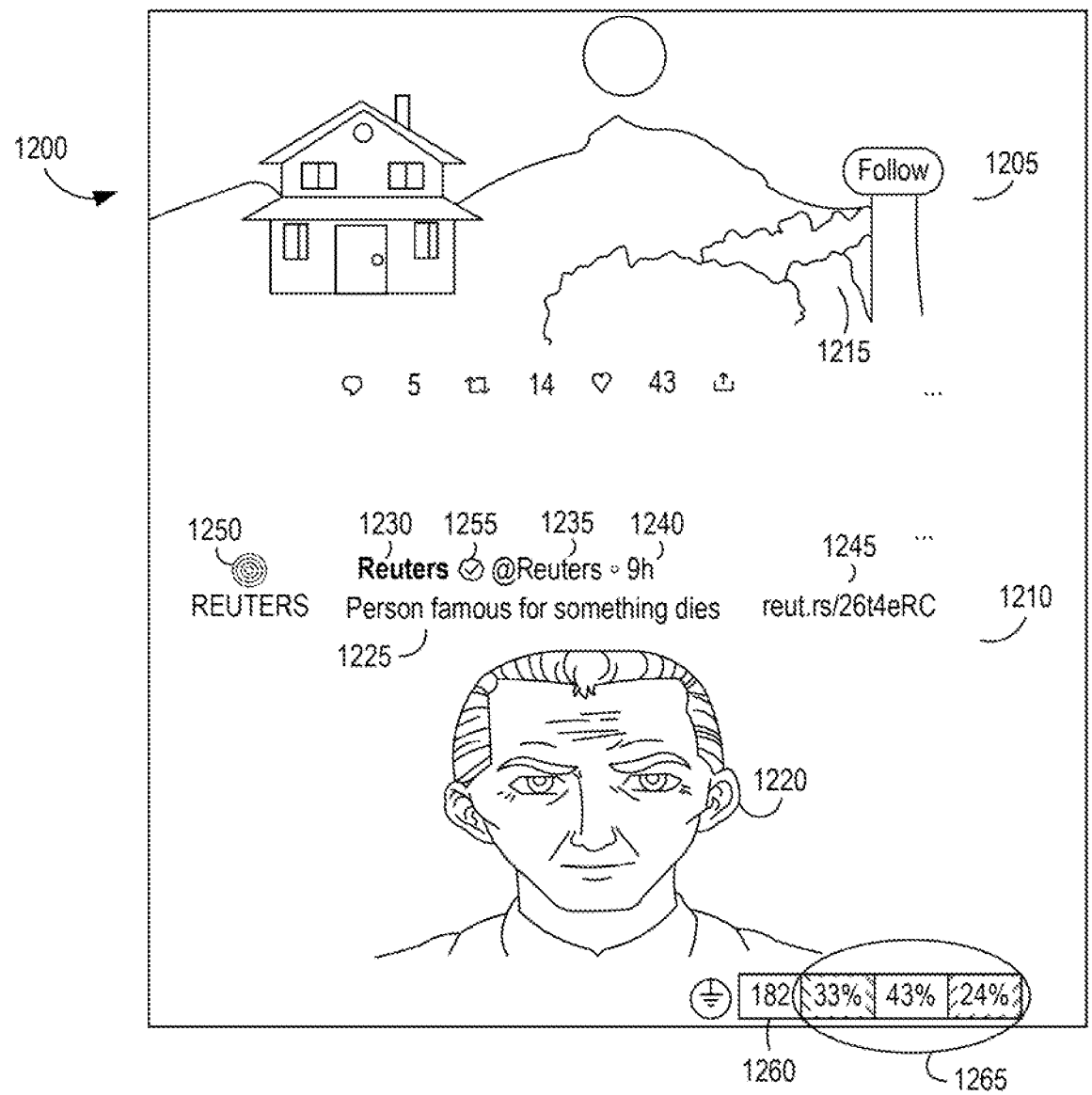
FIGS. 12-16B illustrate various implementations of the methods and systems herein, in accordance with various embodiments of the present disclosure.

Referring to FIG. 12, social media feed display 1200 is shown having first and second social media feed items 1205 and 1210, where social media feed item 1210 is also a news source item, as such term is defined elsewhere herein. As would be appreciated, the larger social media feed, of which a small portion is shown as display 1200, comprises a plurality of social media feed items (not shown) that can be continuously refreshed for display and which can be reviewed by the user from time to time such as, for example, by scrolling. In accordance with the methodology herein, at least some of the social media items in the user social media feed may comprise news source items associated with a previously recognized news event or topic that appears as a news source item from a news source in the corpus of news sources.

It is noted that individual social media feeds will be each, individually, configured in accordance with a user experience defined by the respective platform generators. Thus, the layouts by which the methodology herein will be presented to a user will be defined by the subject social media platform.

Social media feed items 1205 and 1210 can comprise any content or subject matter that typically would appear in social media feed 1200, such as content associated with or provided by groups, companies, individuals etc. to which the user has identified an interest in or about (e.g., friends, contacts, connections, follows, subscribed content, hashtags etc.), content identified as likely being of interest to the user by operation of the subject social media platform's algorithms, advertising, etc. For social media feeds that are configured primarily or solely as newsfeeds, a majority of the social media feed items appearing in the feed can comprise news source items from news sources in the corpus of news sources, where the news source items are associated with a recognized news event or topic. That is, a social media feed that is a newsfeed may have an intent and purpose of being predominately or exclusively for providing a mechanism for news consumption by the user. Such newsfeeds are discussed extensively herein. In some implementations, the user newsfeed can appear with other content comprising advertisements, social material etc. This implementation provides a social media feed that may contain both social content and news event or topic content. In this regard, and to clarify any distinctions between a social media feed and a newsfeed according to the disclosure herein, social media feed 1200 has a purpose or intent of providing social media content to a user that includes content comprising news source items along with other content that is not generally classified as "news source items" associated with "news events or topics."

In this regard, social media feed item 1210 has been identified as a news source item associated with a news event or topic by the recognition of a news source (i.e., 1230 "Reuters") in the information from which social media feed 1200 is generated. In implementations, information identifying a news source 1230 (here 1230 "Reuters") as a news source having a bias, skew, or viewpoint rating associated therewith has been previously incorporated in the corpus of news sources. As such, an appearance of information associated with "Reuters" in information from which user social media feed 1200 is generated provides a signal or recognition that any content (that is, a news feed item) associated with social media feed item 1210 is recognized as being from a known news source and has a likelihood of being a news item mentioning or being associated with a news event or topic.

Social media feed items 1205 and 1210 are each shown with photos 1215 and 1220, although videos, text, etc. can also be provided therewith. A headline such as 1225 also accompanies 1210. Although only partially shown, 1205 may or may not be accompanied by a text description or headline. Source ID 1230, social media account holder ID 1235, social media feed item ID time 1240, short link 1245 to the original URL where item 1210 is located, and Reuters logo 1250 are also displayed in this example 1210. Checkmark 1255 indicates that social media account holder ID 1235 has been confirmed by the social media platform as being verified or is otherwise official.

When a news source is recognized in social media feed 1200 such as in 1210, the system can analyze the content of social media feed item 1210 to determine whether the content thereof is associated with the first occurrence of a news source event or topic. If the analysis indicates that the contents of 1210 are associated with a specific news event or topic that has not previously been identified, the content of 1210 can be used as a seed post for collection of other news source items from other news sources in the corpus of news sources.

When one or more news source items associated with or mentioning a first news event or topic generated or recognized from the subject matter of 1210 are identified in news sources in the corpus of news sources, information associated with a collection of news source items can be generated. In implementations, the generated information can be configured for user display in social media feed 1200, where the contents can be displayed to a user as exemplified by 1210. Referring to the display of social media feed item 1210, count 1260 of a collection of news sources in which the news event or topic incorporated in social media feed item 1210 is also mentioned or associated with (not shown) is displayed on the bottom right of social media feed item 1210 along with a bias, skew, or viewpoint rating indicator 1265 for the collection of news sources where a bias, skew, or viewpoint rating exists for a news source. As discussed hereinafter, news sources with which the first news event or topic are associated with or mentioned but that do not have an assigned bias, skew, or viewpoint rating can also be included in count 1260, but these will not be included in indicator 1265.

Figure 13:
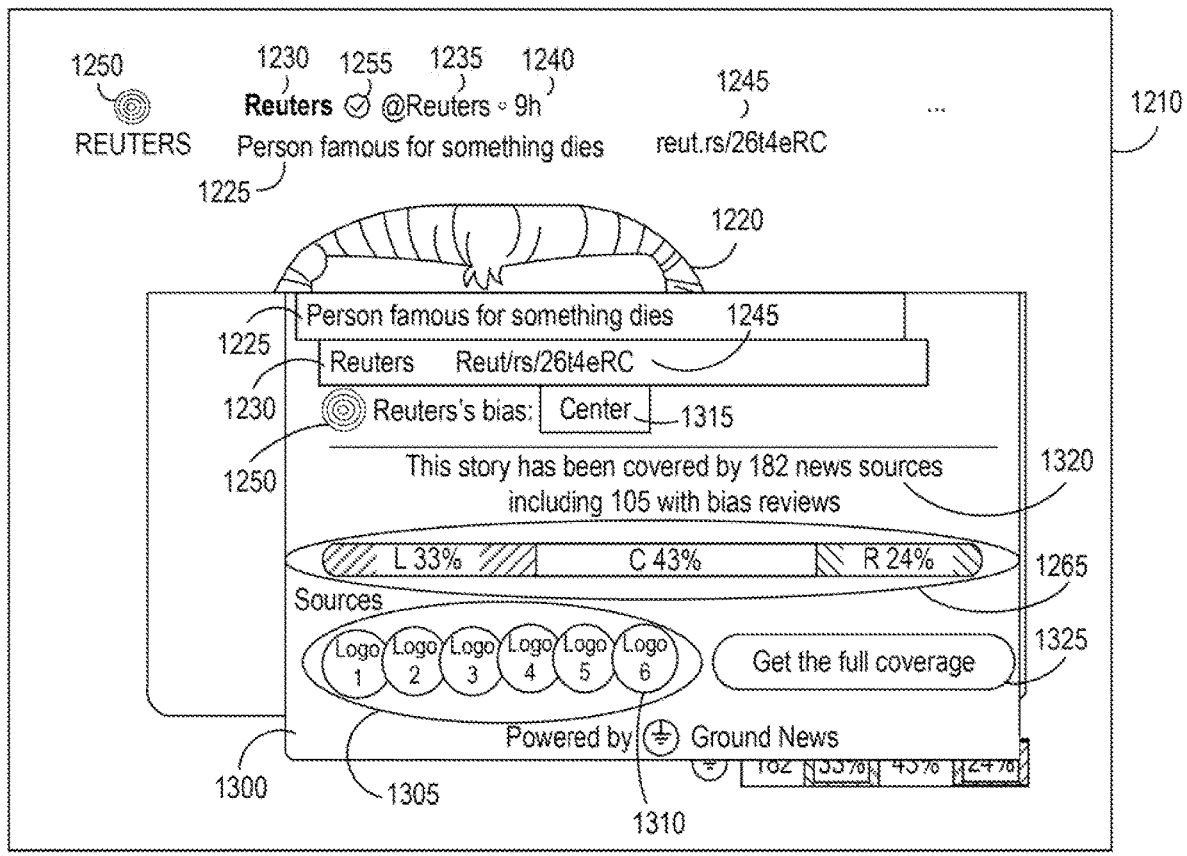

FIG. 13 illustrates a detail screen 1300 resulting from a user's hovering over social media feed item 1210 at either of 1260 or 1265. As shown in this example, bias, skew, or viewpoint rating indicator 1265 is shown along with an assortment 1305 of news source logos plus an indication 1310 of an additional number of logos that are not displayed. Headline 1225 is shown as presented in news source 1230 from which social media feed item 1210 was originally identified, here Reuters. A generated bias, skew, or viewpoint rating for the original news source 1230 that served as the seed post that generated the identification of the news event or topic in social media feed item 1210, here Reuters, can be displayed, for example, as in 1315. Coverage summary 1320 can be displayed to inform a user how many news sources mentioned (e.g., reported) the news event or topic that is the subject of social media feed item 1210, with a description of how many of these news sources included an assigned bias, skew, or viewpoint rating. Detail screen 1300 provides a selectable "full coverage" element 1325, where the full coverage element provides a user with an ability to review all of the news source items as summaries in a separate detail display 1400, as shown with FIG. 14. Other arrangements of information can be displayed as detail screen 1300. In some configurations, the user can select the display format for detail screen 1300, as well as any other screens. Indeed, the screen format can be highly flexible and robust, at least because there is a wealth of information about the news sources, news source items, and news events and topics derivable from the information associated with the processes herein.

Figure 14:
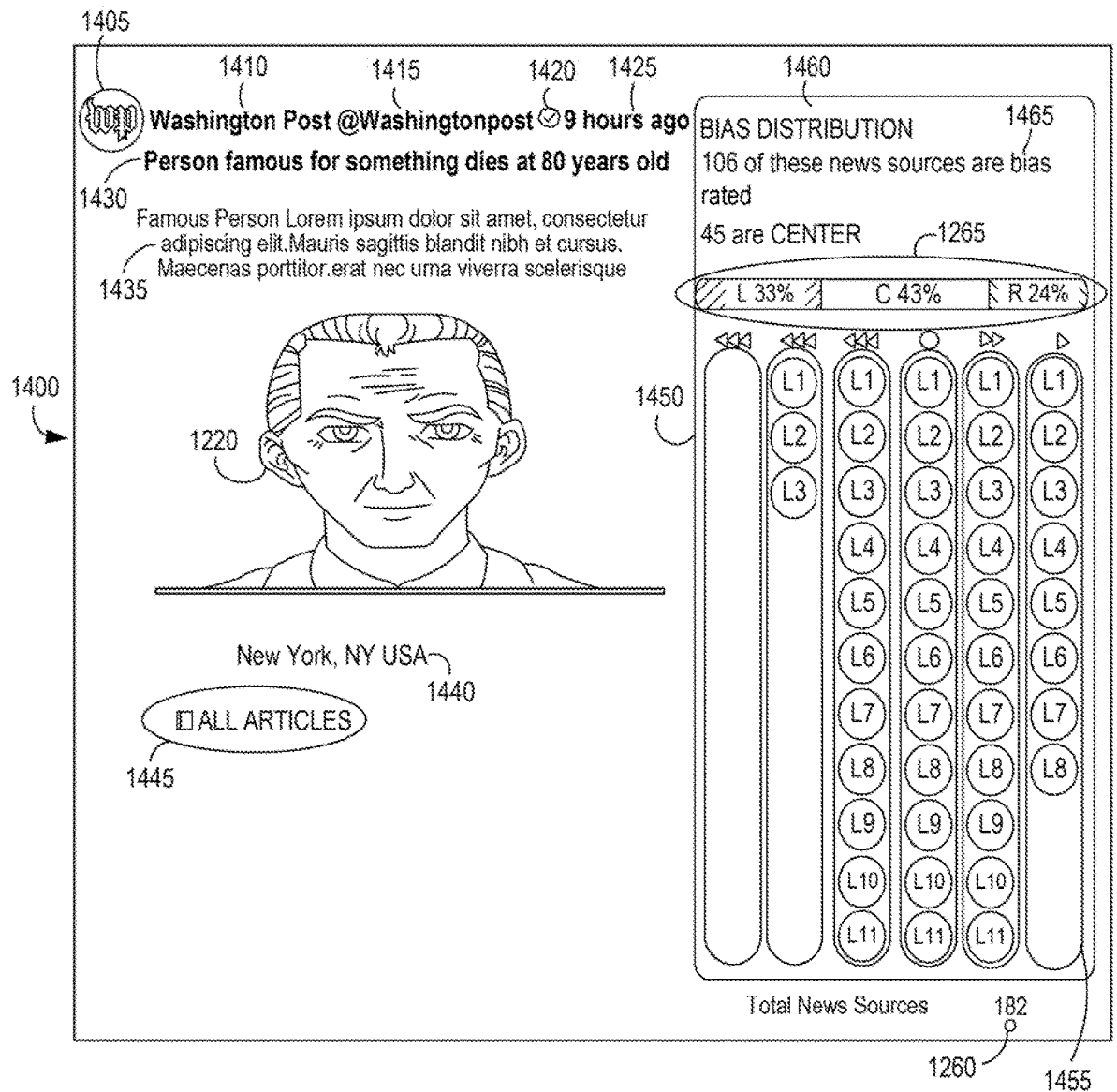

FIG. 14 shows display configuration 1400 that appears when a user selects full coverage bar 1325 on FIG. 13. In this regard, a news source item from the collection of news sources identified as being associated with or mentioning the first news event or topic is displayed. The selected news source as the first mentioned on display configuration 1400 can be generated according to user preferences, for example the user may subscribe to a particular news source, which can generate selection of this news source for a higher presentation at least because the user will likely not be faced with a paywall if she selects that news source for further review. The first presented news source on screen 1400 can also be selected because it is located near the user, for example, the news source is a local news source that may have more relevance to the user. The user can also select a priority for new source presentation on display configuration 1400.

In the presented example, news feed display configuration 1400 shows a news source item from the Washington Post as identified by news source logo 1405, news source name 1410, social media account name 1415, verification 1420 (which may not be present), and time of publication 1425 can be arranged as shown. Headline excerpt 1430 is different from headline excerpt 1225 since each headline is from a different news source. Article summary 1435 can be displayed as included in or derived from information associated with the news source item or news source. Picture 1220 is the same as in social media feed item 1210 such as being derived from media included from a wire service, however, it can be expected that different media can be included on display 1400, for example, when a news source selects or generates individualized content for the news source item. As with other display implementations, the content of a display can vary either by app developer design or by user selection. For example, a location for the original new source event or topic can be displayed, such as with 1440. Display configuration 1400 can be generated to allow the user to be directed to the original website (not shown) for the news source item appearing in display. The user can also select elements such as news source account 1415, time 1425 and/or location 1440 to be provided with news source items, for example. Other screen display and selection variations are contemplated, as would be appreciated.

Display configuration 1400 can allow a user to review more than a single news source item about the news event or topic. In this regard, display configuration 1400 can allow a user to scroll through a list of news source items, as shown by "All Articles" 1445, below which a list of news source items can be arranged for scrolling (not shown). Any of the news source items appearing below "All Articles" 1445 can also be individually selected for review by a user. The user can then be directed to the website, social media feed, blog, etc. where a news source item originated. As would be appreciated, the locations where the user may be directed to can be behind paywalls. Other information (not shown) can also be provided on display configuration 1400, such as an overall coverage assessment stating "the overall coverage of this news event or topic is center (or right, left, far right, etc.)." The news source from which the news event or topic can also be identified, along with an assigned bias, skew, or viewpoint rating for that news source and the date and time of the first reporting therein can also be provided. As noted, arrangement of the news source items can be by a number of criteria determined by either or both of an application developer or the user.

Display configuration 1400 further shows news source call out 1450. Each of the logos in collection 1455 is selectable by the user and when an individual logo is selected, the user can be provided with a new display having information about the news source item for the selected news source such as with 1405-1440. A distribution of the bias, skew, or viewpoint rating in collection 1455 can be provided to a user as in 1265 and 1465.

Information about user behavior vis a vis navigation among news events and topics, news source items, and news sources can be collected as information configurable for reports, dashboards, and/or machine learning processes.

The methodology herein can provide further insights associated with an engagement by a user or collection of users with one or more news sources each having a bias, skew, or viewpoint rating selected from a list of ratings. For example, the bias, skew, or viewpoint rating of a plurality of news sources appearing in a user's social media feed can be analyzed to generate information about the news sources that the user is more inclined to engage with when a news event or topic is delivered to her in her social media feed. In this regard, for example, a user may demonstrate a propensity to select a news source appearing with a news event or topic that has a "left" or "right" bias, skew, or viewpoint rating, even though a plurality of news sources may appear in her social media feed. Information about this user's propensity can be used to gain insights into the user. In this regard, a user who selects a "far left" or "far right" news source from a plurality of a news sources mentioning the same news event or topic in her social media feed might be expected to share a similar political or philosophical viewpoint as that of the selected news source(s).

In implementations, the content of a person's social media account feed can be analyzed for bias, skew, or viewpoint. Information about the owner of each of the individual social media accounts can be included as a corpus of social media accounts for each of a plurality of social media services (e.g., Facebook, Twitter, Snapchat, TikTok, Instagram, Twitch, Youtube, Discord, Substack, etc.) where the social media accounts have previously been assigned a bias, skew, or viewpoint rating.

In further implementations, the identities of social media accounts that are included in a user's social media feed can be analyzed for bias, skew, or viewpoint rating. As would be appreciated, news source items may be ingested in a user's social media feed by way of incorporation of news source items in social media content items generated or authored from other social media accounts. It follows that a first user who may not herself be selecting news sources having a particular type of bias, skew, or viewpoint rating may nonetheless be consuming news source items associated with an ideology of third-party social media accounts (e.g., individuals, companies, etc.). Such third-party social media accounts can themselves include news sources that have assigned bias, skew, or viewpoint rating that may be analyzed. This can allow a user to further understand the bias, skew, or viewpoints for the news source items that she is ingesting from her social media feed. The user can then examine the bias, skew, or viewpoint ratings for the social media feeds of the social media accounts of the users from which at least some of the content of her social media feed is derived. The enhanced visibility to the bias, skew, or viewpoint ratings of the social media accounts that underlay news sources appearing in third party social media accounts appearing in a user's own social media feed can be useful to understand any bias, skew, or viewpoints of social media accounts that might influence the user herself.

Figure 15A:
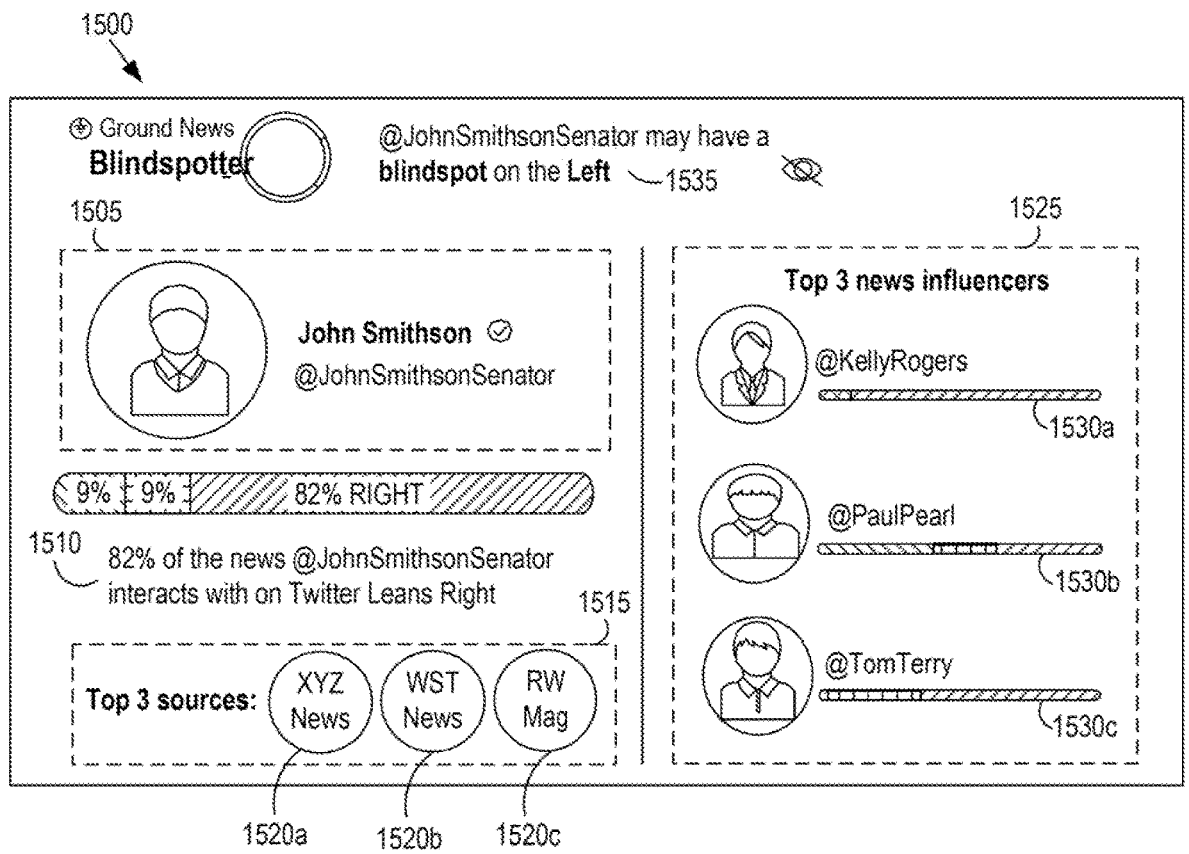

Shown in FIG. 15A, is a results summary 1500 for a bias, skew, or viewpoint analysis of a hypothetical US Republican Senator "John Smithson." An analysis of one of John Smithson's social media feeds, here his Twitter account 1505, can be generated on a specific day. (As noted, the information for any social media feed may vary over time due to changes in the real time content of a user's social media feed.) Analysis results 1510 of Senator Smithson's Twitter account 1505 @BenSmithsonSenator indicates that 82% of the news sources with which Senator Smithson engages with on his Twitter social media feed (such as by subscribing, selecting/clicking, re-posting, etc.) are assessed as having a bias, skew, or viewpoint rating of "Leans Right." Top three news sources list 1515 with which Senator Smithson interacts are shown as individual news source logos 1520a, 1520b, and 1520c, each of which is separately selectable for review as discussed elsewhere herein. Top 3 Twitter accounts list 1525 with which Senator Smithson's Twitter account 1505 interacts are identified as Twitter accounts 1530a, 1530b, and 1530c. Top line conclusions about the overall bias, skew, or viewpoint of a user's engagement with information, which includes both news sources and Twitter accounts appearing in Senator Smithson's Twitter feed, are shown as 1535.

Figure 15B:
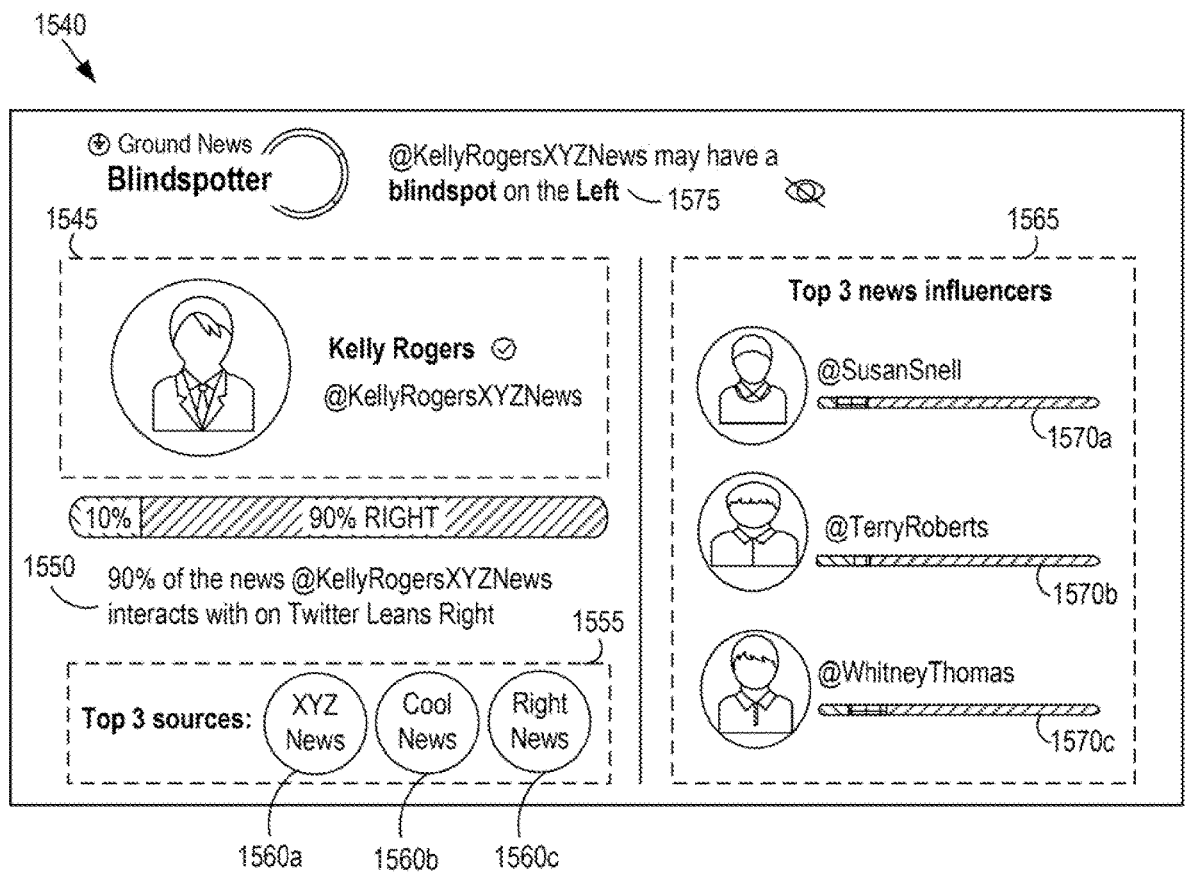

FIG. 15B shows a results summary 1540 of an analysis of the bias, skew, or viewpoint of a specific Twitter account in Senator Smithson's Top 3 influencer list 1525, namely 1530a, which is the Twitter account of Kelly Rogers 1545 @kellyrogersxyznews. Analysis 1550 of the bias, skew, or viewpoint of Twitter account 1545's engagement with news sources is provided along with list 1555 of top 3 news sources (1560a, 1560b, and 1560c) with which Ms. Roger's Twitter account 1545 engages, each of which is selectable. List 1565 shows the top 3 Twitter accounts 1570a, 1570b, and 1570c with which Ms. Rogers engages, each of which can be selected for analysis. While each of 1570a, 1570b, and 1570c are shown to be skewed to the same bias, skew, or viewpoint, if one or more of these Twitter accounts were indicated to have a substantially different assigned bias, skew, or viewpoint rating from that of Twitter account 1545, it could be inferred that the engagement was negative such that account 1545 did not approve of the content posted by a Twitter account having an opposite bias, skew, or viewpoint analysis. Top line analysis 1575 of engagement with news sources and Twitter account bias, skew, or viewpoint is shown for Twitter account 1545.

Figure 16A:
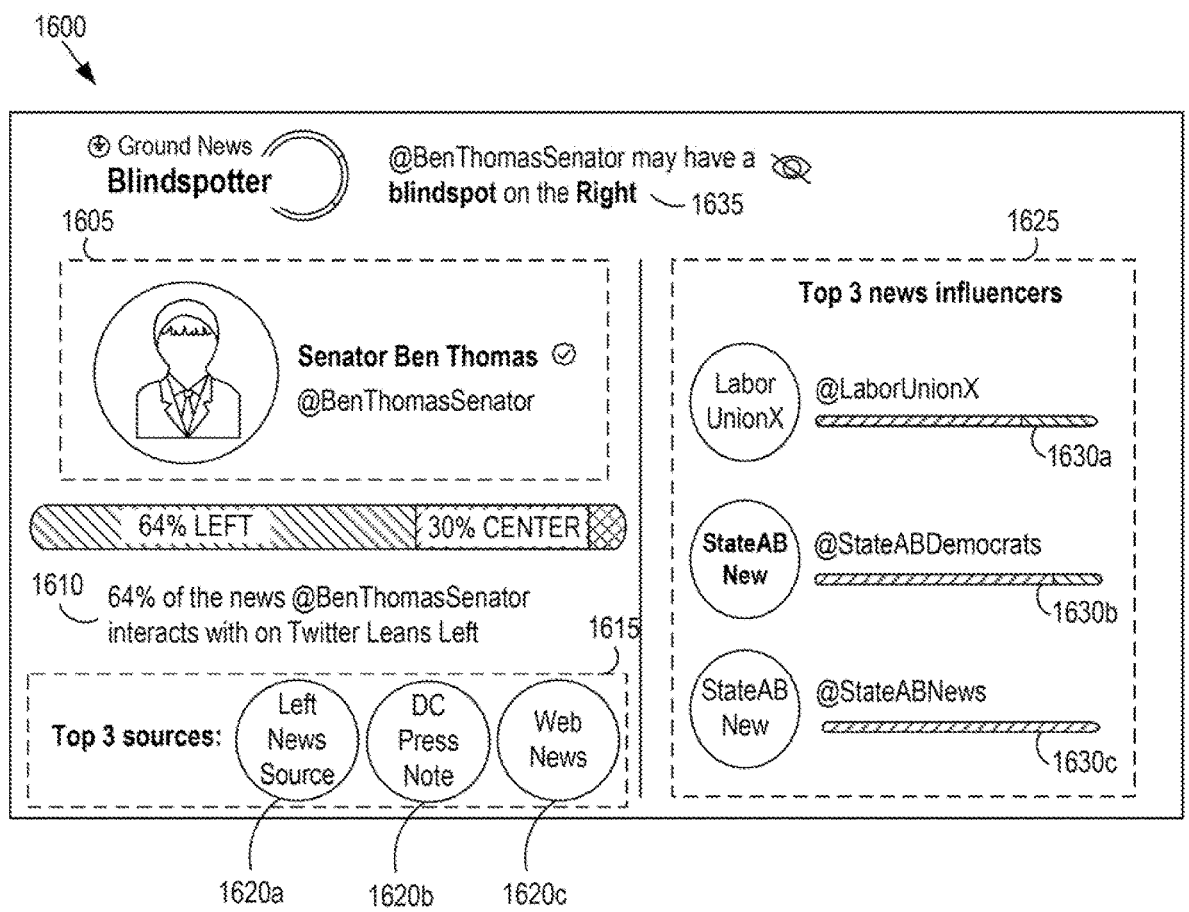

As shown in FIG. 16A, a results summary 1600 for a bias, skew, or viewpoint analysis of Senator Ben Thomas's Twitter account 1605 generated at a first time is provided. Analysis results 1610 of Senator Thomas's Twitter account 1605 indicates that 64% of the news sources with which Senator Thomas engages (such as by subscribing, selecting/clicking, re-posting, etc.) is assessed as having a bias, skew, or viewpoint rating of "Leans Left." Top three news sources list 1615 with which Senator Thomas interacts are shown as individual news source logos 1620a, 1620b, and 1620c, each of which is separately selectable. Top 3 Twitter accounts list 1625 with which Senator Thomas's Twitter account 1605 interacts are identified as Twitter accounts 1630a, 1630b, and 1630c. Top line conclusions about the overall bias, skew, or viewpoint of information which includes both news sources and Twitter accounts that appear in Senator Thomas's Twitter feed is shown as 1635.

Figure 16B:
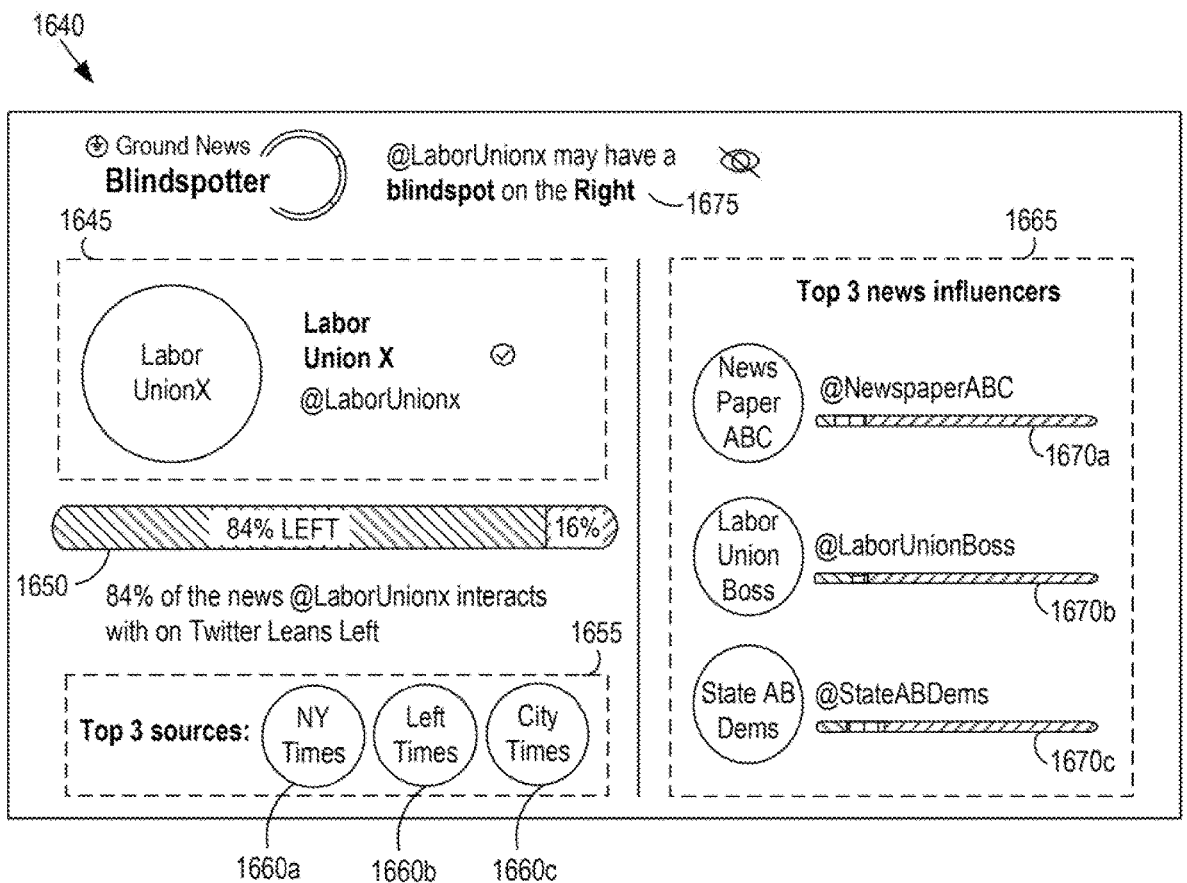

FIG. 16B shows results summary 1640 of an analysis of the bias, skew, or viewpoint of a specific Twitter account in Senator Thomas's Top 3 influencer list 1625, namely 1630a, which is the Twitter account of 1645 Labor Union X. Analysis 1650 of the bias, skew, or viewpoint of Twitter account 1645's engagement with news sources is provided along with list 1655 of the top 3 news sources with which Labor Union X's Twitter account engages, each of which is selectable. List 1665 shows the top 3 Twitter accounts 1670a, 1670b, and 1670c with which Labor Union X engages, each of which can be selected for analysis. Top line analysis 1675 of news sources and Twitter account engagement bias, skew, or viewpoint of Twitter account 1645 is also provided.

It will be appreciated that any analysis of bias, skew, or viewpoint for a user's social media account, for example, that of Senator Smithson's Twitter account 1505, may vary over time. In this regard, a social media account analysis can be conducted at a plurality of times to determine whether there is a change in a generated bias, skew, or viewpoint rating for a social media account—and therefore that of the owner or manager of such account-over a period of time. Changes in ratings of new sources and/or social media accounts with which a social media account engages can also be analyzed.

Although FIGS. 12-16B illustrate examples derived using Twitter as the social media platform, the methodology herein also has utility for other social media platforms existing today and that might be generated in the future. To this end, the ability to identify news events or topics from user and third-party social media feeds from the appearance of news sources identified from a collection of news sources, some of which have been assigned a bias, skew, or viewpoint rating from a generated list of ratings, has broad utility in providing information about the news source consumption of social media users.

In further implementations, the methodology herein can be used to assist or enhance news literacy or "news diet" in a person or collection of persons. To this end, the methodology herein can provide system and methods associated with the promotion of news literacy in a person or collection of persons in need thereof. The methodology can be used, for example, as an add on to a newsfeed to provide notifications, such as in the form of a "nudge," for example, that a user is selecting news sources that tend to fall in a single cluster or area on a bias, skew, or viewpoint rating scale, such as left, right, or center. For example, when a plurality of news events or topics in a user newsfeed is presented to the user, the system can generate information about the selections of the user for news source items. If the user selects a majority of individual news sources from news source items appearing in a newsfeed where the news sources have the same or substantially the same bias, skew, or viewpoint rating, the user can be provided with a notification along the lines of "Your news diet is substantially [far left/center/far right]. Would you like to see news sources that present this same news story from another viewpoint?" Similarly, if an analysis of a user's social media account indicates that the account tends to interact with either or both of news sources or other social media accounts that have a bias, skew, or viewpoint that trends toward one direction, the user can be queried along the lines of "You interact with John Smith's Twitter account more than anyone else. Would you like me to suggest other social media accounts that you might find interesting?"

In the context of Cognitive Behavioral Therapy, such "gentle reminders" have been shown to enhance the ability of persons to change their unconscious behaviors. By providing users with information about their "news diet," it can be expected that some people may be more inclined to change their news consumption and, thus, to become more "news literate." In implementations, the present methodology can be associated with a training program that can provide a diagnosis of a user's news literacy. Yet further, the methodology can provide a method to improve the news literacy of a user in need thereof.

News literacy broadly relates to the ability of a person to be able to apply critical thinking to assess the veracity of news source items, news events or topics, and any news sources associated therewith. Persons who possess news literacy are better able to recognize the presence or absence of "fake news"—that is, whether news source items and/or news events or topics—are in fact true and verifiable using critical analysis/thinking skills including one or more of:

Triangulation and cross-verification: establishing validity by using several research methods and analyzing and examining multiple sources in the hope that diverse viewpoints will shed greater light on a topic each of the following in news presented to them.

Recognizing the presence or absence of confirmation bias: the tendency to believe information is credible if it conforms to the reader's/viewer's existing belief system, or not credible if it does not conform.

The existence of a content farm or content mill: a company/organization that employs a staff of freelance writers to create content designed to satisfy search engine retrieval algorithms with the goal of attracting views and advertising revenue.

The existence of an echo chamber: an information environment in which people are surrounded by information that reinforces their already existing viewpoints, and varied or competing ideas are unlikely to be found or otherwise underrepresented.

Signals of herding phenomenon occurs as more journalists begin to cover a story, so that even more journalists join the herd, imitating the angle the story initially took rather than seeking alternative approaches.

Virality of stories about a news event or topic that: shown by the rapid circulation of media from one user to another. When we forward sensational stories, often from social media without checking their credibility in other sources, we increase their virality.

The engagement of a user with a collection of news sources or social media accounts can be determined by generating a count of the selections of news sources by the user that are associated with a bias, skew, or viewpoint rating for news source items associated with a news event or topic. The count can be generated for a time period of interest, for example from a first time to a second time. For each news event or topic, a plurality of news sources will provide a report thereof that appears in the user's newsfeed or social media account. The user's engagement with a news source selection of, subscribing to, re-posting, liking, commenting, saving etc. of a news source (collectively, "news source engagement") can be recorded for analysis. If a user's "news diet" shows more than a percentage or ratio as being from one news source/social media account or a collection of news sources/social media accounts having bias, skew, or viewpoint rating in a specific category of rating selected from a generated list of ratings, the person's "news diet," "news consumption," or "news source engagement" can be determined to be biased or skewed toward a direction or viewpoint associated with the specific category. For example, if a user's category of ratings appearing in a newsfeed or in a social media account feed is greater than about 50%, or about 75%, or more from a category of interest, the user can be determined to have a news engagement that is biased or skewed toward that identified category. Information associated with such determination can be generated therefrom for use as described elsewhere herein.

In a further example, "far let" or "far right" or any other bias, skew, or viewpoint rating for news sources can be associated with "scams" intended to identify susceptible and/or vulnerable persons for monetary, political, social, or other type of gain. "Native advertising" is paid, sponsored content designed to look like the legitimate content produced by the media outlet. Native advertising is not infrequently included in some news sources that can be characterized according to the methodology herein as "far let" or "far right." This content will be included without indication that it is not derived from a source that would objectively be described as "credible." Often such content is directed toward obtaining personal information (e.g., email addresses, phone numbers, etc.) intended to create saleable lists of contact information. One example of this phenomenon is when "native advertising" is included in a paid, sponsored content designed to look like the legitimate content produced by the media outlet. If a user's news source engagement indicates that they are inclined to engage with a news source that is known or expected to traffic in such activities, information can be generated in this regard. For example, a user can be notified of this determination and provided with direction for actions that can be taken.

Still further, the methodology herein can be useful to generate information about the news events or topics, persons, countries, subjects, etc. that a user is more inclined to engage with at one or more times. To this end, information about a user's interest can be derived from the activities of a user vis a vis her selections made on her newsfeed or by an analysis of her social media accounts. For example, a user may ignore any newsfeed event or topic associated with local or area news, even while she engages heavily with national news. A user might predominately engage with entertainment/celebrity news and ignore other forms of news. A user may interact with only a few social media accounts on a regular basis, thus creating a social media diet that does not include news source items from news sources comprising a wide variety of bias, skew, or viewpoint ratings. The systems and methods herein can collect information about the types of topics and social media accounts that a user has a tendency to select or not select and generate information therefrom. In this regard, a news event or topic can be associated with a category, and the categories with which the user engages in her newsfeed can be analyzed, such as by counting the number of engagements in a time period of interest. Such information can be used to provide notifications to the user about her news consumption, or to push additional content that is or is not from the categories with which the person tends to engage.

Selection of the user of event or topic categories and/or news sources can be determined at different times to see whether the person is engaging via selection of more/different/new news sources or social media accounts at a first time and a second time, or at a plurality of times. Such temporal assessment can provide insights about whether a person is engaging with different types of information over time. The temporal assessment can be defined as a first time and a second time, for example, and a collection of bias, skew, or viewpoint ratings for news sources with which the user engages in the period between the first time and second time can be examined. The information can be configured for use as set out elsewhere herein. For example, a report can be generated that shows a chart or scale associated with a plurality of news sources having bias, skew, or viewpoint ratings over a time period.

The temporal information can be made actionable for the person or a third-party. In this regard, the person's engagement with news sources having assigned bias, skew, or viewpoint rating can be monitored over time and, if appropriate, action can be taken if a need is determined for the person to engage with different types of news events or topics and/or news sources. For example, notifications or nudges can be provided to the user or a third person. Similarly, positive reinforcement can be provided when the user can be seen to be moving toward a target range of news events or topics and/or news sources if it can be seen that the user has moved from a narrow selection of news event or topic categories and/or news sources at a first time to broader selections at a second time. For example, the user can be provided with "badges" or notifications (e.g., "good job") or the like.

Such a review over time can provide insights as to whether a person's social media consumption has changed over time. Recently, there have been accounts of previously rational people becoming increasingly engaged with social media accounts that are known to traffic in conspiracy theories and disinformation. It can be expected that the ability to examine a user's social media feed tone and tenor over time could provide insights into a person's behavioral change in a timelier manner and can improve the ability to provide content that can counter continued engagement with such nefarious social media content.

A review of the tone and tenor of social media content in a social media account over time can also allow the owner of a social media account to confirm that one or more persons that are responsible for maintaining a social media account are aligning information with an intended message, where the message alignment can be facilitated by analysis of a bias, skew, or viewpoint for the account over the period of time. For example, a company can analyze a social media account to confirm that a communications team is conforming to a communications strategy identified for the company. The intended message can be assigned a collection of key words, sentiment, or the like, and the messaging from the account can be analyzed over time to assess message discipline.

The user selection information can be used in other contexts, such as to identify marketing opportunities for those persons, for example. A user who is found to have a "balanced news diet" as shown by her news event or topic selection and/or news source selection and/or the types of social media accounts that she engages with can be provided with news sources for subscription thereto. Alternatively, a person's selection of news events or topics associated with a particular category like skiing, sailing, etc. can be provided with information about ski trips, boats for sale, etc. A person who selects primarily left leaning or right leaning news sources can be presented with marketing opportunities associated therewith, such as cruises, entertainment, political ads, etc. Engagement of a user with types of social media accounts that are known to traffic in misinformation/disinformation can also be determined and information associated therewith can be generated.

In some circumstances, a user may have a different propensity to select news sources depending on the category of news event or topic in context. For example, a user may have a "balanced news diet" for some information categories, but for others she may select biased or skewed news sources. A person may prefer "center" political news but tend to engage more with information having a different bias, skew, or viewpoint rating in relation to, for example, medical topics or vice versa. Such information could provide insights into whether a person might be inclined to be susceptible to movement in an ideology in one direction or another. In this regard, a review of the user's newsfeed selections could provide an early indicator that a person may be becoming receptive to information that is objectively known to be less credible. If such information is received, the person could be provided with corrective information in a manner that is aligned with the manner that the person receives objectively credible news. For example, if the user has high engagement with a particular news source that has high credibility, she can be provided with notifications or "nudges" to push information from those credible sources automatically.

The frequency of a news sources having the same or similar assigned ratings in a collection of news source items or the frequency of coverage can also provide additional insights into a coverage analysis for a news event or topic of interest. For example, if there are many news source items from news sources having the same or similar assigned rating (e.g., "far left," "lean left") versus noticeably fewer news source items having assigned ratings that are different (e.g., "far right," "lean right), useful information about a bias, skew, or viewpoint coverage for the subject news event or topic can be generated. As an example of this implementation is the generation of information associated with a percentage or ratio of news source rating types appearing in a collection can be generated.

In a further implementation, changes in the frequency and characteristics of the coverage of a news event or topic of interest can be generated over time. A news event or topic of interest can be selected by a user or can be automatically recognized and the coverage of that topic by one or a plurality of news sources over time can be reviewed. For example, the news topic of how a particular presidential administration's relationship with a particular voter group is covered by a plurality of news sources over time can be reviewed. In this regard, how a plurality of news sources does, or does not cover, a plurality of news event can be assessed over a period of time to provide a timeline review of coverage type and amount. A user can be provided with a collection of news source items relevant to a news event or topic of interest, here the relationship of a presidential administration with a particular voter group, over a period of time where news source items can be grouped in a plurality of generated or assigned time periods according to their dates of generation/publication as shown by analysis of either or both of the news source item metadata and changes observable in the corpus of news sources.

In one example, a change in sentiment or treatment of a news event or topic over time in one or a plurality of news sources can be presented by grouping of the news source(s) in relation to ratings of the subject news sources. A plurality of headline summaries can be presented along a scale of "left," "center," and "right" along a timeline by date groupings. A timeline view can also allow news event or topics of interest to be viewed as a function of news source location, age of news source, number of news source items previously generated, news source owner/publisher, news event location, or any other grouping that may provide meaningful insights to a user, the system, or otherwise. By grouping news events or topics over a timeline, granular insights into how the coverage of a news event or topic of interest occurred over a time period of interest in one or a plurality of news sources can be provided. When the news event or topic timeline is presented to a user on a user's screen, the user can scroll through the timeline to review the generated headlines associated with each grouped collection. The user can also select a grouped collection appearing on the timeline to allow review of one or more news source items in the collection in a report. In a further presentation format, a coverage dashboard can be generated. Yet further, information associated with the timeline view can be provided for use in machine learning processes as set out elsewhere wherein.

In a further implementation, a user can select a news source item or topic and request additional information about such item or topic. If a user seeks information about a news source item for an event or topic of interest, a corpus of news sources can be analyzed to return one or more news source items that are recognized as describing the news event or topic of interest to the user. A browser extension can be configured to conduct the search for additional news source items associated with the selected news event or topic, for example. Still further, the system can be configured as an API operational with the corpus of news sources. The news source items that are returned can be configured as a collection for presentation with a headline summary to appear in the user's newsfeed, as discussed elsewhere herein, or as otherwise described. In some implementations, the identification of a news event or topic by a user can also serve as an orphan news event or topic recognition to allow other users to be presented with news sources associated with that news event or topic. Alternatively, the news event or topic may already exist in the system, but the user may not have been presented with the information previously, such as in a newsfeed, or she may have not seen even when it was presented to her previously. In either case, the user's selection of an event or topic of interest can be a first step in the system generating the subject news source item collection in this implementation.

In a non-limiting example, the user can obtain a notification on her phone of a weather event in a location, such as a storm. If the user is interested in obtaining more information about such event, she can select such event as being of interest and request that the corpus of news sources be analyzed to return other instances of news reports of that same storm that are identified therein. The weather event can be identified by a weather app on the user's device, for example. Alternatively, the user can observe the weather event in person or hear about it on her social media feed, etc. The user can generate a query that allows the corpus of news sources to be searched to identify additional news source items describing the user selected event.

The one or plurality of news source items that are recognized from the corpus of news sources that are configured together in a collection can be presented in the user newsfeed with the coverage, rating, etc. as set out elsewhere herein. Such an implementation can provide a point of entry for a user to self-direct her investigation of a news event or topic that is substantially independent of the generation of a newsfeed that is delivered fully or partially by an algorithm. In other words, the user can conduct her own investigation of topics that are of interest to her. As news source items are returned for the selected news event or topic of interest, she can obtain additional insights about the coverage of the news event or topic of interest to her, as well as whether and to what extent the corpus of news sources provides coverage of topics that are of interest to her.

A benefit of such an implementation is the ability of a user to gain insights about whether one or more news sources in the corpus of news sources are likely to generate coverage of a particular news event or topic that may be of interest to her. Information about such coverage (or absence thereof) can also be useful for a news source provider (e.g., publisher, content aggregator, content moderator, etc.) to identify topics that might be of interest to a target group of news consumers so that the news source can better deliver news source items to such consumers. In this regard, information obtained from a plurality of users' identification of news events or topics of interest for which further information is desired can be incorporated in a dashboard view to provide insights into news event of topic coverage that are of interest to a group of users. Yet further, a plurality of news event or topic queries by a single user can provide insights into coverage interests for that user. The user queries can be provided in report or dashboard form, as well as being useful in machine learning processes herein.

The information associated with the coverage distribution for news events and topics as a function of news source ratings, news source location, news event or topic location, news source publisher/owner, content moderator, news aggregator, etc. can be incorporated into machine learning processes associated with the systems and methods herein. The information generated from such coverage distribution analysis can be formulated into one or more information sets that can be useful in various processes. For example, the information sets can be configured for use in testing the content of newsfeeds generated by other algorithms. These existing newsfeed products are generally configured to present a user with information with which she is more likely to engage. A user presented with information with which she engages will, in turn, likely share such information with people in her social network, and vice versa. Users who are using algorithmically generated newsfeeds that are programed for engagement will thus likely find themselves presented with news events and topics that are focused on the likelihood that she will engage with such content. Similarly, a user who engages with a particular news source will likely be presented with more of the same. The information set generated from the coverage distribution analysis can be used to independently assess the nature and content of a user's newsfeed to provide her with insights relevant to her news consumption. The user can automatically be provided with notification of information associated with her news consumption. In an implementation, a newsfeed analysis engine can be operational on a user device or as a browser extension for utilization with other newsfeed delivery products.

In another implementation, the information set can be used to assess the scope and content of a student's research sources in conjunction with an educational endeavor. In this regard, if a student is tasked with preparing a research paper that is based upon the use of varied source material, the information set can be useful to allow an instructor to generate a fully or partially automatic review of the sources to provide an assessment of whether the student is, in fact, choosing a suitable set of source materials for her research paper. In this context, if analysis of the student's source list indicates that the student's source list tends toward a particular bias/skew/viewpoint, academic school, set of journals, publisher, author, research team, etc., the student can be provided with notification that she needs to generate different or more sources. The assigned ratings for bias/skew/viewpoint that are applied to the news sources in context can be generated by a teacher, manager of the news sources, or the like. The student can be provided with suggestions in how to modify her news source selection-which can also be an academic article in this context—in order to generate a work product that is based on a balanced collection of news sources. Such suggestions can, at least in part, be automatically generated from the corpus of news sources. The student can thus be provided with enhanced training associated with the development of critical thinking skills. The information set can be operational in an app on the student's device or as a browser extension. The teacher can also be provided with information about the student's activities.

Information derivable from the processes herein can also be useful to generate subscription bundles that are customized for a user. In this regard, the user can be provided with a plurality of news source subscriptions for selection. The user can select some of the provided subscriptions to generate a tailored set of subscriptions that meets the user's needs. The user can provide payment for the subscription package, and the publisher or creator of the new source can be compensated from revenue generation. Yet further, the methodology herein can be deployed to identify a plurality of news sources to be provided as a bundle for a user. Moreover, the methodology herein can be used to derive information that can be used to collect information beneficial for advertisers in the selection of new sources in which to purchase advertising.

Still further, the methodology herein can be used to assist users in the selection of new sources for subscription. There is no modern analogue of a periodical which maps out news (or general information) publications. Akin to Dunn & Bradshaw's SIC and NAICS industry classification codes, publications cannot self-identify in a universal listing, nor can they be found by PR agencies, aggregators or larger publications. Through ingestion, clustering and layering on of usage data, the methodology herein can suitably form linkages between news sources and the topics (e.g., geographies, professions, languages, markets, political views, media types, and interests) that they cover. A constant supply of user traffic data as manifested by user interaction, engagement etc. can strengthen, attenuate and remove these linkages. The collection of topic-source and source-source linkages can be generated into a master 'knowledge graph' which can be useful for B2B companies to identify customers, suppliers and business partners. Subsets of the knowledge graph can be sold, temporarily or permanently licensed.

Figure 9:
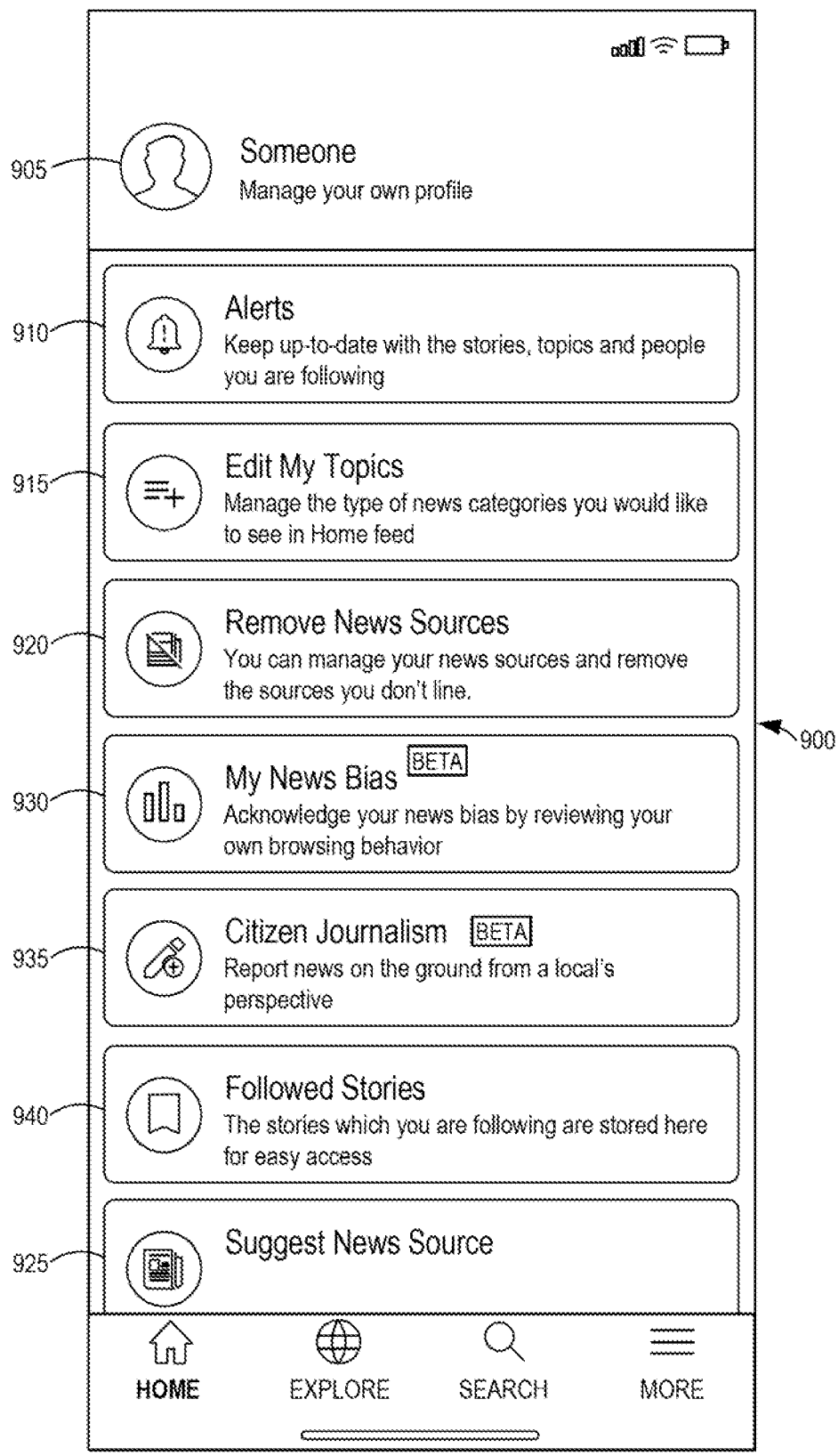

Turning back to the newsfeed implementation of the methodology herein, referring to FIG. 9, a screen shot 900 is shown for a number of user-defined configurations for a hypothetical user 905. For example, a user can set up alerts 910 for news events or topics in which she may be interested. Such can allow a news source items describing the news event or topic of interest to the user to be presented to her, optionally along with an audio, haptic, etc. form of notification. She can also edit her previously identified news events or topics, remove news sources from her feed, and/or suggest a news source for addition to the corpus of news by clicking one of 915, 920, or 925, respectively. News events or topics identification can be aligned with the stated preference.

Yet further, a user can evaluate whether her news consumption can be associated with a particular bias, skew, or viewpoint by selecting 930. For example, a past news browsing history can be assessed to see whether she has a propensity to select for engagement news source items and/or news sources that are associated with a particular ideological or political viewpoint (e.g., selection of liberal news sources or topics). Third parties, such as publishers, companies, teachers, parents etc. can obtain information about the ingestion of information by a user who is a news reader, customer, student, or child, etc. Yet further, recognized news events or topics described in news source items can also be evaluated to determine whether she has a propensity to engage with one type of news event or topics versus another (e.g., avoidance of political news, selection of "lifestyle" topics). Such generated insights can have utility for news consumers who may wish to improve or enrich their news consumption with a goal toward being a more informed person. In an exemplary implementation of this aspect, a user who identifies that she would like to increase her consumption of political news can select or deselect topic preferences to enhance the amount and variety of political news provided to her in her newsfeed. It is expected that this feature can, over time, reduce the increased narrowing of news event or topic and news sources with news source items associated therewith as a function of the generated engagement metrics that results under current newsfeed generation methodologies. Such evaluations can also allow a teacher or parent to better manage the consumption of information by minors, for example.

Yet further, a user can review citizen journalism by selecting 935 without having such information delivered directly to her in her newsfeed. As noted previously, a news source that has not previously been assigned a rating my not, in fact, be credible. However, such information may be relevant to the user. Such unrated news sources having news source items can be clustered in association with a topic, and reviewable by the user in the "citizen journalism" section (which can also appear in a topic bar or elsewhere).

The user can also mark a news event or topic of interest for following, such as by obtaining updates thereof by clicking 940. For example, the news event or topic 110 (FIG. 1) for the Yellow Vest Protests can be marked for following by user 905. If a later occurring news event or topic is identified including similar information as determined by comparing a first news event or topic with a second news event or topic occurring at different times, the first and second news event or topics can be grouped together, such as in a followed topic of 110. As an illustration, if protesters were subjected to prosecution after being arrested in the Yellow Vest Protests, such subsequently occurring news event or topic relating to their arrest can be grouped with the followed story of the protests themselves. A news consumer can then stay updated on a topic for which she has identified an interest at least because a durable record of each news event or topic of interest can be maintained.

In a further implementation, a previously generated collection of at least one news source item associated with a news event or topic, for example, a collection generated in a first news event clustering process, can optionally be assessed to determine whether one or more of the news source items present in the first news source item collection comprises at least some factual inaccuracies. If such assessment indicates that one or more of the news source items present in that first news source collection comprises at least some factual inaccuracies, that news source item can be flagged in the user's newsfeed. Yet further, the news source item(s) can be removed from the user's newsfeed. Such flagging or removal can be incorporated into information used to generate subsequent new source item collections. For example, if a news source byline (e.g., reporter, blogger, content moderator, social media feed owner, etc.) or a news source (e.g., publisher, news aggregator, etc.) is identified as being the originator of a news source item that is indicated to be factually inaccurate as compared to other news source items originated from other bylines or sources, such information can be incorporated into machine learning algorithms used to generate subsequent news event or topic identifications and/or news source items selections. When a news source or byline is indicated to impart factual inaccuracies once or several times, such information can be incorporated in ratings and/or in the selection of such news sources and/or bylines in future news source item collections.

In a further aspect, the one or more news source items are not selected for display to a user in conjunction with an assessment of whether the subject news or information is objectively true or false. In this regard, a news story is not selected for truthfulness prior to presentation of that news story to the user. Yet further, the subject news source is not analyzed for journalistic distortion, bias or other actual or potential bases of objectively false or ideologically/politically skewed prior to selection for display to the user. To the contrary, news or information that comprises bias, skew, viewpoint, or other forms of journalistic distortion can still be selected for display to the user along with an appropriate rating for the news source. As would be appreciated, this methodologies differs from prior art methodology that effectively operate to control the content generated as information by exerting editorial control, as opposed to letting the user make her own decisions as to how she wishes to interact with the material. The present methodology is therefore not a "News Nanny" as are other newsfeed generation methodologies.

More recently, progress has been made on deep learning methodologies that can analyze the objective truth or falsity of news source items that are directed to previously unanalyzed topics. In short, it has been hypothesized that news source items that are not genuine but fiction generated for purposes other than fair and accurate of a news event or topic can be differentiated from objectively true news source items. It follows that extraction of information that can aggregate a large number of news source items describing with a news event or topic of interest where such news source items incorporate appropriate ratings can be useful in the generation of training sets that can be applied in such machine learning methods. It is expected that over time and as more relevant data is generated, methods to identify news source items as to potential falsity can be improved. Methods to determine news sources that are likely to traffic in false reporting can also be more readily identified.

In this regard, and in some implementations, factual inaccuracies can be evaluated between and among news sources describing the same news event or topic by application of machine learning. Such determined factual inaccuracies can be presented to a user to assist her in the determination of whether one or more news source items associated with a news event or topic of interest is likely to, or actually does, include factual inaccuracies. Sentiment, word choice etc. can be evaluated between news source items from different news sources to assess whether a source, byline, author, content moderator, news aggregation platform etc. can be seen as generating a different ideological framing (e.g., bias, skew, or viewpoint). If a news source item is determined to actually or likely include factual inaccuracies, a notification, such as by a signal or a flag, can be provided to the user in her newsfeed or otherwise configured to for other useful knowledge frameworks. In this way, the output of properly trained machine learning systems incorporated in a collection for use in a newsfeed, report, dashboard, or information set can generate real time or near real time fact checking of news source items appearing in a user's newsfeed. Such determinations can also be incorporated into ratings generated for the subject news source. The sentiment analysis can be useful for generating the timeline review as discussed herein, for example, to review changes to the positivity or negativity of the way a particular person or issue has been treated in news sources in relation to their bias, location, owner/publisher, etc. The generated sentiment information can be provided to the user on a screen, in a report, in a dashboard, or for use in an information set as discussed elsewhere herein.

In some situations, an updated or correction notification will not be indicated by a news source when different versions of a news source item relating to a news event or topic of interest by identifiable designators such as "updated," or "corrected" appearing in a version. The methods herein can be configured to compare news source items to determine whether one or more of the news source articles are substantially similar such that a second in time news source item can be identified as a second version of a first news source item. The comparison between news source items in different news source item clusters generated at different times can be via use of NLP systems, as would be appreciated. Titles and tags can also be evaluated between different news source items in different clustering events. If a difference is identified in news source item versions using such NLP or via titles, tags, etc., the second version can be substituted in the user feed or a notation of a correction can be made on the first and/or second version as it appears in generated information, such as in a user newsfeed.

In some implementations, information about the failure of a news source to identify corrections and updates between multiple versions of news source items can be incorporated into useful information, such as ratings or the selection priority for subsequent news source items generated by that news source. Such information can be included in training information for machine learning systems to enrich a rating for that news source.

For example, if it can be determined that a particular news source is likely to not correct news source items that are later found to be incorrect or even false, the news source can be flagged or the rating otherwise modified. In this regard, if it can be determined that a particular news source has a higher likelihood of publication of a news source item that may be incorrect when first reported, this source may follow a reporting business model of being part of a reporting of a news event or topic even though the reporters are not likely to possess good knowledge of the event. An example of this would be the reporting out of unverified facts in a breaking news situation. Often, such early reports need to be corrected at a later time, and reputable news sources will do so. Other news sources, such as those with business models that focus on maximizing "clicks," may not be as concerned with making sure their reporting in real-time is correct. That is, they might wish to be seen as reporting a breaking news event or topic first, as opposed to being known to report correct facts irrespective of how close in time to the subject event that reporting can occur. For example, news sources that often report different facts between first and second news source items, whether as different versions of the same news source item or as wholly new source items having different facts relating to the same news event or topic, the present systems and methods can be configured to identify differences between the first and second news source items generated by the same news source for the same news event or topic. When such different versions or wholly different news source items are identified, information can be generated indicating that there are at least some differences between news source articles that are associated with the same news event or topic and that are reported by the same news source. As indicated previously, such information can be used in the generation of bias, skew, or viewpoint ratings.

Recently, social media platforms (e.g., Facebook, Instagram, Twitter, etc.) and newsfeed product (Apple News, Google News, etc.) have increased their efforts to eliminate "fake news" from their products. While they have stepped up the human review of information appearing on their sites, the volume of news that must be checked can allow information to be presented to users prior to the necessary fact checking. Moreover, the proliferation of news sites, many of which are "bot-generated," makes it virtually impossible for bias-rating products to assign a rating to every news source. The ability of existing fact checking methodologies to keep up with the vast amount of news sources that are available today increases the likelihood that users will be presented with news source items that are comprise partially or wholly false information that is being generated for the purposes of influencing the viewpoints of users to effect the goals of a particular entity. In other words, websites that are created for the purpose of proliferating "fake news" to form, skew, or reorient a person's opinions to affect an intended political, social, or business outcome are an increasing problem today. In some aspects, the methodology herein can be useful to counteract such activities by enhancing the ability to identify news sources having the propensity to proliferate news source items having such characteristics.

As with other useful insights that can be generated from the methodology herein, information regarding the factual accuracy, and the correction (or not) thereof, the propensity of a news source to generate news source items that have a higher probability of inaccuracy can provided to the user in her newsfeed via notification, highlighted in a report or a dashboard, or as an aspect of an information set.

In a further implementation, the methodology herein can be useful to generate an automated, or partially automated notification to a user that one or more news source items are likely to comprise at least some false information. To this end, there are some news sources, for example those that have assigned ratings of "far left" or "far right" that, by their very nature, frequently generate news source items that can be correctly characterized as presenting information to users from a skewed perspective intended to sway the opinions and beliefs of readers, if the information is true at all. For news source items identified in the corpus of news sources, such ratings can allow an automatic generation of a notification to a user of "likely false" or "likely skewed." Such automatic notifications can be beneficial to reduce a user's credible reading of such information and erroneously believing its truth. As noted previously, once a user reads a news item, such information cannot be unseen/unread and the erroneous information may be difficult to dislodge from her belief system.

Other news source items that are in the corpus of news that does not comprise ratings can render an automatic notification to a user of "likely fake" or "likely false" (or similar designation) when there is no rating previously associated with the news source at least because an unrated news source can be considered to be "unreliable" in the context of the methodology herein. In this regard, there has been a proliferation of bot-generated micro-targeted "news" web sites generated recently with the goal of spreading false information to the public, especially in the context of politics and medical news. Many of these bot news-generating sites are micro-targeted to a specific location (e.g., cities, neighborhoods) and/or to people having demographics of interest to influence (senior citizens, parents interested in vaccine information, etc.). While a news item generated by one of these bot-generated news websites can be individually fact-checked by a person or by an algorithm, practically speaking, this would be difficult if not impossible given the large number of these websites and the ability of them to self-regenerate via algorithm. Again, if any of the news source items are read by a user, the user will no doubt incorporate at least some of the read information and such information could impart false or erroneous beliefs. Thus, it can be highly beneficial to automatically remove any of these bot-generated news sites from the corpus of news or to at least automatically generate a notification to the user that the information is "likely fake," "likely false," etc.

In this regard, in an analysis of the corpus of news sources any news source that is not associated with a rating can be durably marked to identify any news source item that has a probability of being bot-generated as "not credible," "not human generated," or some similar designation. Since the likelihood that a news source from a specific location might be bot-generated can be inferred from certain origin locations for a news source (for example, it was found that many "fake news" websites during the 2016 Presidential Election had an origin of Southeastern Europe), the IP address or the location-including information indicating that the real source location of the news source is being masked or falsified—can also be included in the "fake news" probability detection, as well as for use in rating generation for such news source. Also, the time in which the news source item has been included in the corpus of news sources can be considered in the methodology herein. Notably, the corpus of news sources and the processing applied thereto can provide an effective gating mechanism to reduce, or even prevent, the spreading of news source items that are likely to include false information to users. Once a news source is assigned a rating (e.g., bias, skew, or viewpoint), any news source item generated by that rated news source can be automatically presented to a user with such rating to allow the user to make her own assessment of the information therein in conjunction with the accompanying rating. In this regard, the actual contents of each news source item need not be evaluated—or be specifically "fact checked." Rather, the news source item for a news event or topic can be assumed to align with the rating that has been assigned to that news source.

The automatic identification of a news source that has a relatively high probability of falsity or being of low veracity from the corpus of news sources can be beneficial for social media platforms and news feed generation products that seek to reduce or eliminate the proliferation of "fake" or objectively false news in their products. To this end, the information generated from the analysis of the previously unrated news sources in the corpus of news sources can be collected into an information set that can be used in conjunction with other products, such as in the form of an app, API, or browser extension that operates in conjunction with a social media platform (e.g., Facebook, Twitter, Instagram) or a news reader product (e.g., Apple News, Google News, etc.). An unrated news source that appears in the corpus of news sources—that is, a news source that does not have a rating assigned thereto—can be designated as "unreliable" or "unverified" when a news source item therefrom is incorporated in a collection of news source items.

Alternatively, if a news source that was designated as "unreliable" or "unverified" etc. due to the absence of a rating is subsequently assigned a rating, any news source items describing a news event or topic can be added to a previously generated collection for a news event or topic of interest. An added news source item can be designated as being added at a later time. This can allow a news source to develop a reputation over time. However, any news sources that are created to generate news source items for the express purpose of influencing users to adopt a viewpoint, such as those generated by bots to influence political campaigns, etc., are more likely to be excluded from delivery of news source items therefrom because individually they may not create a volume of news source items needed to generate a rating; that is, such bot-generated news sources will always remain "unreliable" and, as such, will not comprise deliverable news source items from the corpus of news sources. On the other hand, if these news sources do keep delivering news source items for a period of time, a rating will be assignable to such news sources and they can be added to the corpus of news sources for delivery of news source items therefrom.

It should be noted that the segmentation of unrated news sources from news sources having deliverable news source items in the corpus of news sources is conceptually different from the censoring of a particular news source or news source item. The corpus of news sources can serve as a platform for first resolving whether a news source is, in fact, a real/legitimate news delivery source. Before any news item is delivered to a user from an individual news source, the source can be associated with a rating that is appropriate in context. To assign a rating, previous news source items generated by this news source, as well as other available information, are reviewable to determine the context of the information from this source. It follows that if a particular news source has not previously generated news source items describing a news event or topic of interest, a rating will not be determinable. In other words, if a source has not previously generated enough news source items to allow a rating to be generated by the system (e.g., via sentiment analysis, etc.) and/or by a human reviewer, any news source item generated by this unrated news source can be considered to be "unreliable" or "unverified' by its own terms. A social media platform or newsfeed product that does not want to be a purveyor of "unreliable" or "unverified" news source items can thus make it a policy that news sources that have not been bias rated will not be available to users.

Yet further, differences in ideological or political viewpoints and/or a propensity of a particular byline to generate news source items including objectively false or ideologically/politically skewed news can be evaluated within a news source. In this regard, a specific rating can be provided for a byline, such as an individual reporter, for example. This feature can allow editors, as well as news consumers, to obtain an objective assessment of individual reporters. Such a granular assessment of bias, skew, or viewpoint in relation to individuals that are generating news source items can provide richer insights into the origins a particular assigned rating. For example, if an editor of a news source wonders why a rating for his news source is generated, he might be interested to find out that a subset of bylines working for him are the source of a generated "liberal" or "conservative" assigned rating," for example.

Over time, it is expected that bylines and/or news sources that are identified as having more or fewer factual inaccuracies can allow the generation of ratings that can be aligned with a byline or a source. For example, news sources can be analyzed to identify common linguistic features across bylines or source news source, including sentiment, complexity, and structure. As would be appreciated, successful deep learning methodologies are generated when patterns emerge while the network analyzes a data set comprising relevant information and learns to solve a task. When trained upon the question of "is this news source item true?", a suitable training set can include known true news source items and known false news source items. In well-sourced data sets including a broad spectrum of examples of true and false news source items, algorithms can be generated, for application to new news source items that are directed toward the same topics as in the training models.

Studies have indicated that it is possible to use deep learning to identify patterns in training sets to allow the detection of factually based information in articles. The algorithms developed from such activities can be used to resolve, at least to a reasonable confidence level, new source items that are more likely to be true than false. When applied to articles that are directed toward topics included in the training set, which will likely be about topics that recur frequently (e.g., famous people, places, things, regular events), the generated algorithms can provide information about truth or falsity of a newly generated news source item.

Figure 10A:
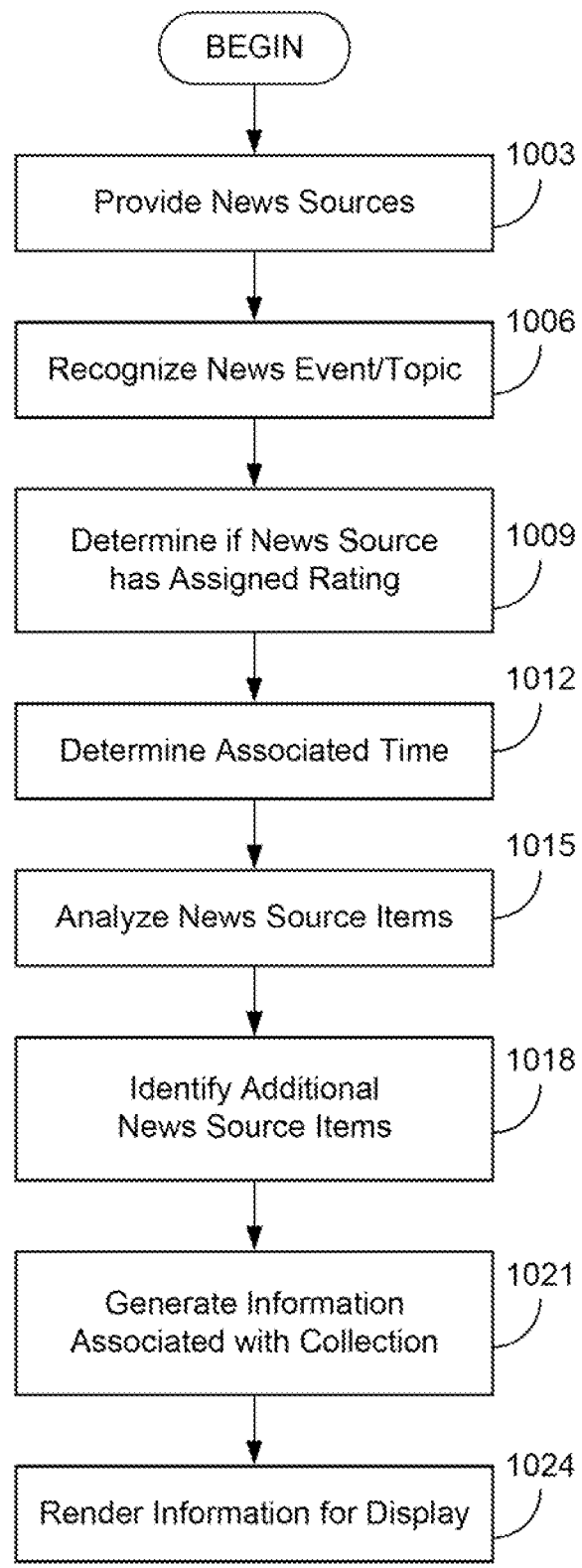
FIGS. 10A and 10B are flowcharts illustrating examples for generating a news feed for a user, in accordance with various embodiments of the present disclosure.
Figure 10B:
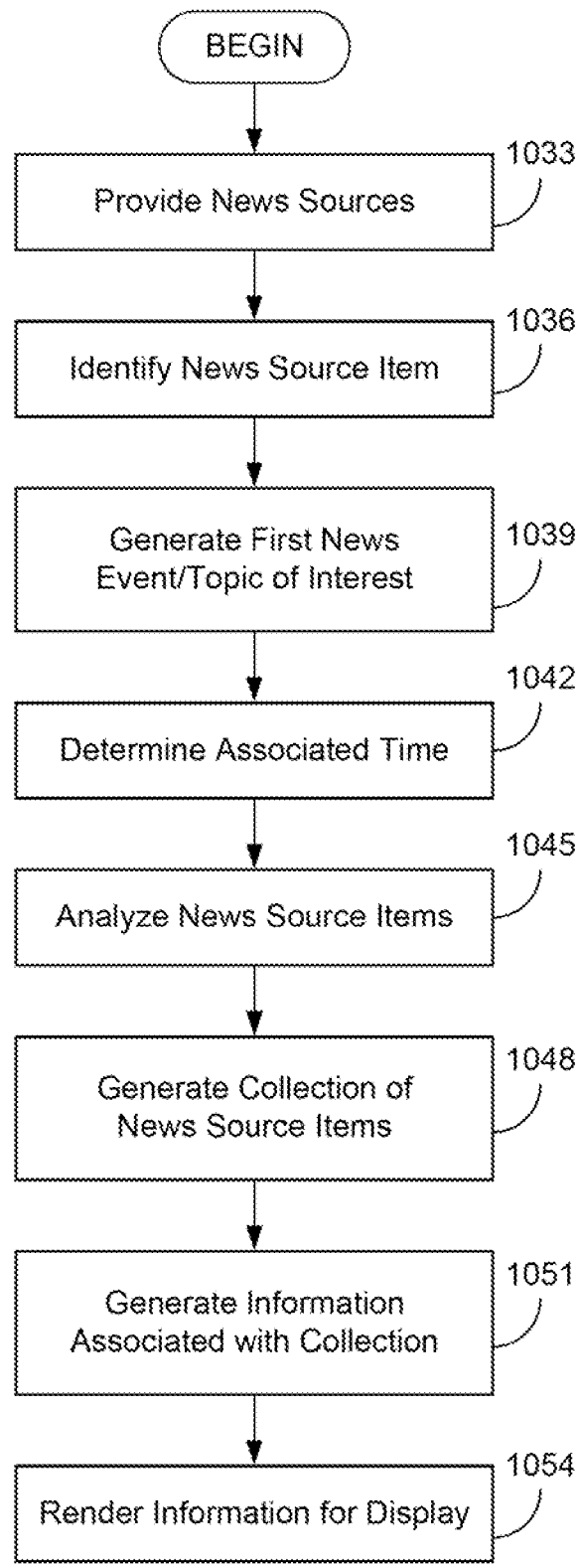

Referring to FIGS. 10A and 10B, shown are flowcharts illustrating examples for generating a newsfeed for a user. In the example of FIG. 10A, the flow begins with providing a corpus of news sources at 1003. Each of the news sources can be configured to generate or provide one or more news source items describing or associated with news events or topics. At least some of the news sources can be independently associated with at least one rating. When a news source of the corpus of news sources is associated with a rating, the news source can be incorporated into a corpus of rated news sources.

Next at 1006, a news event or topic in the corpus of news sources, which had not been previously recognized in a news source, can be recognized (e.g., by a computer or a user). The recognition or identification can be generated when a news source item in the corpus of news sources is not associated with a previously identified or recognized news event or topic. In this way, an orphan news source item can be generated based on the recognized news event or topic.

At 1009, it can be determined if the orphan news source item is derived from an individual news source that has an assigned rating or from an unrated news source. In response to having the assigned rating, a first news event or first topic of interest can be created. In some embodiments, one or more unrated news sources in the corpus of news sources can be identified which do not have an assigned rating. A rating for an identified unrated news source can be generated by, e.g., the computer, a human reviewer or both, and assigned to the unrated news source. The orphan news source item is generated from the corpus of news sources independent of identification of the news event or topic as trending on a social media platform or on a news event or topic aggregation platform, and independent of human selection or curation. A first time associated with the first news event or first topic of interest can be determined at 1012. The first time can be derived from either or both of the orphan news source item or the corpus of news sources.

At 1015, the corpus of news sources can be analyzed for one or more additional news source items that also describe the first news event or first topic of interest. The analysis can be conducted by comparing information associated with the orphan news source item with information associated with at least some of the news source items included in the plurality of individual news sources in the corpus of news sources. A collection of news source items associated with the first news event or topic can be generated using the orphan news source item as a seed post. The orphan news source item can be included in the generated collection of news source items. The comparison with at least some of the news source items can be at least partially reviewed by a human prior to the generation of the generated information for the first collection of news source items.

One or more additional news source items describing the first news event or first topic of interest can be identified at 1018. If at least one identified additional news source item is from an individual news source having an assigned rating, the identified news source item(s) can be incorporated in a first collection of news source items comprising the orphan news source item and any identified additional news source items describing the first news event or first topic of interest. The incorporation of an identified additional news source item can be at least partially reviewed by a human prior to the generation of information for the first collection of news source items. Further news source item describing the first news event or first topic of interest can be added to the first collection by analyzing the corpus of news sources; identifying one or more news source items describing the first news event or first topic of interest; and adding each of the one or more identified news source items to the first collection when that identified news source item is from a news source having an assigned rating from a list of ratings.

At 1021, information associated with the first collection of news source items describing the first news topic or first news event of interest can be generated. The generated information can comprise, but is not limited to, a location or region associated with the first news event or first topic of interest; an origination location or region for a news source having a news source item incorporated in the first collection; an identity of a news source owner, publisher, or author associated with a news source having a news source item incorporated in the first collection; an identity of an author, reporter, or byline for a news source item incorporated in the first collection; a time or date of publication for a news source item incorporated in the first collection; a number of news source items previously published by a news source having a news source item incorporated in the first collection; a presence or absence of a news source item describing the first news event or first topic of interest for one or more news source rating categories; an age or duration of a news source having a news source item incorporated in the first collection; a number of instances of false news reports associated with a news source having a news source item incorporated in the first collection; a number of previous news source item corrections or updates associated with a news source having a news source item incorporated in the first collection; and/or a number of edits or republications for the orphan news source item in one or more news sources to generate one or more additional versions of the orphan news source item.

The generated information can be suitable for incorporation in one or more of, e.g., a newsfeed item in a newsfeed configured for display on a user device; a printed or displayed report; a dashboard configured for human review; an information set configured for use in machine learning processes; or other display or processing formats. In some embodiments, a time period of interest associated with news source items in the first collection can be generated (e.g., by a computer or a human), and information can be generated for the first news event or first topic of interest associated with the time period.

The information can be rendered for display in the appropriate format at 1024. The information associated with the first collection of news source items describing the first news event or first topic of interest can be configured as the newsfeed item configured for display on the user device. When displayed, the newsfeed item information can include an automatically generated text summary for the news source items in the first collection and news source names and assigned ratings for each of the news sources from which the news source items in the first collection are generated. The text summary can provide a description of the first news event or first topic of interest. For example, each of the news source names in the newsfeed item are configured for individual selection by a user. In response to selection of a news source name in the newsfeed item, the news source item describing the first news event or first topic of interest can be provided for display on the user device.

Now referring to the example of FIG. 10B, the flow begins with providing a corpus of news sources at 1033. Each of the news sources can be configured to generate or provide one or more news source items describing or associated with news events or topics. At 1036, a first news source item describing a selected first news event or first topic from the corpus of news sources can be identified. The identification of the first news source item can be implemented by a computer, and the computer identification can comprise recognizing that the first news source item has not previously been identified as describing a first news event or first topic. The identification of the first news source item can also be implemented by the user. If the user identified first news source item has not been previously recognized in the corpus of news sources, the user identified first news source item can be classified as an orphan news source item. The first collection of news source items can comprise only news source items derived from news sources that have been assigned at least one news source rating. When a news source item is from a news source that has not been assigned a rating from a news source rating category, then a rating for the news source can be generated from the rating category (e.g., by a computer, a human supervisor or both) and assigned to the news source.

A first news event or first topic of interest associated with the first (or orphan) news source item can be generated at 1039 and a first time associated with the selected first news event or first topic can be generated or determined at 1042. Next, at 1045, the corpus of news sources can be analyzed to identify one or more additional news source items describing the selected first news event or first topic. The analysis can be conducted by comparing the first news source item with news source items in the corpus of new sources. Comparison with at least some of the news source items in the corpus of new sources can be at least partially reviewed by a human prior to the generation of rated information for the first collection of news source items. A first collection of news source items describing the selected first news event or first topic can be generated at 1048. The first collection of news source items can comprise the first news source item and any identified one or more additional news source items that also describe the selected first news event or first topic.

At 1051, information associated with the first collection of news source items describing the first news topic or first news event of interest can be generated. Generating the information can comprises analyzing the news source items in the first collection to generate information associated with, but not limited to, a location or region associated with the first news event or first topic; an origination location or region for a news source having a news source item incorporated in the first collection; an identity of a news source owner, publisher, or author associated with a news source having a news source item incorporated in the first collection; an identity of an author, reporter, or byline for a news source item incorporated in the first collection; a time or date of publication for a news source item incorporated in the first collection; a number of news source items previously published by a news source having a news source item incorporated in the first collection; a presence or absence of a news source item describing the first news event or first topic for one or more news source rating categories; an age or duration of a news source having a news source item incorporated in the first collection; a number of instances of false news reports associated with a news source having a news source item incorporated in the first collection; a number of previous news source item corrections or updates associated with a news source having a news source item incorporated in the first collection; and/or a number of edits or republications for the first news source item in one or more news sources to generate one or more additional versions of the first news source item.

The generated information can be suitable for incorporation in one or more of, e.g., a newsfeed item in a newsfeed configured for display on a user device; a printed or displayed report; a dashboard configured for human review; an information set configured for use in machine learning processes; or other display or processing formats. In some embodiments, a time period of interest associated with news source items in the first collection can be generated (e.g., by a computer or a human), and information can be generated for the first news event or first topic of interest associated with the time period. In some embodiments, at least one additional news source item describing the selected first news event or first topic in the first collection can be identified from analysis of the corpus of news sources over a time period of interest and incorporated. Information can be generated associated with the first news source item and the at least one additional news source item describing the first news event or first news topic over at least some of the time period. Incorporation of an additional news source item to the first collection of news source items can be at least partially reviewed by a human prior to the generation of the information. News source items in the first collection of news source items can be sorted according to each of a plurality of news source rating categories and information associated with a number of news source items in the first collection for each of the plurality of news source rating categories can be generated.

The information can be rendered for display in the appropriate format at 1054. The information associated with the first collection of news source items can be configured as a newsfeed item configured for display on the user device. The displayed newsfeed item information can include an automatically generated text summary for at least some of the news source items in the first collection and/or news source names and any assigned news source ratings for each of the news sources having one or more news source items in the first collection. The assigned news source ratings can be associated with one or more of a location or region associated with the first news event or first topic; an origination location or region for a news source having a news source item incorporated in the first collection; an identity of a news source owner, publisher, or author associated with a news source having a news source item incorporated in the first collection; an identity of an author, reporter, or byline for a news source item incorporated in the first collection; a time or date of publication for a news source item incorporated in the first collection; a number of news source items previously published by a news source having a news source item incorporated in the first collection; a presence or absence of a news source item describing the first news event or first topic for one or more news source rating categories; an age or duration of a news source having a news source item incorporated in the first collection; a number of instances of false news reports associated with a news source having a news source item incorporated in the first collection; a number of previous news source item corrections or updates associated with a news source having a news source item incorporated in the first collection; and/or a number of edits or republications for the first news source item in one or more news sources to generate one or more additional versions of the first news source item.

Figure 11:
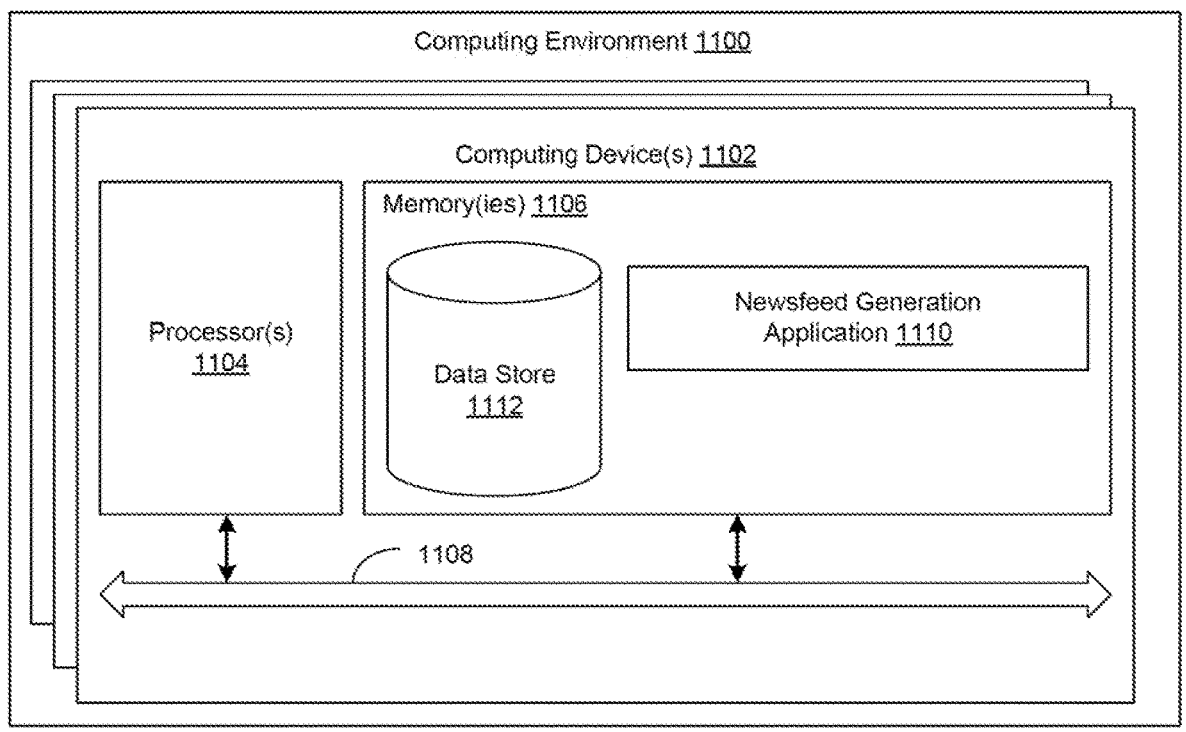
FIG. 11 is a schematic diagram illustrating an example of a computing environment that can be employed to generate a news feed for a user, in accordance with various embodiments of the present disclosure.

FIG. 11 is a schematic diagram illustrating an example of a computing environment 1100 according to an example embodiment. The computing environment 1100 includes one or more computing devices 1102. Each computing device 1102 includes at least one processor circuit, for example, having a processor 1104 and a memory 1106, both of which are coupled to a local interface 1108. To this end, each computing device 1102 may comprise, for example, at least one server computer or like device. The local interface 1108 may comprise, for example, a data bus with an accompanying address/control bus or other bus structure as can be appreciated.

Stored in the memory 1106 are both data and several components that are executable by the processor. In particular, stored in the memory 1106 and executable by the processor include a newsfeed generation application 1110 and potentially other applications. Also stored in the memory may be a data store 1112 and other data. The data stored in the data store 1112, for example, is associated with the operation of the various applications and/or functional entities described in this disclosure. For example, the data store 1112 may include databases, object libraries, and other data or information as can be understood. In addition, an operating system may be stored in the memory and executable by the processor 1104. The data store 1112 may be located in a single computing device or may be dispersed among many different devices. The components executed on the computing device(s) 1102 include, for example, the newsfeed generation application 1110 and other systems, applications, services, processes, engines, or functionality not discussed in detail herein. It is understood that there may be other applications that are stored in the memory 1106 and are executable by the processor 1104 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

The system can be configured to communicate with one or more user device(s). For example, the user device(s) can be communicatively coupled to the computing device(s) either directly through a wireless communication link or other appropriate wired or wireless communication channel, or indirectly through a network (e.g., WLAN, internet, cellular or other appropriate network or combination of networks). In this way, the generated newsfeed, news source items or other information can be communicated between the computing device(s) 1102 and user device(s).

A number of software components can be stored in the memory and are executable by the processor. In this respect, the term "executable" means a program file that is in a form that can ultimately be run by the processor. Examples of executable programs may be, for example, a compiled program that can be translated into machine instructions in a format that can be loaded into a random access portion of the memory and run by the processor, source code that may be expressed in proper format such as object code that is capable of being loaded into a random access portion of the memory and executed by the processor, or source code that may be interpreted by another executable program to generate instructions in a random access portion of the memory to be executed by the processor, etc. An executable program may be stored in any portion or component of the memory including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Also, the processor 1104 may represent multiple processors 1104 and the memory 1106 may represent multiple memories 1106 that operate in parallel processing circuits, respectively. In such a case, the local interface 1108 may be an appropriate network that facilitates communication between any two of the multiple processors 1104, between any processor 1104 and any of the memories 1106, or between any two of the memories 1106, etc. The local interface 1108 may comprise additional systems designed to coordinate this communication, including, for example, performing load balancing. The processor 1104 may be of electrical or of some other available construction.

Although the newsfeed generation application 1110, and other various systems described herein, may be embodied in software or instructions executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

Any logic or application described herein, including the newsfeed generation application 1110, that comprises software or instructions can be embodied in any non-transitory computer-readable medium for use by or in connection with an instruction execution system such as, for example, a processor 1104 in a computer system or other system. In this sense, the logic may comprise, for example, statements including instructions and declarations that can be fetched from the computer-readable medium and executed by the instruction execution system.

The flowcharts or process diagrams of FIGS. 10A and 10B are representative of certain processes, functionality, and operations of embodiments discussed herein. Each block may represent one or a combination of steps or executions in a process. In this regard, each block can represent a module, segment, or portion of code, which comprises one or more executable instructions for implementing the specified logical function(s). The program instructions may be embodied in the form of source code that comprises human-readable statements written in a programming language or machine code that comprises numerical instructions recognizable by a suitable execution system such as the processor 1104. The machine code may be converted from the source code, etc. Further, each block may represent, or be connected with, a circuit or a number of interconnected circuits to implement a certain logical function or process step.

Although the flowcharts or process diagrams of FIGS. 10A and 10B illustrate a specific order, it is understood that the order may differ from that which is depicted. For example, an order of execution of two or more blocks may be scrambled relative to the order shown. Also, two or more blocks shown in succession in FIGS. 10A and 10B may be executed concurrently or with partial concurrence. Further, in some embodiments, one or more of the blocks shown in FIGS. 10A and 10B may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the newsfeed generation application 1110, that comprises software or executable-code components can be embodied or stored in any tangible or non-transitory computer-readable medium or device for use by or in connection with an instruction execution system such as, for example, the processor 1104. In this sense, the logic may comprise, for example, software or executable-code components that can be fetched from the computer-readable medium and executed by the instruction execution system. Thus, the instruction execution system may be directed by execution of the instructions to perform certain processes such as those illustrated in FIGS. 10A and 10B.

In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

The foregoing detailed description has set forth various aspects of the devices and/or processes for system configuration via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the aspects disclosed herein, in whole or in part, can be equivalently implemented in integrated circuits, as one or more computer programs running on one or more computers, e.g., as one or more programs running on one or more computer systems, as one or more programs running on one or more processors, e.g., as one or more programs running on one or more microprocessors, as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution.

Those skilled in the art will recognize that it is common within the art to describe devices and/or processes in the fashion set forth herein, and thereafter use engineering practices to integrate such described devices and/or processes into data-processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors, e.g., feedback for sensing position and/or velocity; control motors for moving and/or adjusting components and/or quantities. A typical data processing system may be implemented utilizing any suitable commercially available components, such as those typically found in data computing/communication and/or network computing/communication systems.

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

As described herein, the exemplary aspects have been described and illustrated in the drawings and the specification. The exemplary aspects were chosen and described in order to explain certain principles of the disclosure and their practical application, to thereby enable others skilled in the art to make and utilize various exemplary aspects of the present disclosure, as well as various alternatives and modifications thereof. As is evident from the foregoing description, certain aspects of the present disclosure are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the disclosure are deemed to be covered by the disclosure which is limited only by the claims which follow.

What is claimed is:

1. A method of generating information about bias, skew, or viewpoints associated with news content appearing in a user social media feed, comprising:
    a. identifying, by a computer, a first description of a news event or topic in user social media feed content, wherein:
        i. the news event or topic is identified by recognition of the news event or topic in a first news source item corresponding to a first news source, wherein:
            1. the first news source is included in a corpus of news sources comprising a plurality of individual news sources;
            2. each of the plurality of individual news sources is configured to provide news source items describing news events or topics; and
            3. at least some of the plurality of individual news sources are each, independently, assigned a bias, skew, or viewpoint rating from a generated list of ratings;
    b. analyzing, by the computer, the corpus of news sources for one or more additional news source items that also describe the news event or topic, wherein the analysis is conducted by comparing information associated with the first news source item with information in the corpus of news sources;
    c. identifying, by the computer, the one or more additional news source items describing the news event or topic and, in response to the identification, generating a collection of news source items describing the news event or topic, wherein each news source item in the collection is associated with a corresponding news source;
    d. determining, by the computer, a presence or absence of an assigned bias, skew, or viewpoint rating for each of the news sources corresponding to each of the news source items in the collection;
    e. identifying, by the computer, one or more news sources corresponding to news source items in the collection having an absence of an assigned bias, skew, or viewpoint rating;
    f. generating, by the computer, a collection of unrated news sources;
    g. generating, by the computer, enriched social media feed content information associated with each of: the news event or topic, the news source items in the collection, and the news sources corresponding to the news source items in the collection; and
    h. configuring, by the computer, the enriched social media feed content information as one or more of:
        i. a display configuration for display as:
            1. user social media feed content on a user device; or
            2. third-party user social media feed content on a third-party user device;
        ii. a printed or displayed report;
        iii. an administrator dashboard; or
        iv. an information set for use in machine learning processes.

2. The method of claim 1, wherein one or more of the:
    a. news event or topic recognition;
    b. news source bias, skew, or viewpoint rating assignment determination;
    c. additional news source item identification; or
    d. news source item collection generation, are reviewed by a human prior to the generation of the enriched social media feed content information.

3. The method of claim 1, wherein the enriched social media feed content information comprises one or more of:
    a. a location or region associated with the news event or topic;
    b. an origination location or region for a news source corresponding to a news source item in the collection;
    c. an identity of a news source owner, publisher, or author associated with a news source corresponding to a news source item in the collection;
    d. an identity of an author, reporter, or byline for a news source item in the collection;

e. a time or time period associated with the news event or topic;
f. a time or date of publication for a news source item in the collection;
g. a number of news source items previously published by a news source corresponding to a news source item in the collection;
h. a presence or absence of a news source item describing the news event or topic for one or more news source bias, skew, or viewpoint rating type;
i. an age or duration of a news source corresponding to a news source item in the collection;
j. a number of instances of false news reports associated with a news source corresponding to a news source item in the collection;
k. a number of previous news source item corrections or updates associated with a news source corresponding to a news source item in the collection; or
l. a number of edits or republications for a news source item in the collection.

4. The method of claim 1, further comprising:
a. generating, by either or both of the computer or a human reviewer, a bias, skew, or viewpoint rating for one or more news sources in the collection of unrated news sources from the generated list of ratings;
a. assigning, by the computer, the generated bias, skew, or viewpoint rating to the one or more unrated news sources, thereby providing one or more additional rated news sources; and
b. optionally adding, by the computer, each of the news source items corresponding to the one or more additional rated news sources to the collection of news source items describing the news event or topic.

5. The method of claim 1, wherein the enriched social media feed content information is configured for display on the user or third-party device and, when displayed, the enriched social media feed content includes at least one of:
a. an automatically generated summary of information associated with the news event or topic, wherein the summary of information is derived from a selected news source item in the collection, and the summary of information includes at least one of:
i. a headline for the news event or topic;
ii. a text summary for the news event or topic;
iii. media comprising a photo, drawing, or video;
iv. an assigned bias, skew, or viewpoint rating for the news source corresponding to the selected news source item;
v. a link to a news source website for the news source corresponding to the selected news source item;
vi. a social media account verification for a news source account corresponding to the selected news source item; or
vii. a logo or name for the news source corresponding to the selected news source item;
b. a distribution of news sources in the collection arranged by bias, skew, or viewpoint rating types;
c. a count of news sources in the collection describing the news event or topic; or
d. at least one link to content associated with the collection of news feed items associated with the news event or topic.

6. The method of claim 5, wherein the displayed enriched social media feed content is configured for user selection via user interaction with a device display.

7. The method of claim 6, wherein user selection of a news source item, a news source logo or name, a news source link, or a news source bias, skew, or viewpoint rating on the device display generates a new device display, and wherein the new device display is associated with a website or social media account for an owner or publisher of a news source corresponding to a news source item in the collection.

8. The method of claim 6, wherein information generated about the user selection is stored as user social media feed content engagement information.

9. The method of claim 1, wherein the news event or topic is generated from the corpus of news sources independently of:
a. identification of the news event or topic as trending on a social media platform or on a news event or topic aggregation platform; and
b. human selection or curation.

10. A method of managing content in a user social media account, comprising:
a. analyzing, by a computer, a plurality of social media feed content items in a user social media feed to identify one or more news sources appearing in the user social media feed, wherein the user social media feed is associated with a user social media account, thereby providing a collection of news sources appearing in the user social media feed;
b. determining, by the computer, whether news sources in the collection each have an assigned bias, skew, or viewpoint rating from a generated list of ratings, thereby generating each of:
i. a collection of rated news sources; and
ii. a collection of unrated news sources;
c. deriving, by the computer, information about the assigned bias, skew, or viewpoint rating for each of the news sources in the collection of rated news sources;
d. generating, by either or both of the computer or a human reviewer, a bias, skew, or viewpoint rating range for the user social media account from the collection of rated news sources; and
e. providing, by the computer, information about the bias, skew, or viewpoint rating range associated with the user social media account for a time period of interest as one or more of:
i. a display configuration for display on either or both of:
1. a user device; or
2. a third-party user device;
ii. a notification to:
1. a user; or
2. a third-party;
iii. a printed or displayed report;
iv. an administrator dashboard; or
v. an information set configured for use in machine learning processes.

11. The method of claim 10, wherein the time period of interest includes a first time and a second time, and the method further comprises:
a. generating, by the computer, information associated with a presence or absence of a change in the bias, skew, or viewpoint rating range associated with the rated news sources with which the user engages between the first time and the second time.

12. The method of claim 11, wherein one or more notifications associated with the presence or absence of a change in the bias, skew, or viewpoint rating range during the time period of interest are provided to the user or a system administrator.

13. The method of claim 11, further comprising:
a. generating information about user social media feed content during the time period of interest, wherein the information is associated with one or more of:
   i. locations or regions associated with one or more of the rated or unrated news sources;
   ii. an identity of a news source owner, publisher, or author associated with one or more of the rated or unrated news sources;
   iii. a number of news source items previously published by one or more of the rated or unrated news sources;
   iv. an age or duration of one or more or the rated or unrated news sources;
   v. a number of instances of false news reports associated with one or more rated or unrated news sources; or
   vi. a number of previous corrections or updates associated with the one or more of the rated or unrated news sources.

14. The method of claim 11, further comprising:
a. generating, by the computer, information about news source items in the user social media content, wherein the generated information comprises one or more of:
   i. a number of edits or republications for one or more news source items;
   ii. an identity of an author, reporter, or byline for one or more news source items;
   iii. a time or time period associated with one or more news source items; or
   iv. a time or date of publication for one or more news source items.

\* \* \* \* \*